United States Patent
Imaoka et al.

(10) Patent No.: US 7,950,806 B2
(45) Date of Patent: May 31, 2011

(54) REAR PROJECTOR

(75) Inventors: Masayuki Imaoka, Izumiotsu (JP); Jun Ishihara, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 752 days.

(21) Appl. No.: 12/005,223

(22) Filed: Dec. 26, 2007

(65) Prior Publication Data

US 2008/0158518 A1  Jul. 3, 2008

(30) Foreign Application Priority Data

Dec. 27, 2006  (JP) ................. 2006-352854

(51) Int. Cl.
  *G03B 21/00*  (2006.01)
(52) U.S. Cl. .......................................... 353/70; 353/69
(58) Field of Classification Search .............. 353/69, 353/70, 99, 79; 359/443, 455, 456, 457, 359/460, 742, 743

See application file for complete search history.

(56) References Cited

U.S. PATENT DOCUMENTS

| 6,779,897 | B2* | 8/2004 | Konno et al. ............. 353/99 |
| 6,805,447 | B2 | 10/2004 | Takeuchi ............ 353/71 |
| 6,989,929 | B2* | 1/2006 | Watanabe ............ 359/457 |
| 2004/0166258 | A1* | 8/2004 | Mau et al. .......... 428/34.1 |
| 2006/0092511 | A1 | 5/2006 | Ohishi et al. ......... 359/460 |

FOREIGN PATENT DOCUMENTS

| JP | 56-147140 A | 11/1981 |
| JP | 2002-196413 A | 7/2002 |
| JP | 2005-292666 A | 10/2005 |

* cited by examiner

*Primary Examiner* — Georgia Y Epps
*Assistant Examiner* — Danell L Owens
(74) *Attorney, Agent, or Firm* — Sidley Austin LLP

(57) ABSTRACT

A rear projector for performing image projection includes: a screen and a projection optical system. The screen has a rotationally symmetric Fresnel lens. The projection optical system has at least one reflection surface formed of a rotationally asymmetric free curved surface. The projection optical system is nonaxisymmetric and makes a central principle ray incident obliquely on the screen in the image projection. The Fresnel lens has aberration that cancels out pupil aberration of the projection optical system so that principal rays of beams exiting from the Fresnel lens become substantially parallel to each other.

22 Claims, 19 Drawing Sheets

Ex1 (Focal length of TIR Fresnel lens)

Ex2 (Focal length of TIR Fresnel lens)

Ex3 (Focal length of TIR Fresnel lens)

Ex4 (Focal length of TIR Fresnel lens)

Ex5 (Focal length of TIR Fresnel lens)

Ex6 (Focal length of TIR Fresnel lens)

Ex8 (Focal length of TIR Fresnel lens)

Ex9 (Focal length of TIR Fresnel lens)

REAR PROJECTOR

This application is based on Japanese Patent Application No. 2006-352854 filed on Dec. 27, 2006, the contents of which are hereby incorporated by reference.

BACKGROUND OF THE INVENTION

1. Field of the Invention

The present invention relates to a rear projector, and more specifically to a rear projector that uses, for example, a digital micromirror device or an LCD (Liquid Crystal Display) as a display device and that projects, on an enlarged scale, an image on the display device surface obliquely onto a screen surface with a projection optical system.

2. Description of Related Art

There have been growing demands for slimming-down of a rear projector. This slimming-down can be achieved by using a compact, wider-angle projection optical system and further providing configuration such that light exiting from the projection optical system is made incident obliquely on a screen at a relatively wide angle of incidence. As a projection optical system having a wide angle of incidence as described above, various types using one or a plurality of curved reflection surfaces have been suggested (for example, see Patent Documents 1 and 2). Using a rotationally symmetric aspherical surface or a rotationally asymmetric aspherical surface (so-called free curved surface) as a curved reflection surface permits ultra-wide angle projection which could have never been achieved with conventional coaxial refractive lenses.

[Patent Document 1] JP-A-2002-196413
[Patent Document 2] U.S. Pat. No. 6,805,447B2

In the rear projectors suggested in Patent Documents 1 and 2, for slimming-down thereof, the degree of oblique projection (angle of incidence on the screen) is increased with a nonaxisymmetric projection optical system, and a free curved surface is used in order to improve the projection performance. However, the use of a free curved surface in the nonaxisymmetric projection optical system results in occurrence of large pupil aberration. Typically, the screen is formed with a Fresnel lens and a lenticular lens. This Fresnel lens is arranged so that the pupil of the projection optical system conjugates with the pupil of an observer, or arranged so that a beam from the projection optical system is not vignetted by a black mask arranged near the image surface of the lenticular lens. Moreover, the Fresnel lens is typically designed to be rotationally symmetric for easier machining. Thus, pupil matching deteriorates between the Fresnel lens of a coaxial system and the projection optical system in which aberration such that the pupil position differs between the pupil vertical and horizontal directions occurs. This causes luminance nonuniformity on the image plane, and it is difficult to suppress the luminance nonuniformity with a usual refractive Fresnel lens.

SUMMARY OF THE INVENTION

In view of such circumstances, the present invention has been made, and it is an object of the invention to provide a slim rear projector with high performance and less luminance nonuniformity on the image plane attributable to pupil aberration of a projection optical system.

According to one aspect of the invention, a rear projector for performing image projection includes: a screen including a rotationally symmetric Fresnel lens; and a projection optical system which is nonaxisymmetric and makes a central principle ray incident obliquely on the screen in the image projection and which has at least one reflection surface formed of a rotationally asymmetric free curved surface. The Fresnel lens has aberration that cancels out pupil aberration of the projection optical system so that principal rays of beams exiting from the Fresnel lens become substantially parallel to each other.

DETAILED DESCRIPTION OF THE PREFERRED EMBODIMENTS

Hereinafter, the embodiments, etc. of a rear projector according to the present invention will be described with reference to the accompanying drawings. The rear projector according to the invention performs image projection with a nonaxisymmetric projection optical system so that a central principle ray (principle ray exiting from the image plane center of a display device and reaching the image plane center of a screen) is made incident obliquely on the screen. As a projection optical system arranged between the display device and the screen, various types can be assumed. Here, referring to four types of rear projectors as examples, their characteristic configuration will be described based on their optical configuration.

Figure 1:
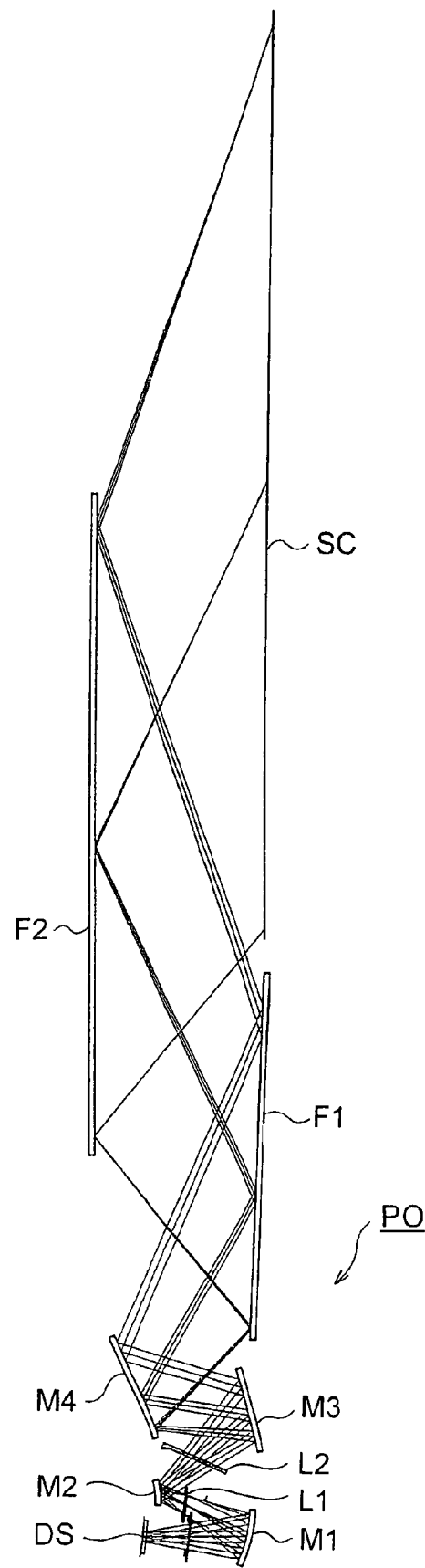
FIG. 1 is an optical path diagram showing an optical configuration example (Example 1) of a rear projector of Type 1.
Figure 2:
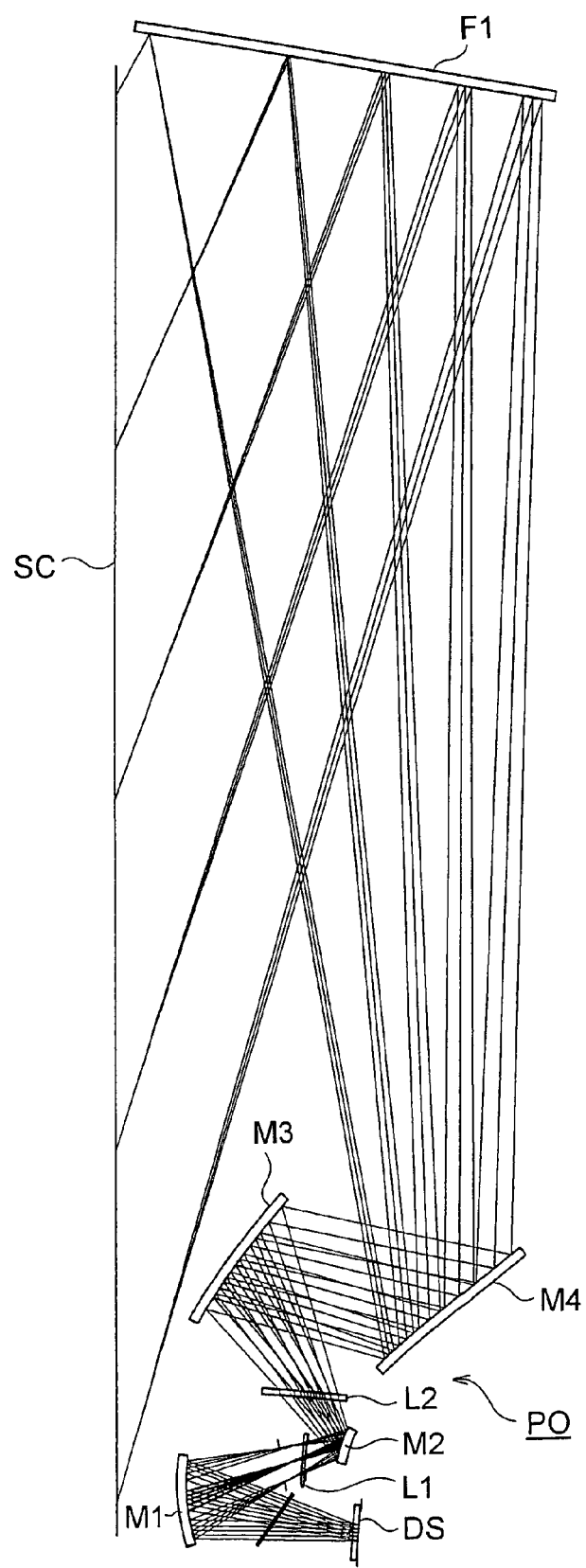
FIG. 2 is an optical path diagram showing an optical configuration example (Example 4) of a rear projector of Type 2.
Figure 3:
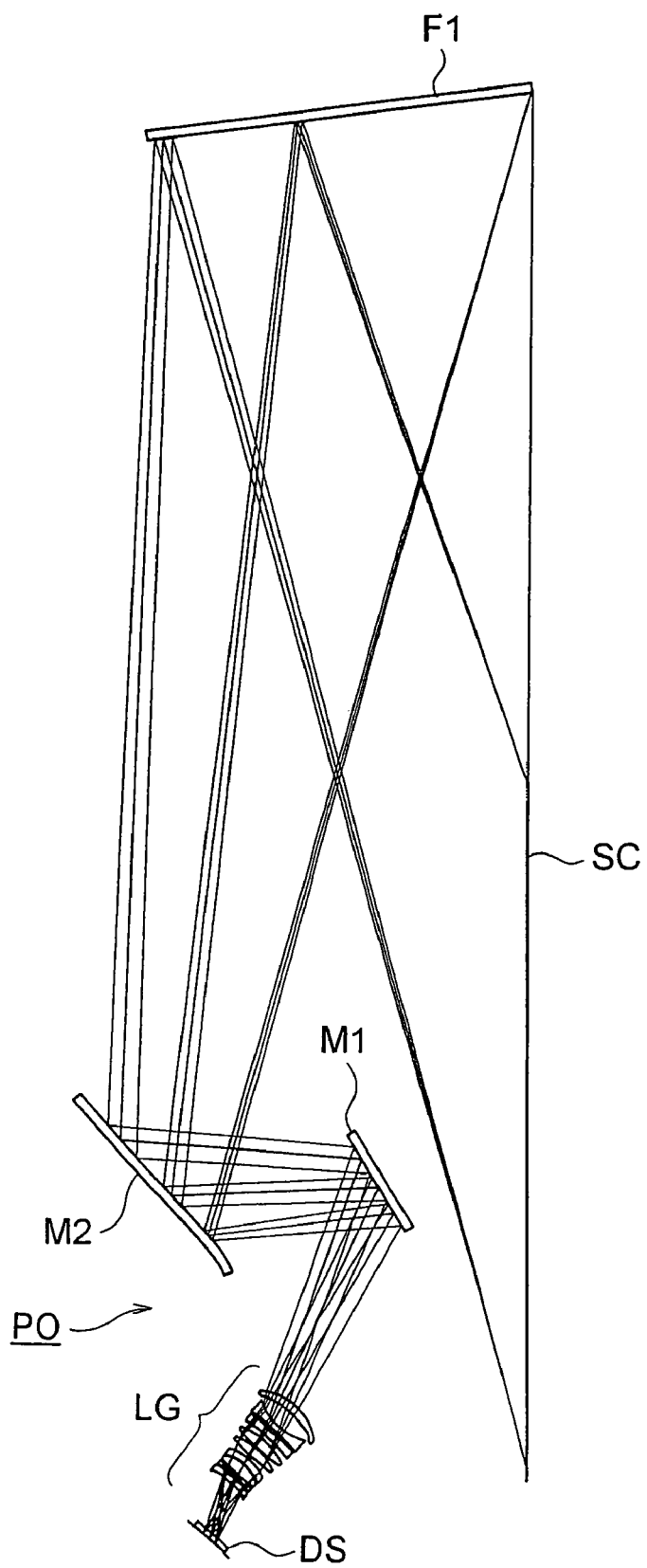
FIG. 3 is an optical path diagram showing an optical configuration example (Example 8) of a rear projector of Type 3.
Figure 4:
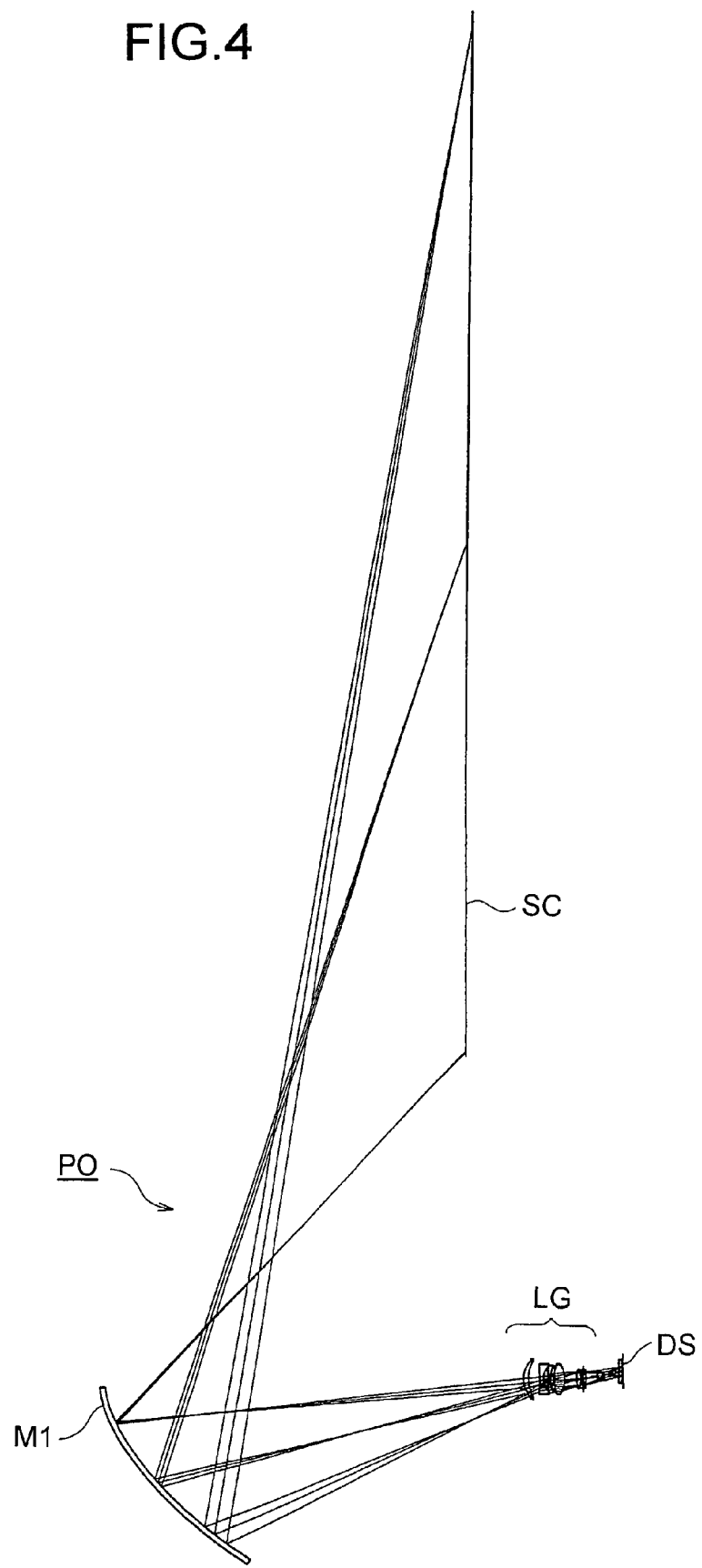
FIG. 4 is an optical path diagram showing an optical configuration example (Example 9) of a rear projector of Type 4.
Figure 5:
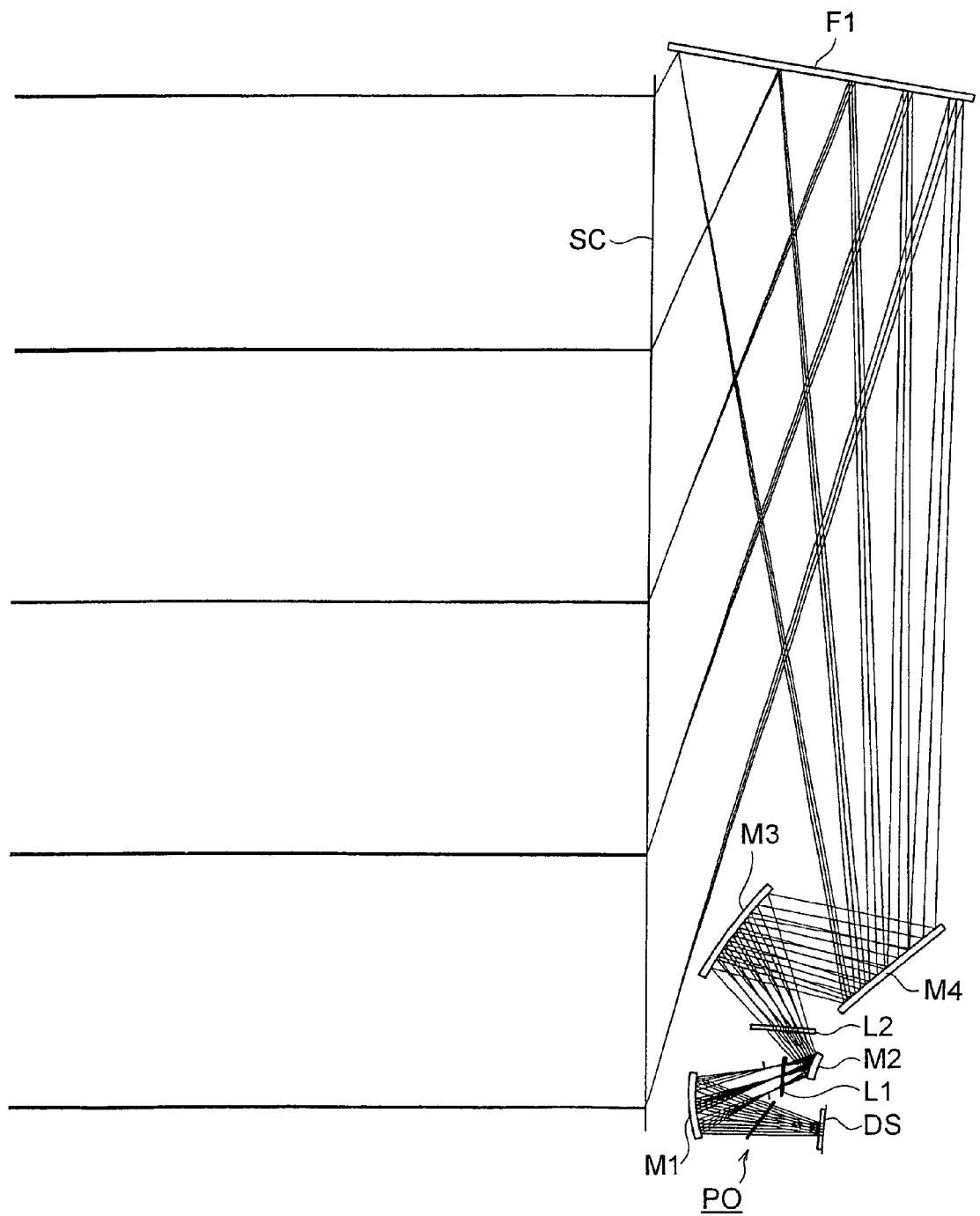
FIG. 5 is an optical path diagram showing an optical configuration example (Example 4) of the rear projector of Type 2 in short side cross section.
Figure 6:
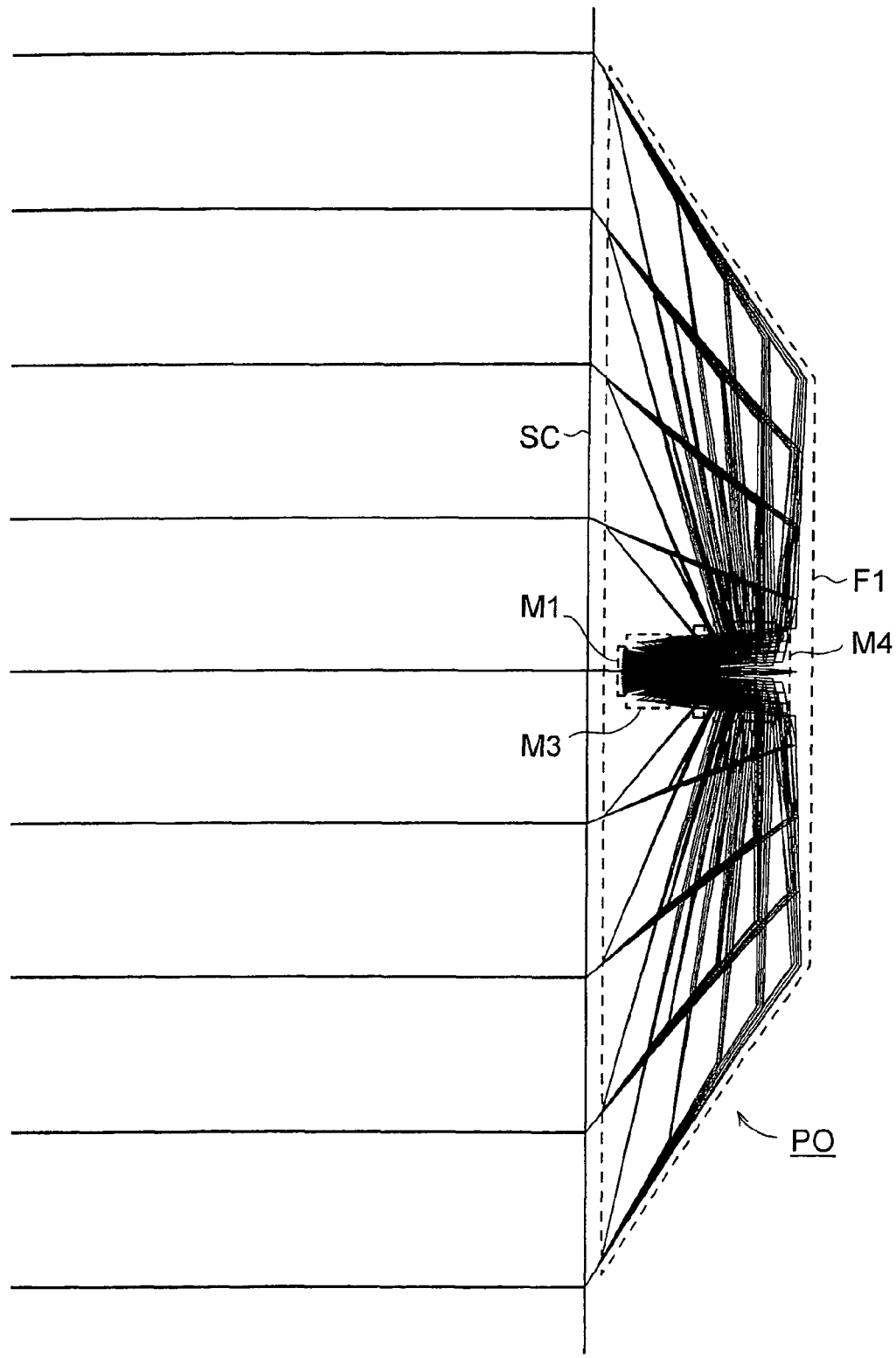
FIG. 6 is an optical path diagram showing an optical configuration example (Example 4) of the rear projector of Type 2 in long side cross section.

FIGS. 1 to 4 show optical configuration (optical arrangement, projection optical paths, etc.) of an entire projection optical path from a display device DS to a screen SC in the rear projectors of Types 1 to 4, respectively, in optical cross section (short side cross section) as viewed along a direction of the image plane long side of the display device DS. FIG. 5 shows optical configuration (optical arrangement, a projection optical path, etc.) of an entire projection optical path from a point at which light exits from the display device DS to a point at which the light exits from the screen SC in the rear projector of Type 2 in optical cross section (short side cross section) as viewed along a direction of the image plane long side of the display device DS. FIG. 6 shows the same optical configuration in optical cross section (long side cross section) as viewed along a direction of the image plane short side of the display device DS. That is, in an orthogonal coordinate system (x, y, z) where a direction of a normal line of the image plane of the display device DS is x-direction, the direction of the image plane short side of the display device DS is y-direction, and the direction of the image plane long side of the display device DS is z-direction, FIGS. 1 to 4 show the rear projectors of Types 1 to 4, respectively, in xy cross section, FIG. 5 shows the rear projector of Type 2 in xy cross section, and FIG. 6 shows the rear projector of Type 2 in xz cross section.

The rear projector of Type 1 has "four-mirror-double-bending" optical configuration using four curved mirrors M1 to M4 and two flat mirrors F1 and F2. The rear projector of Type 2 has "four-mirror-ceiling-bending" optical configuration using four curved mirrors M1 to M4 and one flat mirror F1. The rear projector of Type 3 has "two-mirror-ceiling-bending" optical configuration using two curved mirrors M1 and M2 and one flat mirror F1. The rear projector of Type 4 has "one-mirror-refocusing" optical configuration using one curved mirror M1 and one flat mirror F1. In the rear projectors of Types 1 to 3, a projection optical system PO is a nonaxisymmetric projection optical system that does not form an intermediate image. In the rear projector of Type 4, a projection optical system PO is a nonaxisymmetric projection optical system that forms an intermediate image. In the case of the rear projector of Type 4, an intermediate image formed by a refractive lens group LG is refocused by the first curved mirror M1, unlike the other types, a pupil is formed such that a ray whose angle of incidence on the screen SC is large approaches the screen SC side.

In any of these types of the rear projectors, the projection optical system PO has at least one reflection surface formed of a rotationally asymmetric free curved surface. The use of a free curved surface permits an improvement in the projection performance of the projection optical system and downsizing thereof, thus achieving a slim rear projector with a large screen. However, use of the free curved surface in a nonaxisymmetric projection optical system causes large pupil aberration as described above, deteriorating pupil matching and causing luminance nonuniformity on the image plane in typical screen configuration. Thus, the rear projector according to the invention is adapted to correct the pupil aberration possessed by the projection optical system PO with the screen SC.

Figure 8:
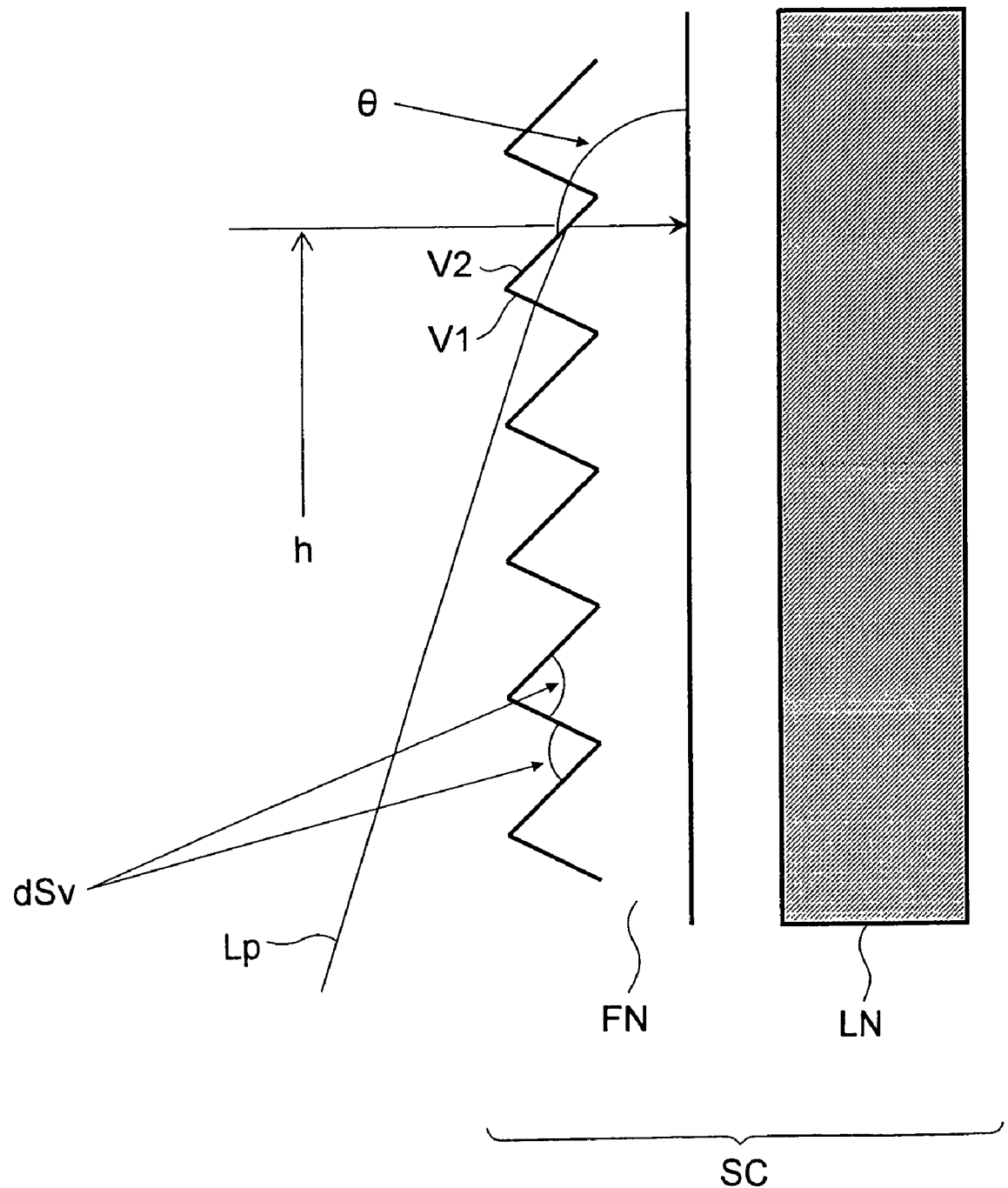
FIG. 8 is a sectional view showing a Fresnel lens forming the screen.

As screen structure having a rotationally symmetric Fresnel lens, various types can be applied. Here, as one example thereof, assume a case of a screen SC formed with a Fresnel lens FN and a lenticular lens LN as shown in FIG. 8. In FIG. 8, symbol θ represents a total reflection surface angle (angle formed by a total reflection surface V2 with respect to a flat surface, on the lenticular lens side, of the Fresnel lens FN), symbol dSv represents a cutting tool angle (either of angles is constant, and this constant angle is a cutting tool angle), and symbol h represents a Fresnel height (height from the Fresnel central axis).

A ray Lp exiting from the projection optical system PO enters the rotationally symmetric Fresnel lens FN at the Fresnel height h. In the case of a refractive Fresnel lens, one of surfaces forming the cutting tool angle does not act on the ray. In the case of a total-reflection-type Fresnel lens shown in FIG. 8, one surface V2 is used for total reflection and the other surface V1 is used for transmission upon incidence. Thus, characteristics of the Fresnel lens FN vary depending on the cutting tool angle. A beam whose optical path is bent by total reflection on the surface V2 exits from the Fresnel lens FN and then is diffused by the lenticular lens LN. With a larger cutting tool angle, abrasion and chipping at the cutting tool tip end are less likely to occur; therefore, the cutting tool angle is designed to be in a range of 45 to 90' in Examples to be described later.

In each of these types of rear projectors, the rotationally symmetric Fresnel lens FN included in the screen SC is adapted to have aberration that cancels out the pupil aberration of the projection optical system PO so that principal rays of beams exiting from the Fresnel lens FN become substantially parallel to each other. Thus, despite the use of a free curved surface in the projection optical system PO, the luminance nonuniformity on the image plane attributable to the pupil aberration of the projection optical system PO can be suppressed. Although the nonaxisymmetric projection optical system is likely to have larger pupil aberration than a typical refractive projection optical system, providing the Fresnel lens FN with aberration (more specifically, spherical aberration) permits canceling out the pupil aberration possessed by the projection optical system PO. At this point, for example, as shown in FIGS. 5 and 6, adapting principal rays of beams exiting from the Fresnel lens FN parallel to each other (that is, bending the beams exiting from the projection optical system PO by the Fresnel lens FN so that the principle rays thereof become substantially parallel to each other) permits achieving a rear projector with little luminance nonuniformity. Moreover, the rotationally symmetric Fresnel surface is easy to machine, which also permits cost reduction of the screen SC, thus contributing to cost reduction of the rear projector.

Therefore, as is the case with these types of rear projectors, it is preferable to configure a rear projector performing image projection with a nonaxisymmetric projection optical system such that the projection optical system has at least one reflection surface formed of a rotationally asymmetric free curved surface, a screen has a rotationally symmetric Fresnel lens, and the Fresnel lens has aberration canceling out pupil aberration of the projection optical system so that principal rays of beams exiting from the Fresnel lens become substantially parallel to each other. The Fresnel lens used is not limited to a total-reflection type Fresnel lens as shown in FIG. 8. For example, a hybrid type Fresnel lens (Fresnel lens having a hybrid structure with refractive Fresnel and total reflection Fresnel) may be used. Note, however, that the hybrid type Fresnel lens suffers from problems that its degree of difficulty in machining is high and ghost is likely to appear. Therefore, in terms of the capability of suppressing the appearance of ghost and so on, the use of the total-reflection type Fresnel lens is preferable.

Figure 9A:
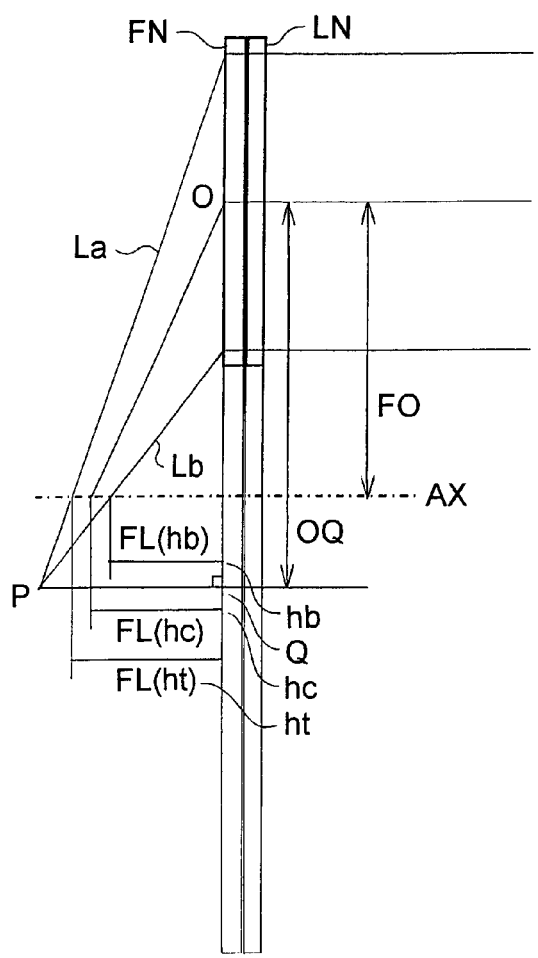
FIGS. 9A and 9B are sectional views illustrating parameters related to the screen.

As with the rear projectors of Types 1 to 3, in a case where a nonaxisymmetric projection optical system that does not form an intermediate image is included, the correction of the pupil aberration described above can be more efficiently performed if the amount of offset of the Fresnel center from the screen image plane center satisfies a predetermined condition. For example, as shown in FIG. 9A, where within a plane including a central principal ray immediately before reaching the screen and a normal line of the screen at a point which this ray reaches, an intersection of the central principal ray and the screen is O, an intersection of an extension line La, from the screen direction, of a principal ray of a beam incident on the screen at a largest angle of incidence and an extension line Lb, from the screen direction, of a principal ray of a beam incident on the screen at a smallest angle of incidence is P, an intersection of a perpendicular line drawn from the intersection P to an extension surface of the screen surface and the extension surface of the screen surface is Q, and the amount of offset of the Fresnel lens FN (distance from the screen center to the rotation symmetry center of the Fresnel lens FN) is FO, it is preferable that conditional formula (1) below be satisfied:

$$FO<OQ \qquad (1).$$

Satisfying the conditional formula (1) can efficiently correct the pupil aberration of the nonaxisymmetric projection optical system, which aberration is otherwise likely to be large. Thus, a rear projector with even less luminance nonuniformity can be achieved. Moreover, a smaller amount of offset brings about the advantage that the Fresnel lens is easier to machine. Therefore, failure to satisfy the conditional formula (1) by the rear projector having a nonaxisymmetric projection optical system that does not form an intermediate image results in difficulties in correcting the pupil aberration described above and machining the Fresnel lens.

It is further preferable that conditional formula (1a) below be satisfied:

$$0.6<FO/OQ<0.9 \qquad (1a).$$

Satisfying the conditional formula (1a) can more efficiently correct the pupil aberration of the nonaxisymmetric projection optical system. Thus, a rear projector with even less luminance nonuniformity can be achieved.

Figure 9B:
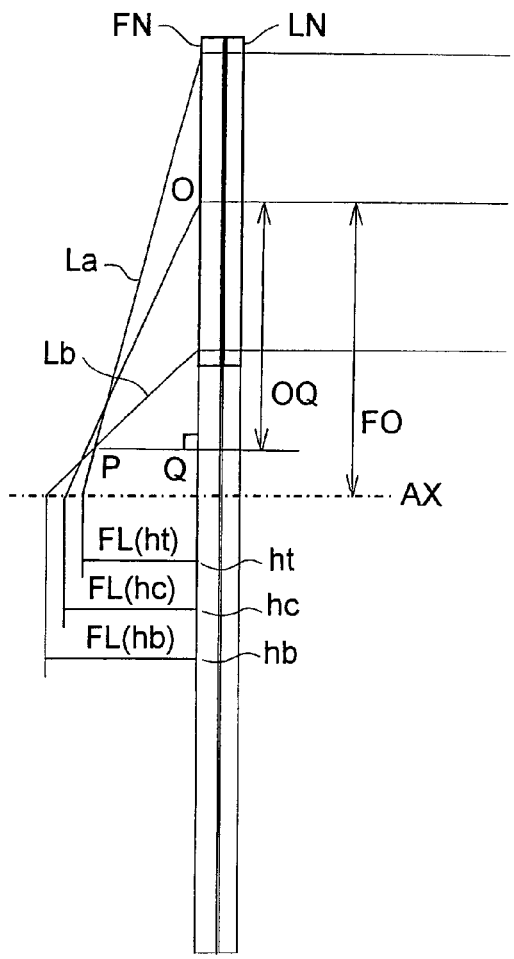

As with the rear projector of Type 4, in a case where a nonaxisymmetric projection optical system that forms an intermediate image is included, the correction of the pupil aberration described above can be more efficiently performed if the amount of offset of the Fresnel center from the screen image plane center satisfies a predetermined condition. For example, as shown in FIG. 9B, where within a plane including a central principal ray immediately before reaching the screen and a normal line of the screen at a point which this ray reaches, an intersection of the central principal ray and the screen is O, an intersection of an extension line La, from the screen direction, of a principal ray of a beam incident on the screen at a largest angle of incidence and an extension line Lb, from the screen direction, of a principal ray of a beam incident on the screen at a smallest angle of incidence is P, an intersection of a perpendicular line drawn from the intersection P to an extension surface of the screen surface and the extension surface of the screen surface is Q, and the amount of offset of the Fresnel lens FN (distance from the screen center to the rotation symmetry center of the Fresnel lens FN) is FO, it is preferable that conditional formula (2) below be satisfied:

$$OQ<FO \qquad (2).$$

Satisfying the conditional formula (2) can efficiently correct the pupil aberration of the nonaxisymmetric projection optical system, which aberration is otherwise likely to be large. Thus, a rear projector with even less luminance non- uniformity can be achieved. Therefore, failure to satisfy the conditional formula (2) by the rear projector having a nonaxisymmetric projection optical system that forms an intermediate image results in difficulties in correcting the pupil aberration described above.

It is further preferable that conditional formula (2a) below be satisfied:

$$1.1<FO/OQ<1.4 \qquad (2a).$$

Satisfying the conditional formula (2a) can more efficiently correct the pupil aberration of the nonaxisymmetric projection optical system. Thus, a rear projector with even less luminance nonuniformity can be achieved.

Figure 10A:
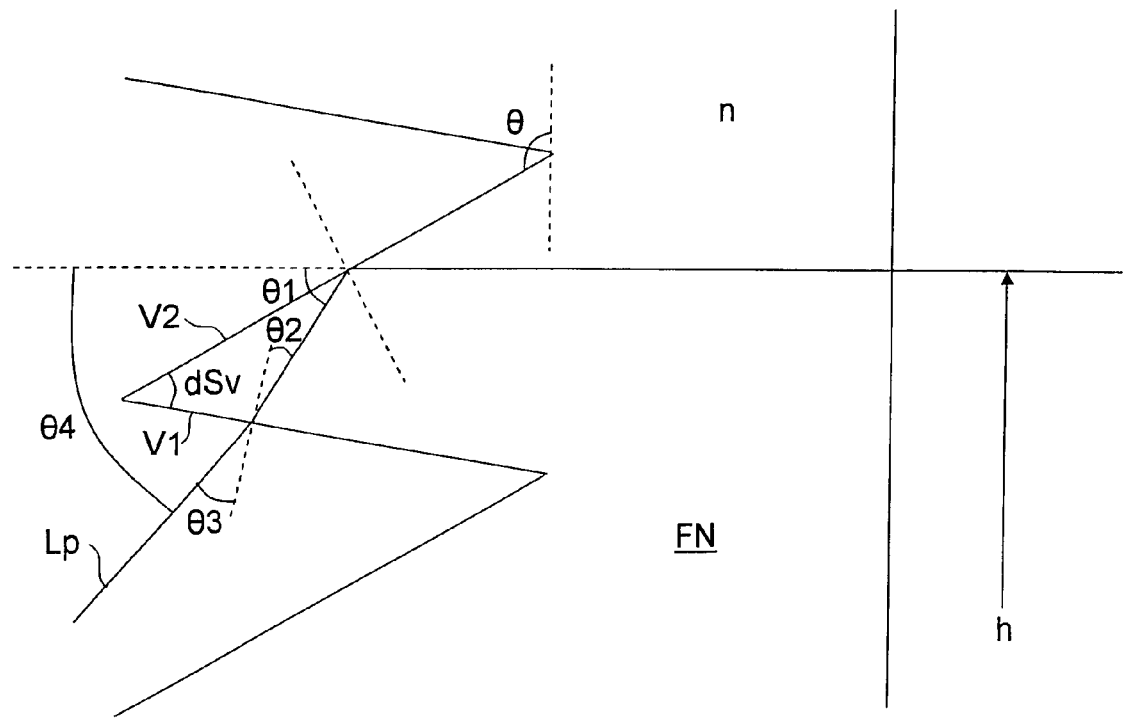
FIGS. 10A and 10B are diagrams illustrating correspondence between a Fresnel height h, a total reflection surface angle θ, and a focal length FL.
Figure 10B:
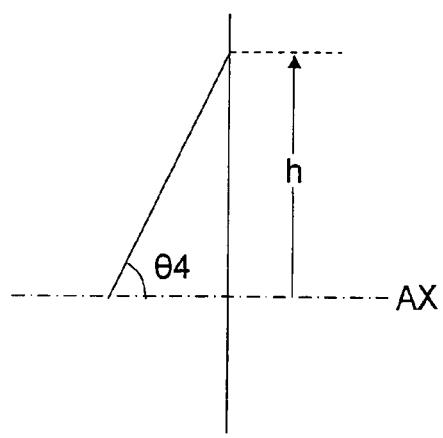
Figure 11:
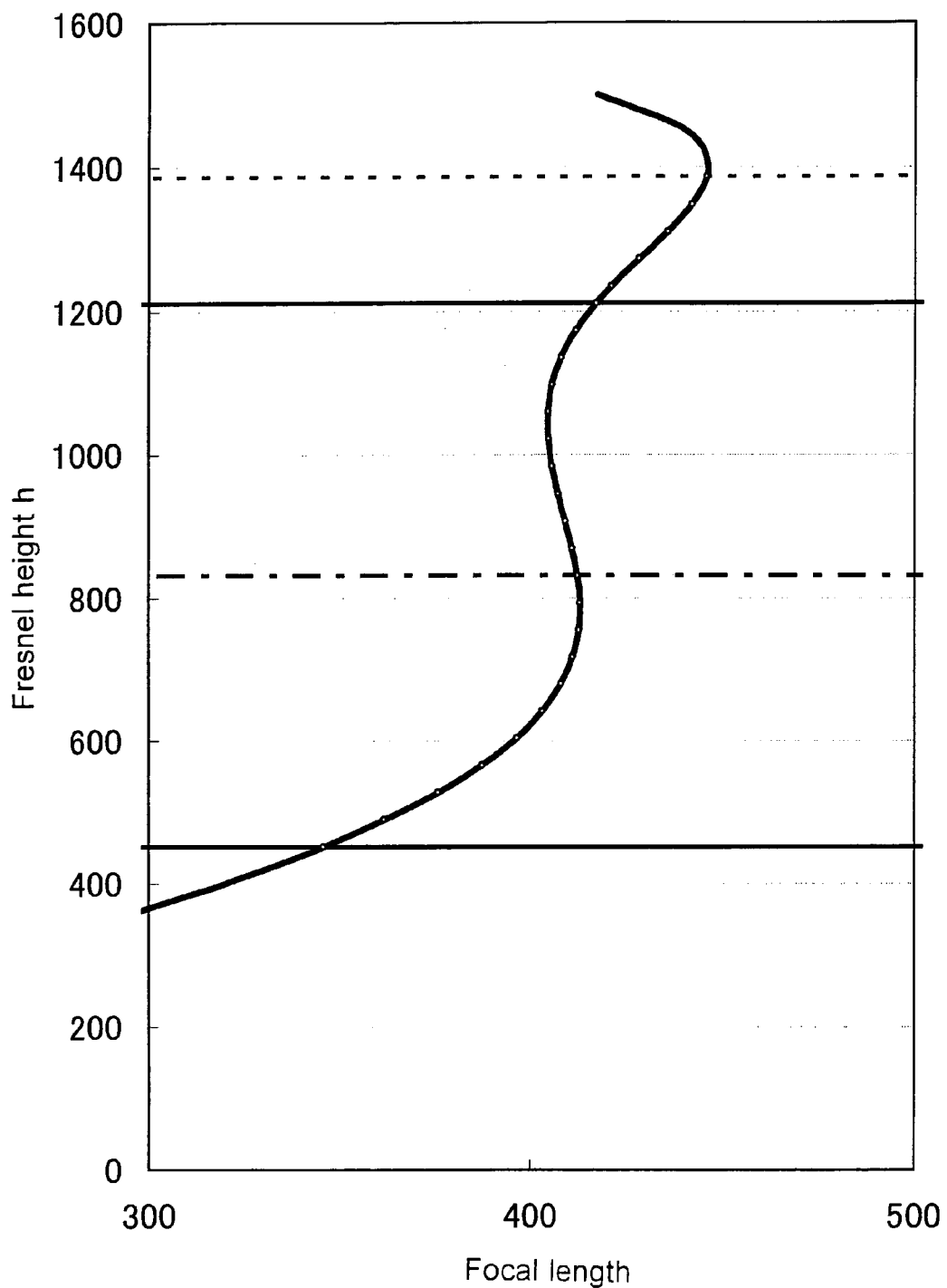
FIG. 11 is a graph showing a relationship between a Fresnel height h and a focal length FL in a Fresnel lens of Example 1.
Figure 12:
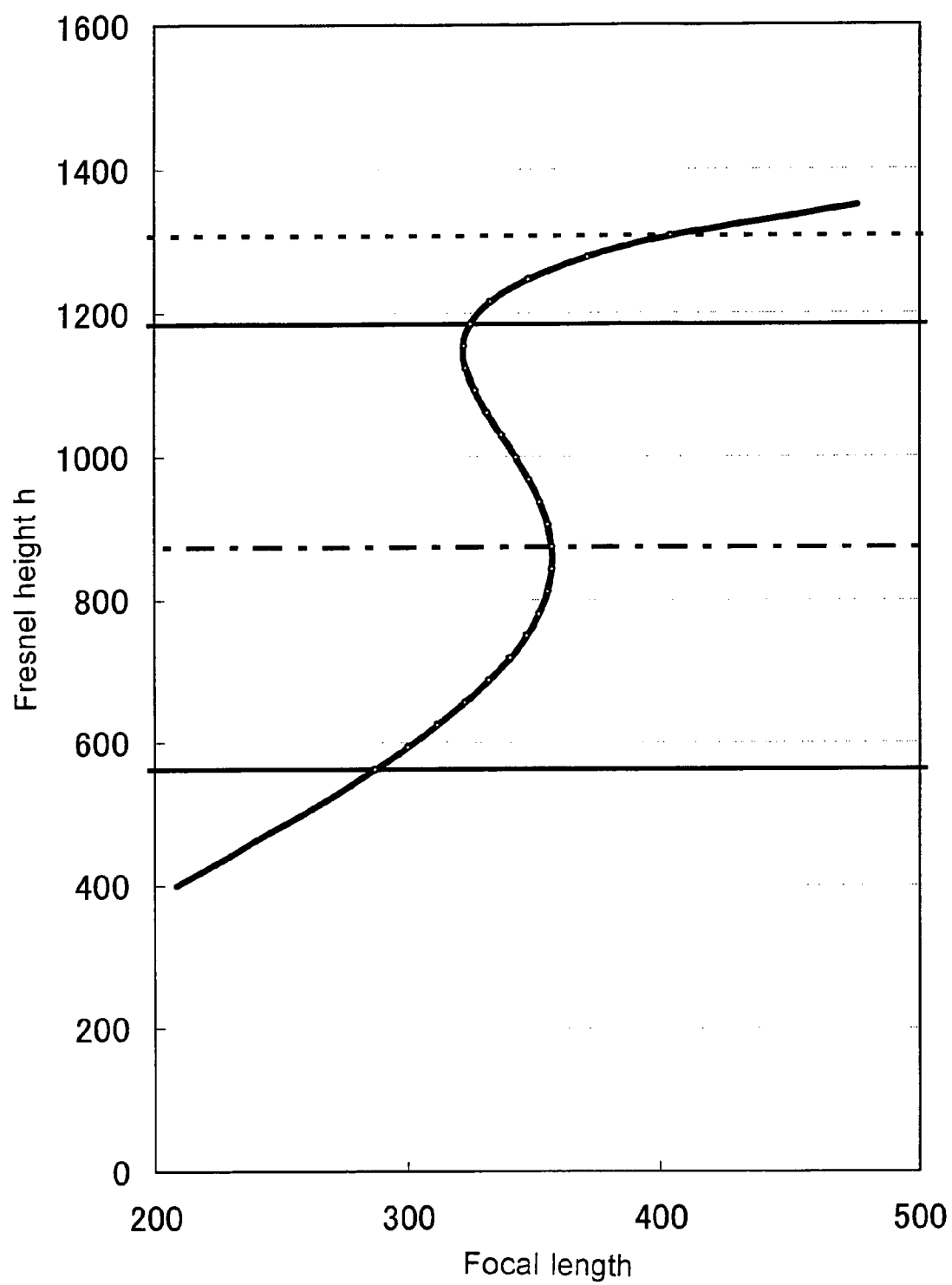
FIG. 12 is a graph showing a relationship between a Fresnel height h and a focal length FL in a Fresnel lens of Example 2.
Figure 13:
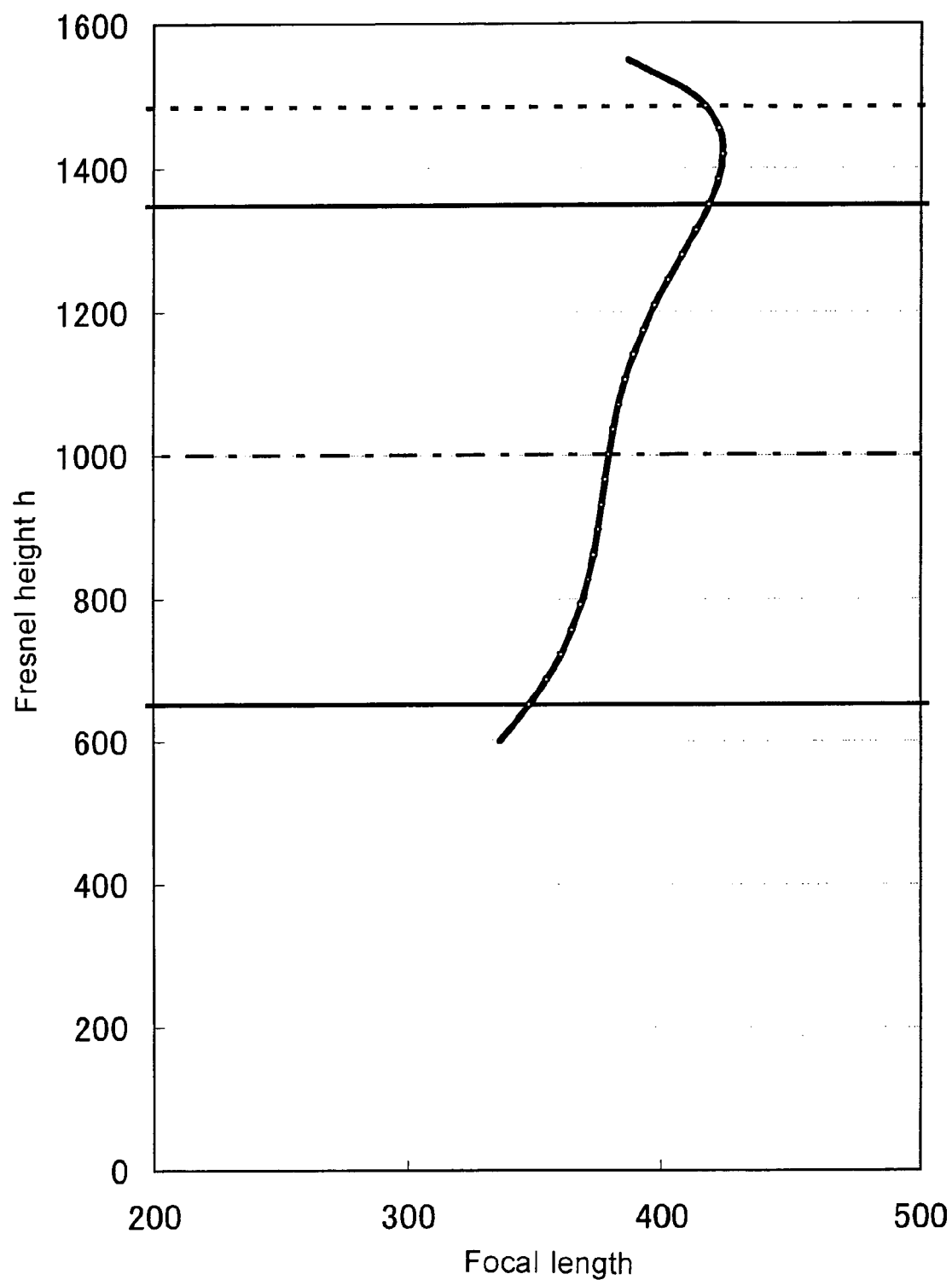
FIG. 13 is a graph showing a relationship between a Fresnel height h and a focal length FL in a Fresnel lens of Example 3.
Figure 14:
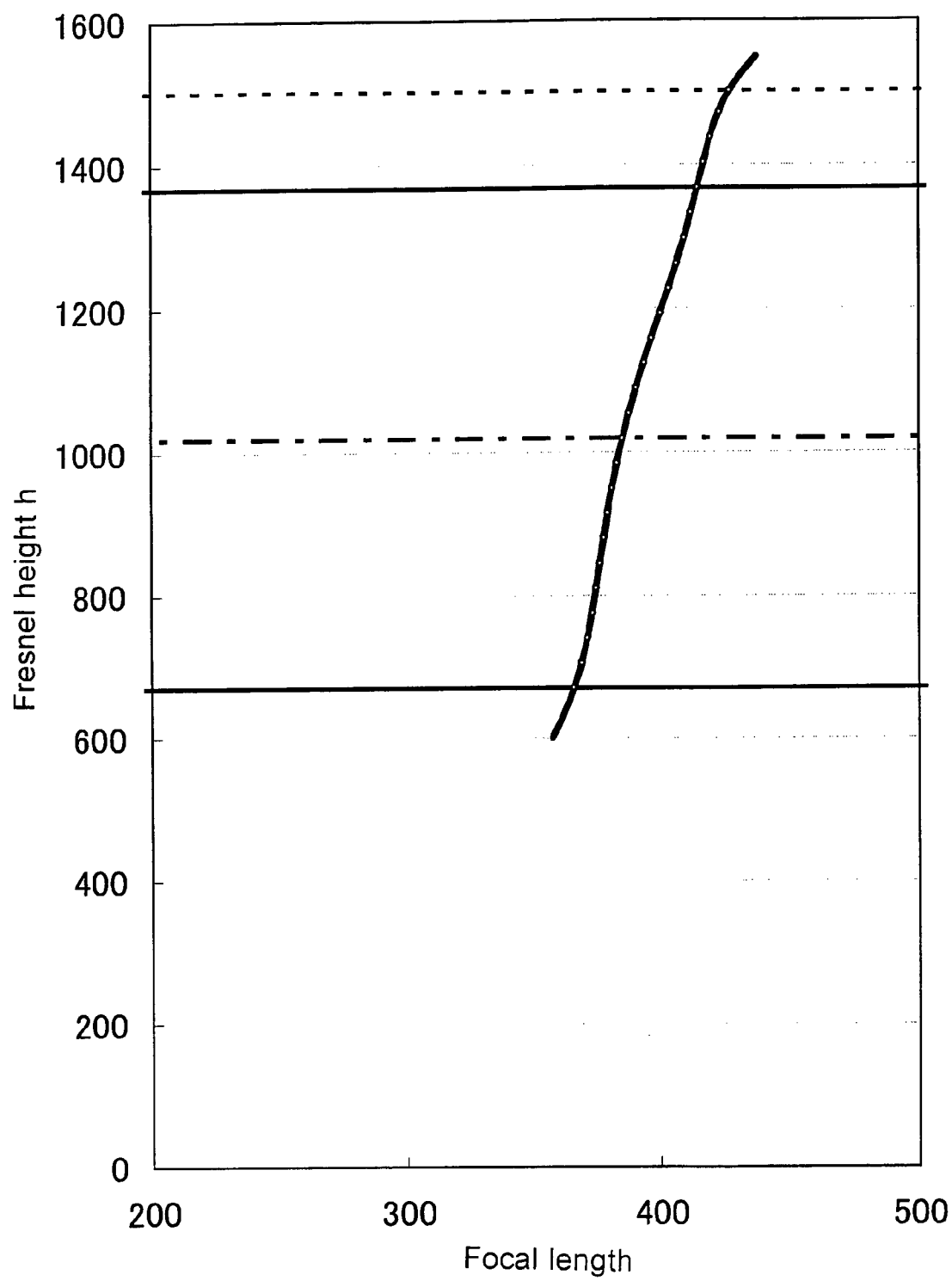
FIG. 14 is a graph showing a relationship between a Fresnel height h and a focal length FL in a Fresnel lens of Example 4.
Figure 15:
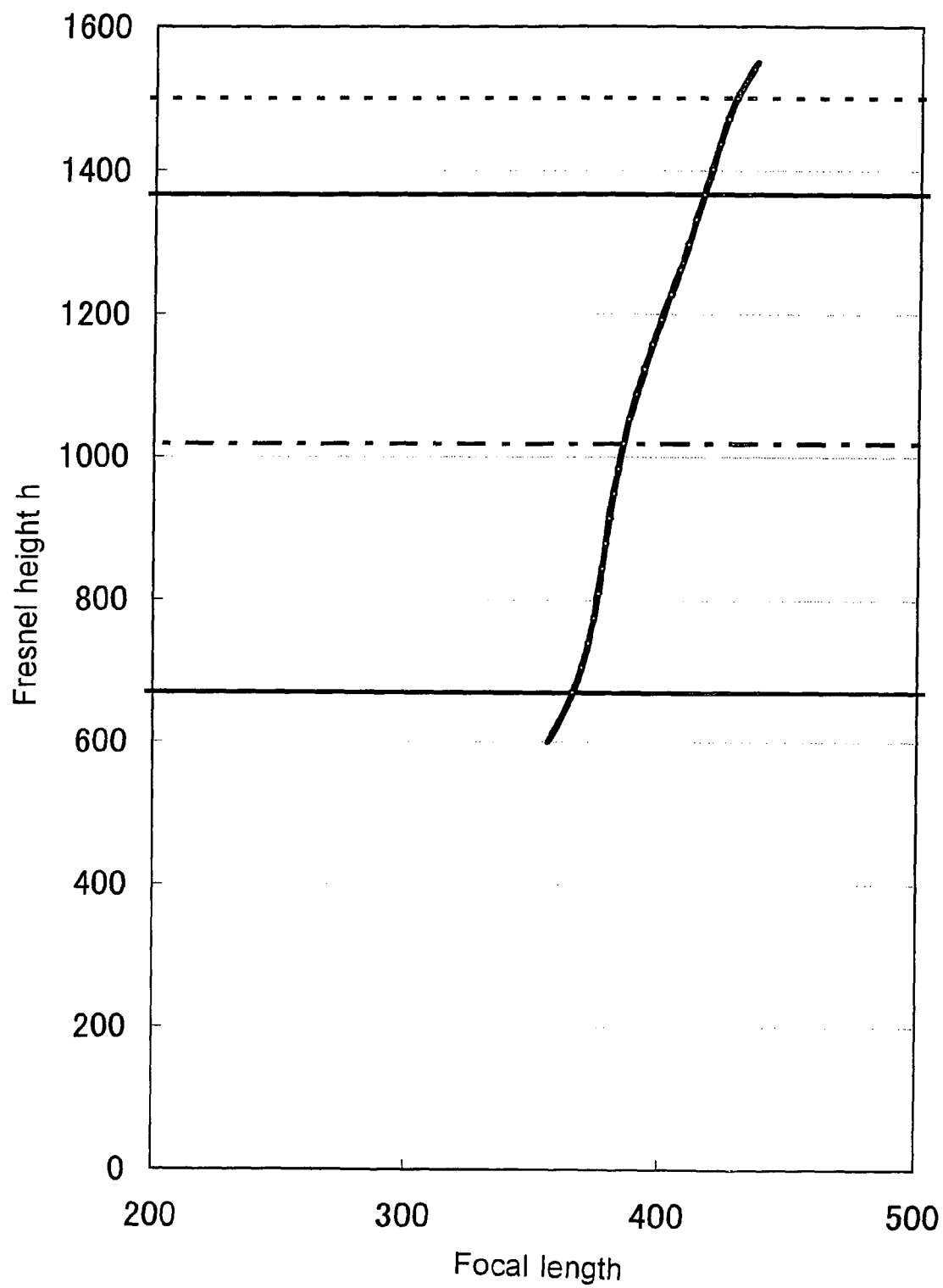
FIG. 15 is a graph showing a relationship between a Fresnel height h and a focal length FL in a Fresnel lens of Example 5.
Figure 16:
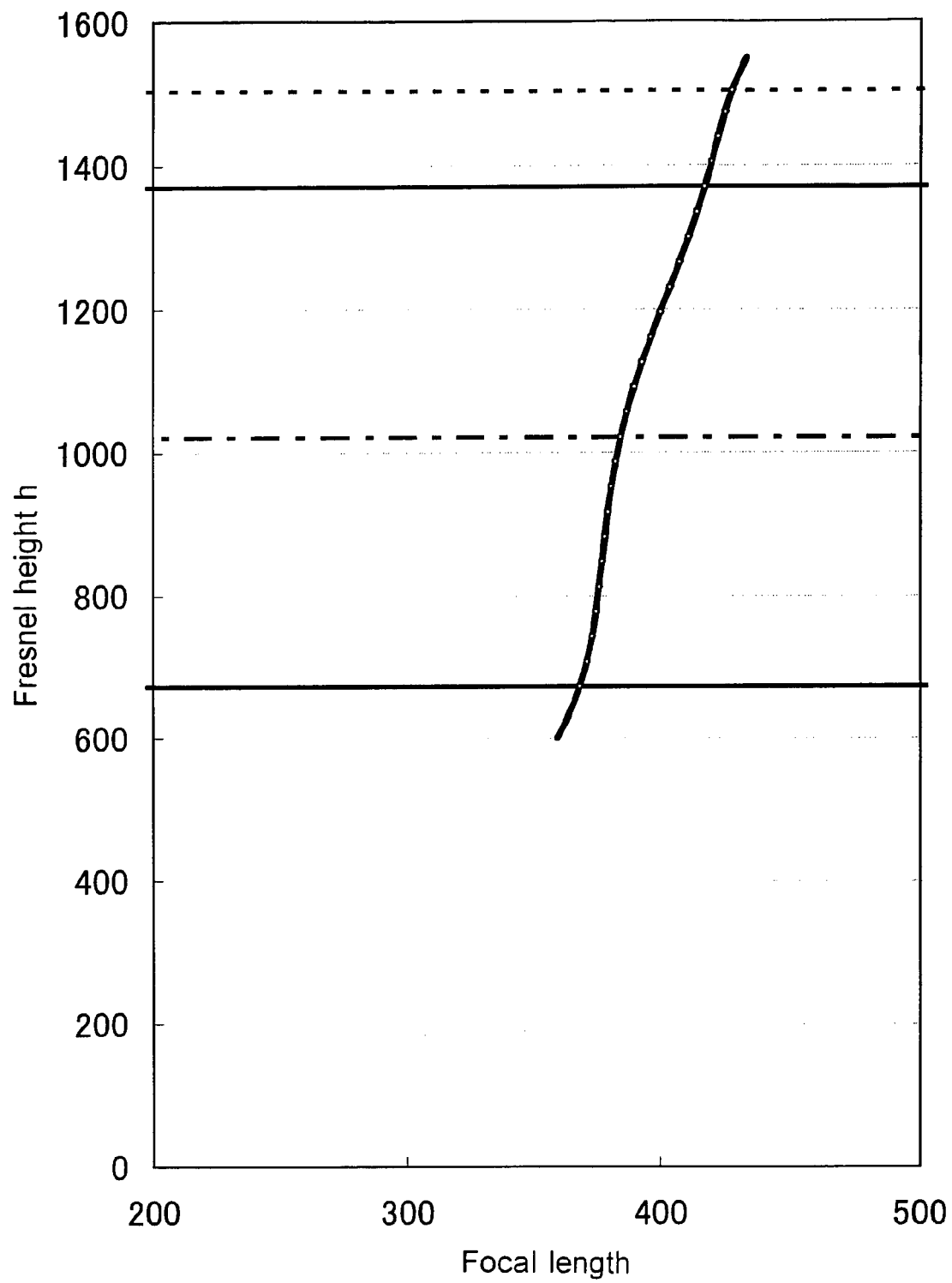
FIG. 16 is a graph showing a relationship between a Fresnel height h and a focal length FL in a Fresnel lens of Example 6.
Figure 17:
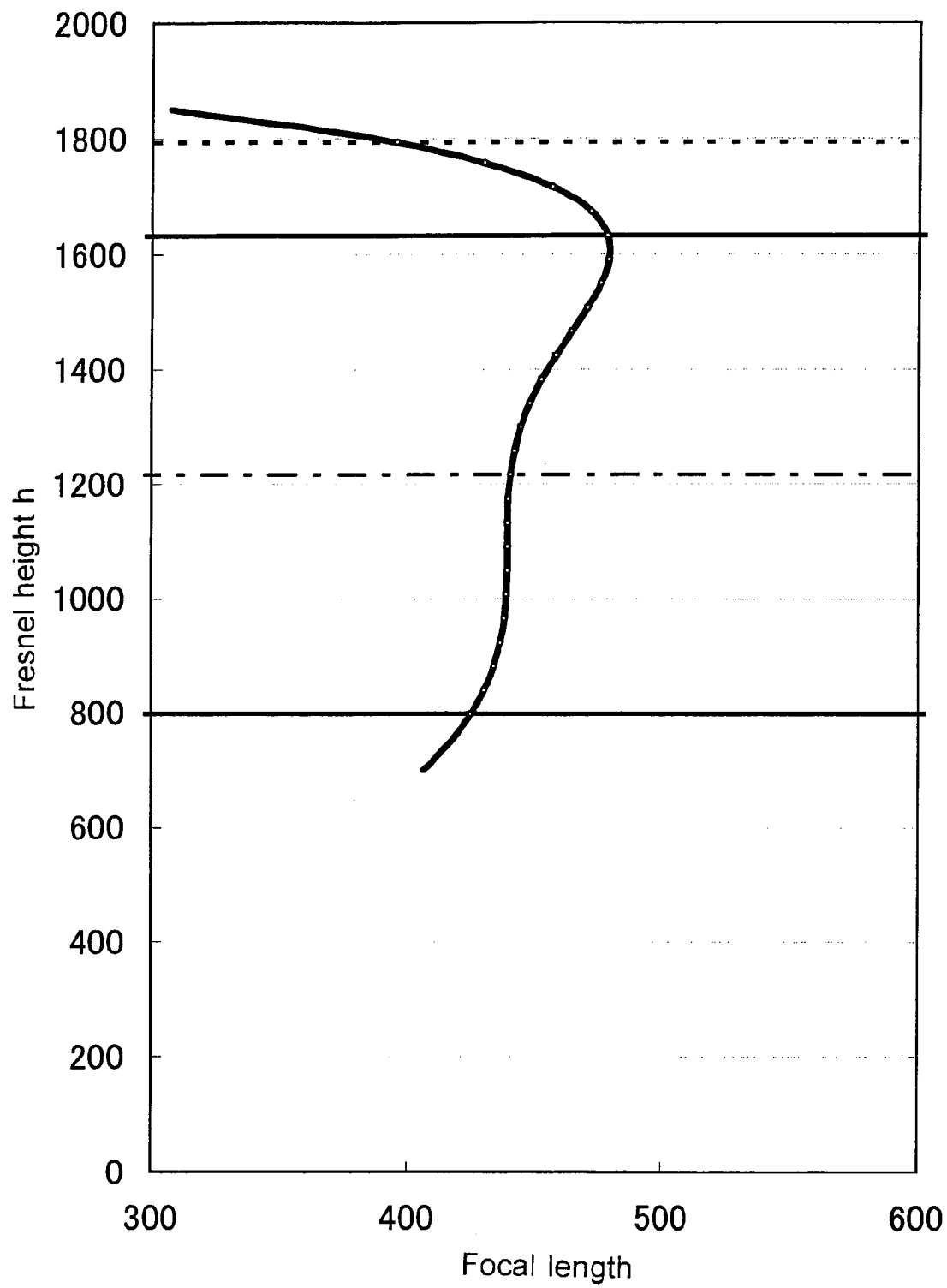
FIG. 17 is a graph showing a relationship between a Fresnel height h and a focal length FL in a Fresnel lens of Example 7.
Figure 18:
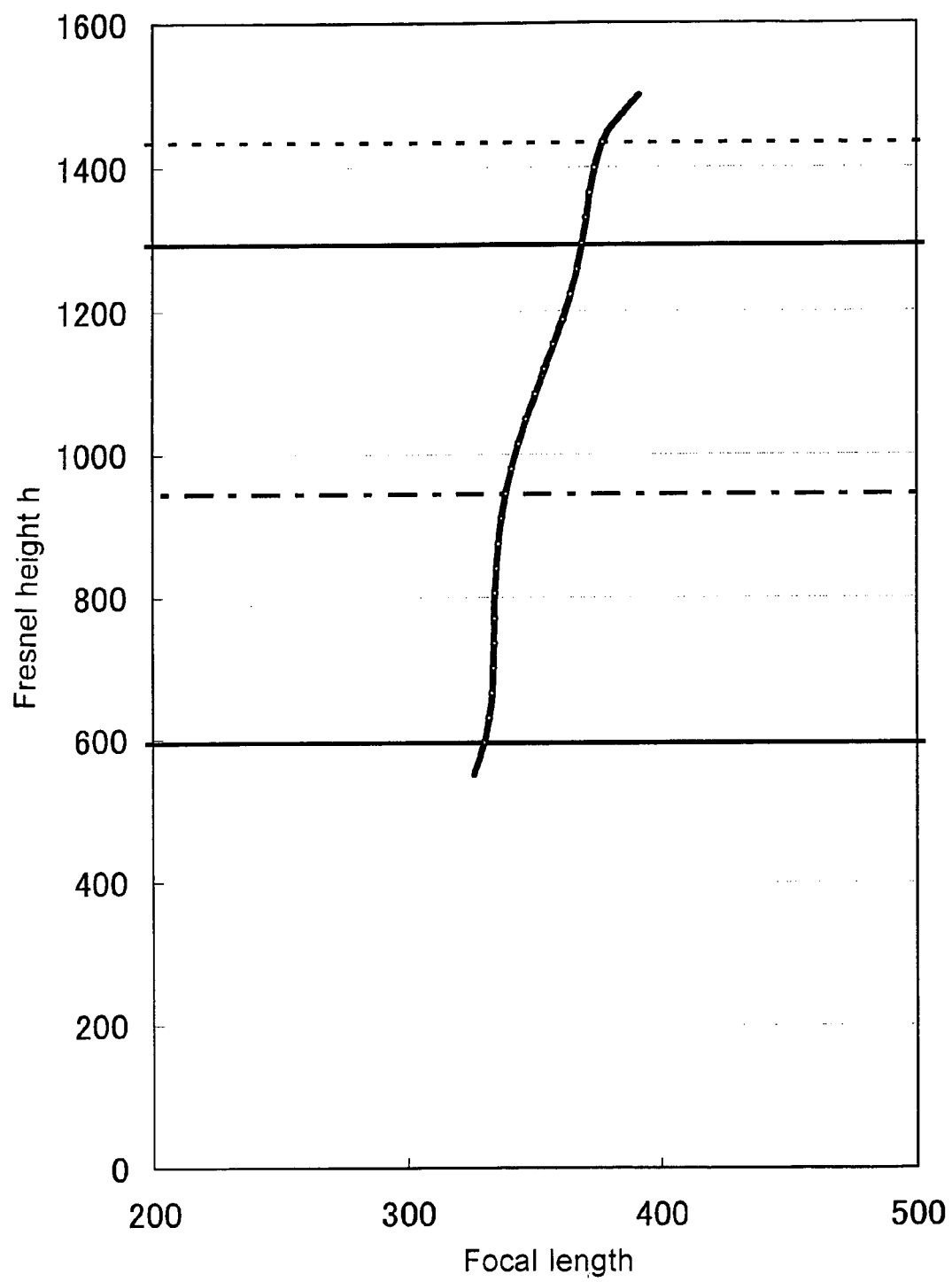
FIG. 18 is a graph showing a relationship between a Fresnel height h and a focal length FL in a Fresnel lens of Example 8.
Figure 19:
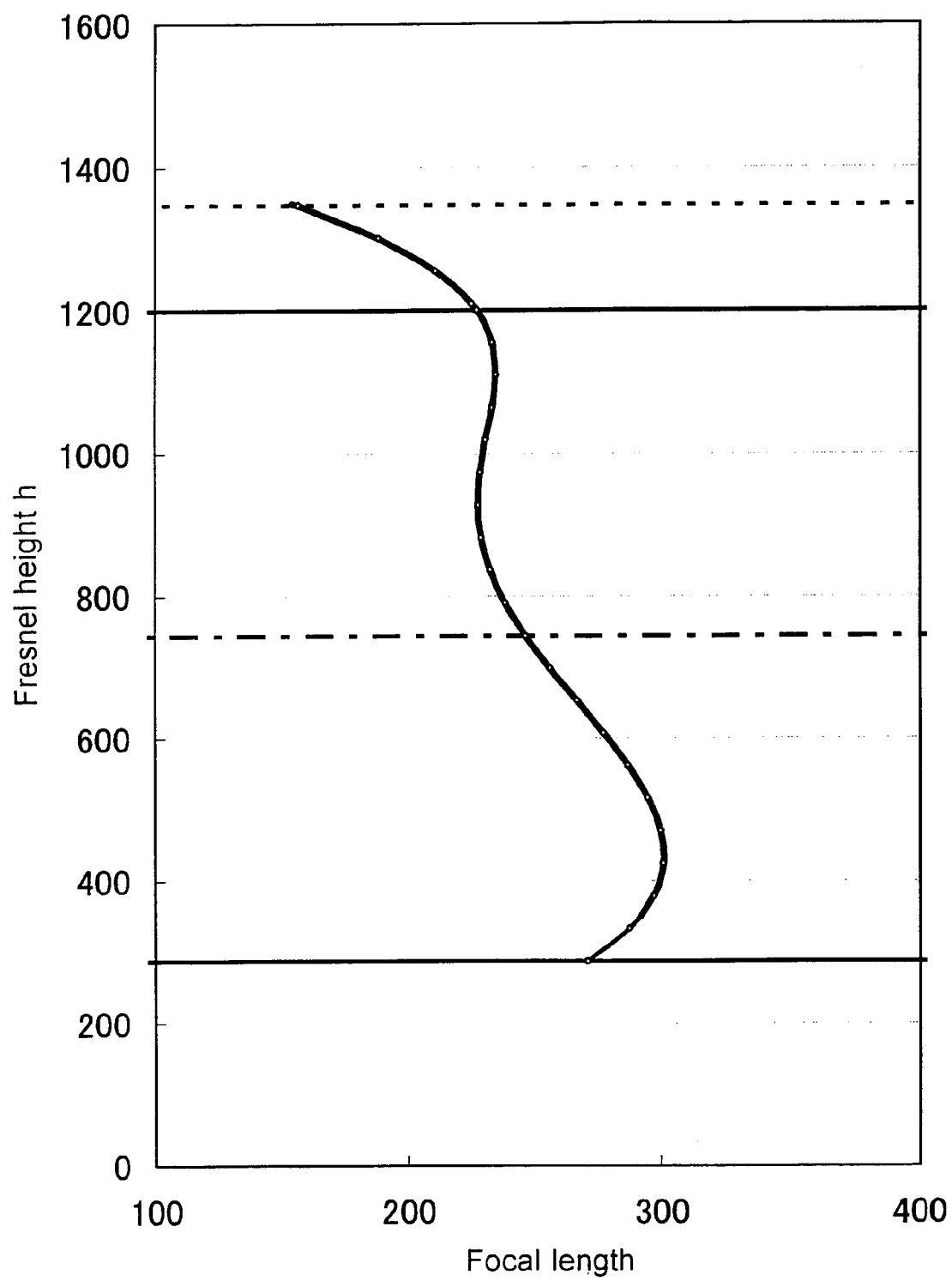
FIG. 19 is a graph showing a relationship between a Fresnel height h and a focal length FL in a Fresnel lens of Example 9.

As described above, to cancel out the pupil aberration of the projection optical system PO with focusing characteristics of the Fresnel lens FN of the screen SC so that light efficiently exits from the screen SC, preferable configuration is such that the focal length varies in accordance with the Fresnel height h (for example, configuration such that the position of focusing by the Fresnel lens FN separates further from the screen SC with a larger angle of incidence). This means that when the focal length of the Fresnel lens FN is defined with respect to the image plane center, spherical aberration in accordance with the Fresnel height h is caused. Moreover, the focal length of the Fresnel lens FN is dependent on the total reflection surface angle θ, the cutting tool angle dSv, the Fresnel height h, and a refractive index n of the Fresnel lens FN. Thus, for example, configuration such that the total reflection surface angle θ varies in accordance with the Fresnel height h can achieve the configuration of the Fresnel lens FN described above.

Where the focal length of the Fresnel lens FN is FL, relationships with the total reflection surface angle θ, etc. can be drawn as described below. Note that, as shown in FIG. 10A, the angle of incidence of the ray Lp on the Fresnel lens FN is θ4, the angle of incidence of the ray Lp on the refractive surface V1 is θ3, the exit angle of the ray Lp from the refractive surface V1 is θ2, and the angle of incidence of the ray Lp on the Fresnel lens FN upon its incidence on the total reflection surface V2 is θ1. As shown in FIG. 10B, the angle θ4 is an angle of incidence of the ray Lp on the Fresnel lens FN at the Fresnel height h (height from the Fresnel central axis AX).

$$\theta 1=(\theta-90)\times 2=2\theta-180,$$

$$\theta 2=\theta-dSv+90-(\theta 1+90)=180-\theta-dSv,$$

Based on Snell's law, $$\sin\theta 3=n\cdot\sin\theta 2=n\cdot\sin(180-\theta-dSv)=n\cdot\sin(\theta+dSv),$$

$$\theta 3=\arcsin(n\cdot\sin(\theta+dSv)),$$

$$\theta 4=\theta-dSv-\theta 3=\theta-dSv-\arcsin(n\cdot\sin(\theta+dSv)),$$

which provides conditional formula below:

$$FL=h/\tan\theta 4=h/\tan(\theta-dSv-\arcsin(n\cdot\sin(\theta+dSv))).$$

As with the rear projectors of Types 1 to 3, in a case where a nonaxisymmetric projection optical system that does not form an intermediate image is included, the correction of the pupil aberration described above can be even more efficiently performed if a change in the focal length in accordance with the Fresnel height h satisfies a predetermined condition, focusing on the amount of spherical aberration in accordance with the Fresnel height h. For example, as shown in FIG. 9A, where the focal length at the Fresnel height hc corresponding to the display image plane center of the screen is FL(hc), within a plane including a central principal ray immediately before reaching the screen and a normal line of the screen at a point which this ray reaches, the focal length, at the Fresnel height hb, of a principal ray of a beam incident on the screen at a smallest angle of incidence is FL(hb), the focal length, at the Fresnel height ht, of a principal ray of a beam incident on the screen at a largest angle of incidence is FL(ht), a largest focal length and a smallest focal length over the entire screen are FLmax and FLmin, respectively, it is preferable that conditional formulae (3) and (4) below be satisfied:

$$|(FLmax-FLmin)/FL(hc)|>0.1 \quad (3),$$

$$FL(ht)>FL(hb) \quad (4).$$

As with the rear projector of Type 4, in a case where a nonaxisymmetric projection optical system that forms an intermediate image is included, the correction of the pupil aberration described above can be even more efficiently performed if a change in the focal length in accordance with the Fresnel height h satisfies a predetermined condition, focusing on the amount of spherical aberration in accordance with the Fresnel height h. For example, as shown in FIG. 9B, where the focal length at the Fresnel height hc corresponding to the display image plane center of the screen is FL(hc), within a plane including a central principal ray immediately before reaching the screen and a normal line of the screen at a point which this ray reaches, the focal length, at the Fresnel height hb, of a principal ray of a beam incident on the screen at a smallest angle of incidence is FL(hb), the focal length, at the Fresnel height ht, of a principal ray of a beam incident on the screen at a largest angle of incidence is FL(ht), the largest focal length and the smallest focal length over the entire screen are FLmax and FLmin, respectively, it is preferable that conditional formulae (3) and (5) below be satisfied:

$$|(FLmax-FLmin)/FL(hc)|>0.1 \quad (3),$$

$$FL(ht)<FL(hb) \quad (5).$$

The conditional formula (3) indicates that spherical aberration (at the top and bottom of the image plane) when normalized by the focal length of the display image plane center of the screen is 10% or more and the aforementioned pupil aberration which has occurred to a great degree accordingly is corrected. Therefore, satisfying the conditional formula (3) in addition to the conditional formula (4) or (5) that is in accordance with the presence or absence of an intermediate image formed by the projection optical system permits even more efficient correction of the pupil aberration, while failure to satisfy the conditional formula (3) results in difficulties in correcting the pupil aberration described above.

It is preferable that conditional formula (6) below be satisfied:

$$40°<\theta min \quad (6),$$

where θmin is a minimum angle of incidence on the screen.

Satisfying the conditional formula (6) permits use of a total-reflection type Fresnel lens over the entire image plane. That is, use of any special screen (for example, screen formed of a hybrid Fresnel lens) is not required, which permits cost reduction of the screen, thus contributing cost reduction of the rear projector.

It is preferable that conditional formula (7) below be satisfied:

$$70°<\theta max<85° \quad (7),$$

where θmax is a maximum angle of incidence on the screen.

Exceeding a lower limit of the conditional formula (7) results in difficulties in slimming-down the rear projector and also providing it with a larger screen. Exceeding an upper limit of the conditional formula (7) results in an increase in the screen installation accuracy and required accuracies such as flatness. Therefore, satisfying the conditional formula (7) permits slimming-down the rear projector and also providing it with a larger screen, and also permits controlling the screen installation accuracy and required accuracies such as flatness low.

EXAMPLES

Hereinafter, optical configuration of the rear projector of the present invention will be further described in detail, with construction data and other data. Example 1, Examples 2 to 7, Example 8, and Example 9 presented below are numerical examples corresponding to the rear projectors of Types 1 to 4, respectively, described hereinbefore, and therefore the optical configuration diagrams (FIGS. 1 to 6) of the rear projectors of Types 1 to 4 show the corresponding optical configuration, projection optical paths, etc. of Examples 1, 4, 8, and 9. The construction data of the Examples indicate optical arrangement of a system including a display device surface So on the reduction side (corresponding to an object surface in enlarged projection) to a screen Si on the enlargement side (corresponding to an image surface in the enlarged projection), and the n-th surface counted from the reduction side is Sn (n=1, 2, 3, ...). Surfaces S1 and S2 are both surfaces of cover glass for covering the display device surface So, and do not form part of the projection optical system PO.

The arrangement of each optical surface is, where its vertex is an origin (O) of a local orthogonal coordinate system (X, Y, Z), expressed by the origin (O) of the local orthogonal coordinate system (X, Y, Z) in a global orthogonal coordinate system (x, y, z) and coordinate data (x, y, z) of coordinate axes vector (VX, VY) of X-axis and Y-axis (in mm). Note that the coordinate systems are all defined by a right-handed system, and that the global orthogonal coordinate system (x, y, z) is an absolute coordinate system in agreement with a local orthogonal coordinate system (X, Y, Z) of the display device surface So. Therefore, an origin (o) in the global orthogonal coordinate system (x, y, z) is a point identical to an origin (O) located at the center of the display device surface So. The vector VX on the display device surface So is parallel to a surface normal line of the display device surface So. The vector VY is orthogonal to the vector VX and parallel to the image plane short side of the display device surface So. For the optical surfaces forming part of a coaxial optical system with an optical surface expressed by coordinate data (x, y, z) serving as a leading surface, their arrangement is expressed by axial distance T' (mm) in the X-direction with reference to an immediately preceding optical surface.

The surface shape of each optical element is expressed by a curvature C0 (mm$^{-1}$), a radius of curvature r (mm), etc. of its optical surface For example, a surface Sn marked with symbol * is a rotationally symmetric aspherical surface, and its surface shape is expressed by formula (AS) below employing a local orthogonal coordinate system (X, Y, Z) where its surface vertex is an origin (O). A surface Sn marked with symbol $ is a rotationally asymmetric aspherical surface (so-called free curved surface) and is defined by formula (BS) below employing a local orthogonal coordinate system (X, Y, Z) where its surface vertex is an origin (O). Rotationally symmetric aspherical surface data and rotationally asymmetric aspherical surface data are indicated together with other data. It should be noted that any coefficient that is not shown equals 0 and that, for all the data, E–n=10$^{-n}$.

$$X=(C0 \cdot H^2)/(1+\sqrt{1-\epsilon \cdot CO^2 \cdot H^2})+\Sigma\{A(i) \cdot H^i\} \quad (AS),$$

$$X=(C0 \cdot H^2)/(1+\sqrt{1-\epsilon \cdot CO^2 \cdot H^2})+\Sigma\{G(j,k) \cdot Y^j \cdot Z^k\} \quad (BS).$$

where
- X represents the displacement from a reference surface in the X-direction at a height H (relative to the vertex);
- H represents a height in a direction perpendicular to the X-axis ($H=\sqrt{Y^2+Z^2}$);
- C0 represents a curvature at the vertex (± is provided for the X-axis of the local orthogonal coordinate system. When it is positive, its curvature center is located in the positive direction on the vector VX; C0=1/r);
- ε represents a quadric surface parameter;
- A(i) represents a rotationally symmetric aspherical surface coefficient of the i-th order; and
- G(j, k) represents a rotationally asymmetric aspherical surface coefficient of the j-th order and k-th order for Y and Z, respectively.

The Fresnel surface shape of the screen surface Si is defined by formula (CS) below. Fresnel lens data including the amount of offset (in mm) of the Fresnel lens FN, the refractive index of the Fresnel lens FN, the thickness (in mm) of the Fresnel lens FN, the cutting tool angle (dSv, °), etc. are indicated together with data of the screen surface Si. It should be noted that any coefficient that is not shown equals 0 and that, for all the data, $E-n=10^{-n}$.

$$\theta = S1\_0 + S1\_2 \cdot h^2 + S1\_4 \cdot h^4 + S1\_6 \cdot h^6 + S1\_8 \cdot h^8 \quad (CS)$$

where
- θ represents a total reflection surface angle (degree);
- h represents a Fresnel height; and
- $S1\_0$, $S1\_2$, $S1\_4$, $S1\_6$, $S1\_8$ represent coefficients.

Refractive index N for the d-line of a medium located on the incidence side of each optical surface, refractive index N' for the d-line of a medium located on the exit side of each optical surface (the value is negative when this optical surface is a reflection surface), and Abbe number vd of an optical material are indicated together with other data. For aperture stops and flare stops in Examples 1 to 7, a circular effective radius R (in mm), an aperture size RY (in mm) regulated in the Y-direction, an aperture size RZ (in mm) regulated in the Z-direction are indicated. For aperture stops in Examples 8 and 9, virtual aperture stop data (including effective radius R) is similarly indicated with other optical surface data. A beam passing through an optical system defined by the construction data is defined as a beam exiting from the display device surface So and passing through the edge of the virtual circular aperture stop. Note that, in actual use, the aperture stop is installed near a position where a principal ray is condensed.

The rear projector of each Example includes the display device DS, the projection optical system PO, and the screen SC. The projection optical system PO is formed of a plurality of optical elements located between the display device DS and the screen SC. In Example 1, basic optical elements of the projection optical system PO include first to fourth mirrors M1 to M4, first and second lenses L1 and L2, and first and second flat mirrors F1 and F2. In Examples 2 to 7, basic optical elements of the projection optical system PO include first to fourth mirrors M1 to M4, first and second lenses L1 and L2, and a first flat mirror F1. In Example 8, basic optical elements of the projection optical system PO include first and second mirrors M1 and M2, a refractive lens group LG formed of first to ninth lenses L1 to L9, and a first flat mirror F1. In Example 9, basic optical elements of the projection optical system PO include a first mirror M1 and a refractive lens group LG formed of first to seventh lenses L1 to L7.

Image plane sizes (in mm) of the display device surface So of Examples 1 to 8 are LY=±4.1277 and LZ=±7.3351. Image plane sizes (in mm) of the display device surface So of Example 9 are LY=±4.1545 and LZ=±5.5393, where the image plane shape of the display device surface So is rectangular, LY is a length in a direction (that is, Y-direction) of the image plane short side of the display device surface So, and LZ is a length in a direction (that is, Z-direction) of the image plane long side of the display device surface So. Detailed examples of the display device DS include: a digital micromirror device and an LCD (liquid crystal display).

Figure 7A:
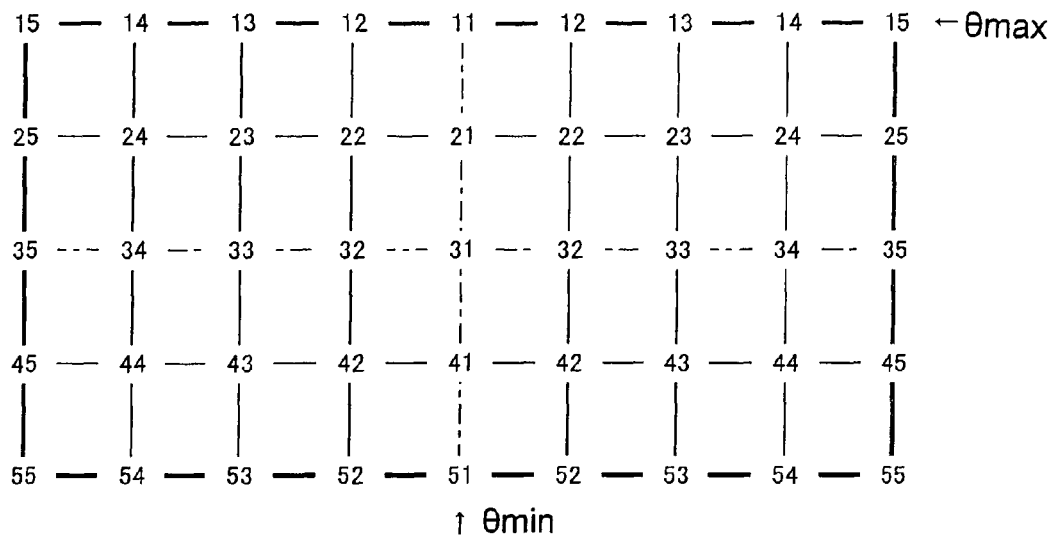
FIGS. 7A and 7B are diagrams illustrating correspondence between the position of a principal ray on a screen and a label.
Figure 7B:
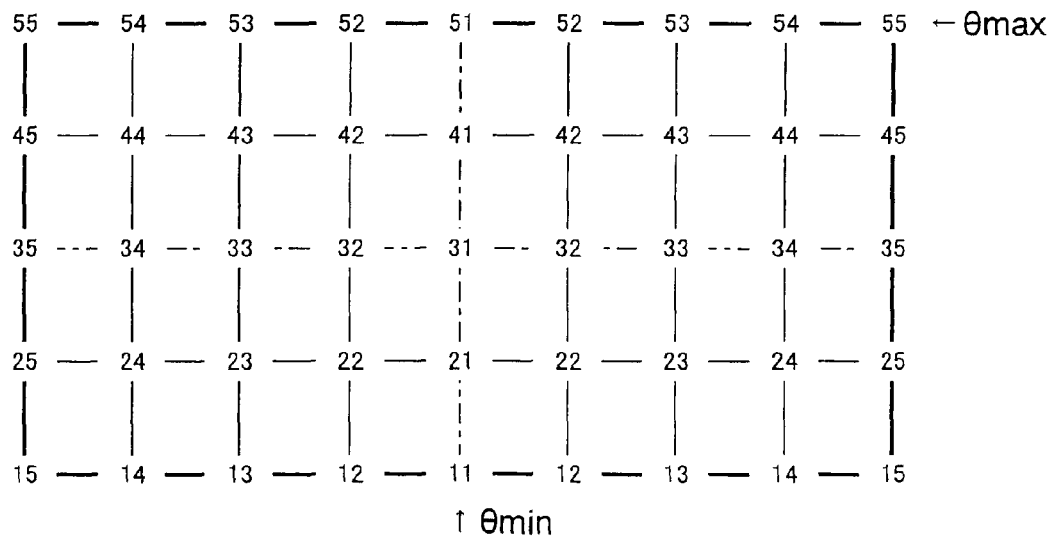

Tables 1 to 18 show position of a principal ray incident on or exiting from the screen SC (Screen thickness 4 mm) with reference to the screen center and the Fresnel center, and also show respective ray angles with ray vectors and incident angles (in °) or exit angles (in °). FIGS. 7A and 7B show correspondence between the position of each principle ray and a label TKij (i=1, 2, 3, 4, 5; j=1, 2, 3, 4, 5). FIG. 7A shows the correspondence in Examples 1 to 7. FIG. 7B shows the correspondence in Examples 8 and 9. Tables 19 to 21 show types, inch sizes of the screen image plane, cutting tool angles, data corresponding to and related to the conditional formulae, etc. for the Examples. Table 21 shows correspondence between the Fresnel height h (in mm), the total reflection surface angle θ (in °), and the focal length FL (in mm) in the total reflection type Fresnel lens FN for Example 9.

FIGS. 11 to 19 show relationships between the Fresnel height h (in mm) and the focal length FL (in mm) in the total reflection type Fresnel lens FN for the respective Examples. In FIGS. 11 to 19, the Fresnel height h indicated by a chain line corresponds to the image plane center position, the Fresnel height h indicated by a lower thick solid line corresponds to the image plane lower end position, the Fresnel height h indicated by an upper thick solid line corresponds to the image plane upper end position, and the Fresnel height h indicated by a broken line corresponds to a diagonal position.

Construction Data of Example 1

So (Display Device Surface)
Coordinates:
  O: 0.00000, 0.00000, 0.00000
  VX: 1.00000000, 0.00000000, 0.00000000
  VY: 0.00000000, 1.00000000, 0.00000000
N=1.00000
C0=0.00000000
N'=1.00000
T'=0.47
S1 (Entrance Side Surface of Cover Glass)
N=1.00000
C0=0.00000000
N'=1.51872, vd=64.20
T'=3
S2 (Exit Side Surface of Cover Glass)
N=1.51872, vd=64.20
C0=0.00000000
N'=1.00000
S3 (Flare Stop)
Coordinates:
  O: 38.50000, −4.50000, 0.00000
  VX: 1.00000000, 0.00000000, 0.00000000
  VY: 0.00000000, 1.00000000, 0.00000000
N=1.00000
C0=0.00000000, R=50, RY=11.7, RZ=20
N'=1.00000
S4 (Entrance Side Surface of Dustproof Glass)
Coordinates:
  O: 40.00000, −4.00000, 0.00000
  VX: 1.00000000, 0.00000000, 0.00000000
  VY: 0.00000000, 1.00000000, 0.00000000
N=1.00000
C0=0.00000000
N'=1.51872, vd=64.20
T'=1.2

S5 (Exit Side Surface of Dustproof Glass)
N=1.51872, vd=64.20
C0=0.00000000
N'=1.00000
S6 (First Curved Mirror M1)
Coordinates:
　　O: 91.12778, −9.43499, 0.00000
　　VX: 0.99078963, 0.13541019, 0.00000000
　　VY: −0.13541019, 0.99078963, 0.00000000
N=1.00000
C0=−0.00952744 (r=−104.9600)
N'=−1.00000
S7 (Flare Stop)
Coordinates:
　　O 46.96629, −27.09860, 0.00000
　　VX: −0.90630779, −0.42261826, 0.00000000
　　VY: −0.42261826, 0.90630779, 0.00000000
N=1.00000
C0=0.00000000, R=10.6, RY=9.8, RZ=10.6
N'=1.00000
S8$ (Entrance Side Surface of Lens L1)
Coordinates:
　　O: 35.54957, −31.80642, 0.00000
　　VX: −1.00000000, 0.00000000, 0.00000000
　　VY: 0.00000000, 1.00000000, 0.00000000
N=1.00000
C0=0.00000000
Aspherical surface data:
　　ε=1.00000000
　　G(2, 0)=0.000372000525
　　G(3, 0)=1.45519994E-6
　　G(4, 0)=1.04393262E-6
　　G(5, 0)=−8.35892022E-8
　　G(6, 0)=5.67739754E-9
　　G(7, 0)=1.64234344E-9
　　G(8, 0)=−1.70291840E-10
　　G(9, 0)=−1.71078103E-11
　　G(10, 0)=1.84206848E-12
　　G(0, 2)=0.000396190080
　　G(1, 2)=3.37425399E-6
　　G(2, 2)=1.79939280E-6
　　G(3, 2)=−1.03304398E-8
　　G(4, 2)=−2.43991160E-9
　　G(5, 2)=−6.78918169E-10
　　G(6, 2)=5.96590990E-11
　　G(7, 2)=4.44214524E-12
　　G(8, 2)=−4.57693550E-13
　　G(0, 4)=7.03774697E-7
　　G(1, 4)=−3.12970914E-8
　　G(2, 4)=−1.23648034E-9
　　G(3, 4)=−7.23439923E-10
　　G(4, 4)=4.46811578E-11
　　G(5, 4)=−4.98258764E-12
　　G(6, 4)=4.23232212E-13
　　G(0, 6)=−3.43978178E-9
　　G(1, 6)=6.94497592E-10
　　G(2, 6)=1.34177805E-11
　　G(3, 6)=2.57861106E-12
　　G(4, 6)=3.00523331E-13
　　G(0, 8)=3.20449820E-11
　　G(1, 8)=−8.49189151E-12
　　G(2, 8)=3.84328857E-14
　　G(0, 10)=−1.19487375E-14
N'=1.52729, vd=56.38
T'=1.8
S9 (Exit Side Surface of Lens L1)
N=1.52729, vd=56.38
C0=0.0000000
N'=1.00000
S10 (Aperture Stop)
Coordinates:
　　O: 32.84957, −31.60642, 0.00000
　　VX: −1.00000000, 0.00000000, 0.00000000
　　VY: 0.00000000, 1.00000000, 0.00000000
N=1.00000
C0=0.00000000, R=9.3, RY=8.3, RZ=9.3
N'=1.00000
S11* (Second Curved Mirror M2)
Coordinates:
　　O: 14.30584, −24.75629, 0.00000
　　VX: −0.99921316, 0.03966187, 0.00000000
　　VY: 0.03966187, 0.99921316, 0.00000000
N=1.00000
C0=0.01044439 (r=95.7452)
Aspherical surface data:
　　ε=9.43791946
　　A(4)=−6.85871164E-7
　　A(6)=4.71349976E-10
　　A(8)=−1.19683259E-12
　　A(10)=7.08269981E-16
　　A(12)=−5.81520885E-19
N'=−1.00000
S12$ (Entrance Side Surface of Lens L2)
Coordinates:
　　O: 38.62336, −70.98549, 0.00000
　　VX: 0.32037240, −0.94729168, 0.00000000
　　VY: 0.94729168, 0.32037240, 0.00000000
N=1.00000
C0=0.00000000
Aspherical surface data:
　　ε=1.00000000
　　G(2, 0)=0.000336752611
　　G(3, 0)=8.05897364E-6
　　G(4, 0)=−1.42508313E-6
　　G(5, 0)=3.96822714E-8
　　G(6, 0)=9.56455644E-10
　　G(7, 0)=−2.32655549E-10
　　G(8, 0)=4.13337508E-12
　　G(9, 0)=2.83279614E-13
　　G(10, 0)=−8.21850201E-15
　　G(0, 2)=−4.21816802E-5
　　G(1, 2)=−1.91131080E-5
　　G(2, 2)=−2.92408866E-6
　　G(3, 2)=7.17965939E-8
　　G(4, 2)=−1.71804409E-9
　　G(5, 2)=−1.66546886E-11
　　G(6, 2)=1.20270048E-11
　　G(7, 2)=−2.97602875E-13
　　G(8, 2)=−6.32109306E-17
　　G(0, 4)=3.21654647E-7
　　G(1, 4)=1.00593330E-7
　　G(2, 4)=1.26552945E-9
　　G(3, 4)=−1.51765216E-12
　　G(4, 4)=1.41031636E-12
　　G(5, 4)=−2.06820522E-13
　　G(6, 4)=2.47684598E-15
　　G(0, 6)=−9.98741827E-10
　　G(1, 6)=−9.83212276E-11
　　G(2, 6)=−7.77528715E-13
　　G(3, 6)=1.04783209E-15
　　G(4, 6)=2.26851228E-16
　　G(0, 8)=1.29315257E-12

G(1, 8)=9.02959164E-14
G(2, 8)=-2.96879493E-16
G(0, 10)=-1.09649382E-15
N'=1.52729, vd=56.38
T'=2.5
S13 (Exit Side Surface of Lens L2)
N=1.52729, vd=56.38
C0=0.00000000
N'=1.00000
S14$ (Third Curved Mirror M3)
Coordinates:
    O: 93.22789, −82.12679, 0.00000
    VX: 0.96642172, −0.25696121, 0.00000000
    VY: 0.25696121, 0.96642172, 0.00000000
N=1.00000
C0=−0.00506947 (r=−197.2591)
Aspherical surface data:
    ε=1.89147707
    G(2, 0)=−0.000766234333
    G(3, 0)=−2.77291245E-5
    G(4, 0)=3.80841218E-7
    G(5, 0)=9.43911322E-9
    G(6, 0)=6.50819355E-11
    G(7, 0)=1.24099916E-13
    G(8, 0)=−1.08875996E-15
    G(9, 0)=−2.89175439E-17
    G(10, 0)=−1.92720280E-19
    G(0, 2)=0.000267111157
    G(1, 2)=1.65930477E-5
    G(2, 2)=2.87284583E-6
    G(3, 2)=5.70888120E-8
    G(4, 2)=3.39088985E-10
    G(5, 2)=−4.11978894E-12
    G(6, 2)=−8.72144722E-14
    G(7, 2)=−5.49350921E-16
    G(8, 2)=−8.72483882E-19
    G(0, 4)=7.32893272E-7
    G(1, 4)=−8.33917712E-9
    G(2, 4)=−1.22259028E-9
    G(3, 4)=−3.25026766E-11
    G(4, 4)=−4.73475971E-13
    G(5, 4)=−4.13347848E-15
    G(6, 4)=−1.64148036E-17
    G(0, 6)=−3.99029955E-11
    G(1, 6)=6.63102137E-12
    G(2, 6)=3.16781254E-13
    G(3, 6)=4.87290925E-15
    G(4, 6)=2.56845963E-17
    G(0, 8)=2.37723345E-14
    G(1, 8)=6.92564137E-16
    G(2, 8)=4.68254078E-18
    G(0, 10)=7.30618931E-19
N'=−1.00000
S15$ (Fourth Curved Mirror M4)
Coordinates:
    O: 7.39400, −77.25785, 0.00000
    VX: −0.99990020, 0.01412766, 0.00000000
    VY: 0.01412766, 0.99990020, 0.00000000
N=1.00000
C0=0.03384800 (r=29.5438)
Aspherical surface data:
    ε=−3.19369751
    G(2, 0)=0.00308480335
    G(3, 0)=4.88981270E-5
    G(4, 0)=2.47914061E-7
    G(5, 0)=−1.21932913E-9
    G(6, 0)=−2.19607156E-11
    G(7, 0)=−2.11259491E-15
    G(8, 0)=2.21522688E-15
    G(9, 0)=1.99887751E-17
    G(10, 0)=5.92537999E-20
    G(0, 2)=0.00167654734
    G(1, 2)=−1.11220037E-5
    G(2, 2)=−2.19976221E-6
    G(3, 2)=−4.95448611E-8
    G(4, 2)=−5.40464712E-10
    G(5, 2)=−3.09851084E-12
    G(6, 2)=−8.52404442E-15
    G(7, 2)=−1.61035736E-17
    G(8, 2)=−6.68522994E-20
    G(0, 4)=−7.59010356E-7
    G(1, 4)=−1.89528018E-8
    G(2, 4)=−7.41050556E-11
    G(3, 4)=2.76397377E-12
    G(4, 4)=4.53030795E-14
    G(5, 4)=2.94554250E-16
    G(6, 4)=7.73460355E-19
    G(0, 6)=1.20804418E-10
    G(1, 6)=3.86780595E-12
    G(2, 6)=4.91589513E-14
    G(3, 6)=2.95629660E-16
    G(4, 6)=6.62707870E-19
    G(0, 8)=−7.17791202E-15
    G(1, 8)=−1.47985028E-16
    G(2, 8)=−6.68338471E-19
    G(0, 10)=−6.44036338E-20
N'=−1.00000
S16 (First Flat Mirror F1)
Coordinates:
    O: 71.95243, −250.00000, 0.00000
    VX: 0.99792124, −0.06444530, 0.00000000
    VY: 0.06444530, 0.99792124, 0.00000000
N=1.00000
C0=0.00000000
N'=−1.00000
S17 (Second Flat Mirror F2)
Coordinates:
    O: −95.28380, −503.11200, 0.00000
    VX: −0.99467251, 0.10308543, 0.00000000
    VY: 0.10308543, 0.99467251, 0.00000000
N=1.00000
C0=0.00000000
N'=−1.00000
Si (Screen Surface)
Coordinates:
    O=11.53876, −927.48368, 0.00000
    VX: 0.99467251, −0.10308543, 0.00000000
    VY: −0.10308543, −0.99467251, 0.00000000
Fresnel lens data (TIR Fresnel Screen Construction Data):
    Amount of offset (Fresnel shift): −831.053956
    Refractive index (Fresnel index): 1.55
    Thickness (Fresnel depth): 4
    Cutting tool angle (dSv): 45
    S1_0=118.242773
    S1_2=1.12281979E-05
    S1_4=−1.36183092E-12
    S1_6=−2.58065852E-18
    S1_8=8.46198475E-25

Construction Data of Example 2

So (Display Device Surface)
Coordinates:
  O: 0.00000, 0.00000, 0.00000
  VX: 1.00000000, 0.00000000, 0.00000000
  VY: 0.00000000, 1.00000000, 0.00000000
N=1.00000
C0=0.00000000
N'=1.00000
T'=0.47
S1 (Entrance Side Surface of Cover Glass)
N=1.00000
C0=0.00000000
N'=1.52442, vd=64.20
T'=3
S2 (Exit Side Surface of Cover Glass)
N=1.52442, vd=64.20
C0=0.00000000
N'=1.00000
S3 (Entrance Side Surface of Dustproof Glass)
Coordinates:
  O: 45.00000, −3.00000, 0.00000
  VX: 0.85749293, −0.51449576, 0.00000000
  VY: 0.51449576, 0.85749293, 0.00000000
N=1.00000
C0=0.00000000
N'=1.52442, vd=64.20
T'=1.2
S4 (Exit Side Surface of Dustproof Glass)
N=1.52442, vd=64.20
C0=0.00000000
N'=1.00000
S5 (First Curved Mirror M1)
Coordinates:
  O: 92.06751, −9.78207, 0.00000
  VX: 0.98671591, 0.16245527, 0.00000000
  VY: −0.16245527, 0.98671591, 0.00000000
N=1.00000
C0=−0.00931203 (r=−107.3880)
N'=−1.00000
S6 (Flare Stop)
Coordinates:
  O: 44.00000, −32.00000, 0.00000
  VX: −0.97014250, −0.24253563, 0.00000000
  VY: −0.24253563, 0.97014250, 0.00000000
N=1.00000
C0=0.00000000, R=10.6, RY=9.2, RZ=10.6
N'=1.00000
S7$ (Entrance Side Surface of Lens L1)
Coordinates:
  O: 33.50896, −44.31646, 0.00000
  VX: −1.00000000, 0.00000000, 0.00000000
  VY: 0.00000000, 1.00000000, 0.00000000
N=1.00000
C0=0.00000000
Aspherical surface data:
  $\epsilon$=1.00000000
  G(2, 0)=0.000984694182
  G(3, 0)=−9.23044301E-5
  G(4, 0)=7.14048156E-6
  G(5, 0)=−4.12266969E-7
  G(6, 0)=6.90798257E-8
  G(7, 0)=−1.21126769E-8
  G(8, 0)=1.09416180E-9
  G(9, 0)=−4.76527769E-11
  G(10, 0)=8.06231355E-13
  G(0, 2)=0.000610472651
  G(1, 2)=−4.46142994E-5
  G(2, 2)=8.23559334E-7
  G(3, 2)=1.01218373E-6
  G(4, 2)=−2.17333566E-7
  G(5, 2)=2.47976614E-8
  G(6, 2)=−1.66546496E-9
  G(7, 2)=6.19921725E-11
  G(8, 2)=−9.85996379E-13
  G(0, 4)=2.00502113E-6
  G(1, 4)=−3.53760261E-7
  G(2, 4)=7.57296582E-8
  G(3, 4)=−1.18437309E-8
  G(4, 4)=1.19815177E-9
  G(5, 4)=−6.51505401E-11
  G(6, 4)=1.38978934E-12
  G(0, 6)=−2.18124325E-8
  G(1, 6)=2.26675192E-9
  G(2, 6)=−2.19757988E-10
  G(3, 6)=8.21699122E-12
  G(4, 6)=−4.91063475E-14
  G(0, 8)=2.42199464E-10
  G(1, 8)=−1.01862482E-11
  G(2, 8)=4.16104459E-13
  G(0, 10)=−8.43189332E-13
N'=1.53412, vd=56.38
T'=1.8
S8 (Exit Side Surface of Lens L1)
N=1.53412, vd=56.38
C0=0.00000000
N'=1.00000
S9 (Aperture Stop)
Coordinates:
  O: 31.00896, −37.10000, 0.00000
  VX: −1.00000000, 0.00000000, 0.00000000
  VY: 0.00000000, 1.00000000, 0.00000000
N=1.00000
C0=0.00000000, R=9.6, RY=8.6, RZ=9.6
N'=1.00000
S10* (Second Curved Mirror M2)
Coordinates:
  O: 15.32904, −30.26902, 0.00000
  VX: −0.99818213, 0.06026972, 0.00000000
  VY: 0.06026972, 0.99818213, 0.00000000
N=1.00000
C0=0.01074003 (r=93.1096)
Aspherical surface data:
  $\epsilon$=8.68778429
  A(4)=−4.00453728E-7
  A(6)=9.13054703E-10
  A(8)=−3.25081817E-12
  A(10)=3.62372962E-15
  A(12)=−1.86147753E-18
N'=−1.00000
S11$ (Entrance Side Surface of Lens L2)
Coordinates:
  O: 25.83822, −68.30202, 0.00000
  VX: 0.00000000, −1.00000000, 0.00000000
  VY: 1.00000000, 0.00000000, 0.00000000
N=1.00000
C0=0.00000000
Aspherical surface data:
  $\epsilon$=1.00000000
  G(2, 0)=−5.92860824E-6
  G(3, 0)=3.43097080E-5
  G(4, 0)=−1.94322595E-6
  G(5, 0)=−1.65442921E-8

G(6, 0)=5.45315350E-9
G(7, 0)=-2.96694336E-10
G(8, 0)=5.84395930E-12
G(9, 0)=2.78538789E-14
G(10, 0)=-1.79466844E-15
G(0, 2)=-0.000203217070
G(1, 2)=1.72427829E-5
G(2, 2)=-4.63931670E-6
G(3, 2)=1.19533663E-7
G(4, 2)=2.32390838E-9
G(5, 2)=-2.05064293E-10
G(6, 2)=4.95690547E-12
G(7, 2)=3.56545253E-14
G(8, 2)=-2.32391479E-15
G(0, 4)=4.79663228E-7
G(1, 4)=9.40832040E-8
G(2, 4)=6.45009158E-10
G(3, 4)=-8.97597394E-11
G(4, 4)=2.29708621E-12
G(5, 4)=-6.32194234E-14
G(6, 4)=-3.96985130E-16
G(0, 6)=-1.14701558E-9
G(1, 6)=-7.70809798E-11
G(2, 6)=2.12826232E-12
G(3, 6)=-2.21047083E-13
G(4, 6)=6.36163800E-15
G(0, 8)=2.20768891E-12
G(1, 8)=7.46734521E-14
G(2, 8)=2.86237099E-16
G(0, 10)=-2.49731890E-15
N'=1.53412, vd=56.38
T'=3
S12 (Exit Side Surface of Lens L2)
N=1.53412, vd=56.38
C0=0.00000000
N'=1.00000
S13$ (Third Curved Mirror M3)
Coordinates:
 O: 77.01900, -133.34679, 0.00000
 VX: 0.83226270, -0.55438146, 0.00000000
 VY: 0.55438146, 0.83226270, 0.00000000
N=1.00000
C0=-0.00211920 (r=-471.8766)
Aspherical surface data:
 ε=3.47163106
 G(1, 0)=-0.0281622334
 G(2, 0)=-0.000148262290
 G(3, 0)=-5.03204449E-6
 G(4, 0)=-1.92826790E-7
 G(5, 0)=-1.62157763E-9
 G(6, 0)=9.60822996E-12
 G(7, 0)=3.60444594E-14
 G(8, 0)=-2.48044202E-15
 G(9, 0)=2.00578496E-17
 G(10, 0)=5.03804450E-19
 G(0, 2)=-0.000627316899
 G(1, 2)=-2.45495870E-5
 G(2, 2)=-2.77818758E-7
 G(3, 2)=2.32170713E-9
 G(4, 2)=1.14497591E-10
 G(5, 2)=1.13732163E-12
 G(6, 2)=-6.18568615E-15
 G(7, 2)=-2.46515471E-16
 G(8, 2)=-1.74033488E-18
 G(0, 4)=2.00259069E-7
 G(1, 4)=6.25617135E-9
 G(2, 4)=6.25677970E-11
 G(3, 4)=-7.96003945E-13
 G(4, 4)=-2.78070672E-14
 G(5, 4)=-2.85368166E-16
 G(6, 4)=-1.45157917E-18
 G(0, 6)=-9.75780463E-12
 G(1, 6)=-6.09139844E-13
 G(2, 6)=2.78147451E-15
 G(3, 6)=2.42683806E-16
 G(4, 6)=2.21851301E-18
 G(0, 8)=-5.27966276E-15
 G(1, 8)=2.48508688E-16
 G(2, 8)=3.62674305E-18
 G(0, 10)=2.75371869E-18
N'=-1.00000
S14$ (Fourth Curved Mirror M4)
Coordinates:
 O: 5.68974, -72.69934, 0.00000
 VX: -0.98023420, 0.19784063, 0.00000000
 VY: 0.19784063, 0.98023420, 0.00000000
N=1.00000
C0=0.04234284 (r=23.6167)
Aspherical surface data:
 ε=-2.42952906
 G(2, 0)=0.00356227342
 G(3, 0)=4.23241661E-5
 G(4, 0)=-9.83464478E-8
 G(5, 0)=-6.63911691E-9
 G(6, 0)=-4.91730904E-11
 G(7, 0)=1.83778657E-13
 G(8, 0)=5.13445012E-15
 G(9, 0)=3.18412010E-17
 G(10, 0)=7.08451926E-20
 G(0, 2)=0.00122862817
 G(1, 2)=-2.10864000E-5
 G(2, 2)=-2.53645191E-6
 G(3, 2)=-6.06783487E-8
 G(4, 2)=-6.87626069E-10
 G(5, 2)=-3.24780561E-12
 G(6, 2)=6.92820264E-15
 G(7, 2)=1.36684853E-16
 G(8, 2)=4.11913784E-19
 G(0, 4)=-6.84850145E-7
 G(1, 4)=-2.01908583E-8
 G(2, 4)=-2.18738640E-10
 G(3, 4)=3.53061291E-13
 G(4, 4)=3.02649095E-14
 G(5, 4)=2.42931223E-16
 G(6, 4)=5.79835960E-19
 G(0, 6)=8.24357487E-11
 G(1, 6)=1.14773344E-12
 G(2, 6)=7.17870467E-15
 G(3, 6)=1.54025019E-16
 G(4, 6)=1.17276984E-18
 G(0, 8)=-3.14132404E-14
 G(1, 8)=-7.20820587E-16
 G(2, 8)=-4.06643821E-18
 G(0, 10)=-8.01913621E-20
N'=-1.00000
S15 (First Flat Mirror F1)
Coordinates:
 O: 0.00000, -664.47404, 0.00000
 VX: -0.10440143, -0.99453524, 0.00000000
 VY: -0.99453524, 0.10440143, 0.00000000
N=1.00000
C0=0.00000000
N'=-1.00000
Si (Screen Surface)
Coordinates:
 O: 146.39605, -325.47988, 0.00000
 VX: 0.99933856, 0.03636545, 0.00000000
 VY: -0.03636545, 0.99933856, 0.00000000

Fresnel lens data (TIR Fresnel Screen Construction Data):
   Amount of offset (Fresnel shift): −873.26247
   Refractive index (Fresnel index): 1.55
   Thickness (Fresnel depth): 4
   Cutting tool angle (dSv): 45
   $S1\_0$=124.449623
   $S1\_2$=−2.56932363E−06
   $S1\_4$=8.90356795E−12
   $S1\_6$=−2.64021265E−18
   $S1\_8$=−5.39408523E−25

Construction Data of Examples 3 to 6

So (Display Device Surface)
Coordinates:
   O: 0.00000, 0.00000, 0.00000
   VX: 1.00000000, 0.00000000, 0.00000000
   VY: 0.00000000, 1.00000000, 0.00000000
N=1.00000
C0=0.00000000
N'=1.00000
T'=0.47
S1 (Entrance Side Surface of Cover Glass)
N=1.00000
C0=0.00000000
N'=1.52442, vd=64.20
T'=3
S2 (Exit Side Surface of Cover Glass)
N=1.52442, vd=64.20
C0=0.00000000
N'=1.00000
S3 (Entrance Side Surface of Dustproof Glass)
Coordinates:
   O: 45.00000, −3.00000, 0.00000
   VX: 0.85749293, −0.51449576, 0.00000000
   VY: 0.51449576, 0.85749293, 0.00000000
N=1.00000
C0=0.00000000
N'=1.52442, vd=64.20
T'=1.2
S4 (Exit Side Surface of Dustproof Glass)
N=1.52442, vd=64.20
C0=0.00000000
N'=1.00000
S5 (First Curved Mirror M1)
Coordinates:
   O: 92.05897, −9.77841, 0.00000
   VX: 0.98671591, 0.16245527, 0.00000000
   VY: −0.16245527, 0.98671591, 0.00000000
N=1.00000
C0=−0.00931203 (r=−107.3880)
N'=−1.00000
S6 (Flare Stop)
Coordinates:
   O: 44.00000, −32.10000, 0.00000
   VX: −0.97014250, −0.24253563, 0.00000000
   VY: −0.24253563, 0.97014250, 0.00000000
N=1.00000
C0=0.00000000, R=10.7, RY=9.1, RZ=10.7
N'=1.00000

S7$ (Entrance Side Surface of Lens L1)
Coordinates:
   O: 33.50896, −44.31646, 0.00000
   VX: −1.00000000, 0.00000000, 0.00000000
   VY: 0.00000000, 1.00000000, 0.00000000
N=1.00000
C0=0.00000000
Aspherical surface data:
   ε=1.00000000
   G(2, 0)=0.000984694182
   G(3, 0)=−9.23044301E−5
   G(4, 0)=7.14048156E−6
   G(5, 0)=−4.12266969E−7
   G(6, 0)=6.90798257E−8
   G(7, 0)=−1.21126769E−8
   G(8, 0)=1.09416180E−9
   G(9, 0)=−4.76527769E−11
   G(10, 0)=8.06231355E−13
   G(0, 2)=0.000610472651
   G(1, 2)=−4.46142994E−5
   G(2, 2)=8.23559334E−7
   G(3, 2)=1.01218373E−6
   G(4, 2)=−2.17333566E−7
   G(5, 2)=2.47976614E−8
   G(6, 2)=−1.66546496E−9
   G(7, 2)=6.19921725E−11
   G(8, 2)=−9.85996379E−13
   G(0, 4)=2.00502113E−6
   G(1, 4)=−3.53760261E−7
   G(2, 4)=7.57296582E−8
   G(3, 4)=−1.18437309E−8
   G(4, 4)=1.19815177E−9
   G(5, 4)=−6.51505401E−11
   G(6, 4)=1.38978934E−12
   G(0, 6)=−2.18124325E−8
   G(1, 6)=2.26675192E−9
   G(2, 6)=−2.19757988E−10
   G(3, 6)=8.21699122E−12
   G(4, 6)=−4.91063475E−14
   G(0, 8)=2.42199464E−10
   G(1, 8)=−1.01862482E−11
   G(2, 8)=4.16104459E−13
   G(0, 10)=−8.43189332E−13
N'=1.53412, vd=56.38
T'=1.8
S8 (Exit Side Surface of Lens L1)
N=1.53412, vd=56.38
C0=0.00000000
N'=1.00000
S9 (Aperture Stop)
Coordinates:
   O: 31.00896, −37.30000, 0.00000
   VX: −1.00000000, 0.00000000, 0.00000000
   VY: 0.00000000, 1.00000000, 0.00000000
N=1.00000
C0=0.00000000, R=9.6, RY=8.2, RZ=9.6
N'=1.00000
S10* (Second Curved Mirror M2)
Coordinates:
   O: 15.32904, −30.26902, 0.00000
   VX: −0.99818213, 0.06026972, 0.00000000
   VY: 0.06026972, 0.99818213, 0.00000000
N=1.00000
C0=0.01074003 (r=93.1096)

Aspherical surface data:
  ε=8.68778429
  A(4)=−4.00453728E-7
  A(6)=9.13054703E-10
  A(8)=−3.25081817E-12
  A(10)=3.62372962E-15
  A(12)=−1.86147753E-18
N'=−1.000
S11$ (Entrance Side Surface of Lens L2)
Coordinates:
  O: 25.83822, −68.30202, 0.00000
  VX: 0.00000000, −1.00000000, 0.00000000
  VY: 1.00000000, 0.00000000, 0.00000000
N=1.00000
C0=0.00000000
Aspherical surface data:
  ε=1.00000000
  G(2, 0)=−5.92860824E-6
  G(3, 0)=3.43097080E-5
  G(4, 0)=−1.94322595E-6
  G(5, 0)=−1.65442921E-8
  G(6, 0)=5.45315350E-9
  G(7, 0)=−2.96694336E-10
  G(8, 0)=5.84395930E-12
  G(9, 0)=2.78538789E-14
  G(10, 0)=−1.79466844E-15
  G(0, 2)=−0.000203217070
  G(1, 2)=1.72427829E-5
  G(2, 2)=−4.63931670E-6
  G(3, 2)=1.19533663E-7
  G(4, 2)=2.32390838E-9
  G(5, 2)=−2.05064293E-10
  G(6, 2)=4.95690547E-12
  G(7, 2)=3.56545253E-14
  G(8, 2)=−2.32391479E-15
  G(0, 4)=4.79663228E-7
  G(1, 4)=9.40832040E-8
  G(2, 4)=6.45009158E-10
  G(3, 4)=−8.97597394E-11
  G(4, 4)=2.29708621E-12
  G(5, 4)=−6.32194234E-14
  G(6, 4)=−3.96985130E-16
  G(0, 6)=−1.14701558E-9
  G(1, 6)=−7.70809798E-11
  G(2, 6)=2.12826232E-12
  G(3, 6)=−2.21047083E-13
  G(4, 6)=6.36163800E-15
  G(0, 8)=2.20768891E-12
  G(1, 8)=7.46734521E-14
  G(2, 8)=2.86237099E-16
  G(0, 10)=−2.49731890E-15
N'=1.53412, vd=56.38
T'=3
S12 (Exit Side Surface of Lens L2)
N=1.53412, vd=56.38
C0=0.00000000
N'=1.00000
S13$ (Third Curved Mirror M3)
Coordinates:
  O: 76.33188, −132.81285, 0.00000
  VX: 0.83226270, −0.55438146, 0.00000000
  VY: 0.55438146, 0.83226270, 0.00000000
N=1.00000
C0=−0.00211920 (r=−471.8766)

Aspherical surface data:
  ε=3.47163106
  G(1, 0)=−0.0281622334
  G(2, 0)=−0.000148262290
  G(3, 0)=−5.03204449E-6
  G(4, 0)=−1.92826790E-7
  G(5, 0)=−1.62157763E-9
  G(6, 0)=9.60822996E-12
  G(7, 0)=3.60444594E-14
  G(8, 0)=−2.48044202E-15
  G(9, 0)=2.00578496E-17
  G(10, 0)=5.03804450E-19
  G(0, 2)=−0.000627316899
  G(1, 2)=−2.45495870E-5
  G(2, 2)=−2.77818758E-7
  G(3, 2)=2.32170713E-9
  G(4, 2)=1.14497591E-10
  G(5, 2)=1.13732163E-12
  G(6, 2)=−6.18568615E-15
  G(7, 2)=−2.46515471E-16
  G(8, 2)=−1.74033488E-18
  G(0, 4)=2.00259069E-7
  G(1, 4)=6.25617135E-9
  G(2, 4)=6.25677970E-11
  G(3, 4)=−7.96003945E-13
  G(4, 4)=−2.78070672E-14
  G(5, 4)=−2.85368166E-16
  G(6, 4)=−1.45157917E-18
  G(0, 6)=−9.75780463E-12
  G(1, 6)=−6.09139844E-13
  G(2, 6)=2.78147451E-15
  G(3, 6)=2.42683806E-16
  G(4, 6)=2.21851301E-18
  G(0, 8)=−5.27966276E-15
  G(1, 8)=2.48508688E-16
  G(2, 8)=3.62674305E-18
  G(0, 10)=2.75371869E-18
N'=−1.00000
S14$ (Fourth Curved Mirror M4)
Coordinates:
  O: 5.41431, −72.08265, 0.00000
  VX: −0.98023420, 0.19784063, 0.00000000
  VY: 0.19784063, 0.98023420, 0.00000000
N=1.00000
C0=0.04081397 (r=24.5014)
Aspherical surface data:
  ε=−2.44699290
  G(2, 0)=0.00350532435
  G(3, 0)=4.23192202E-5
  G(4, 0)=−6.02210022E-8
  G(5, 0)=−5.81801517E-9
  G(6, 0)=−4.17285412E-11
  G(7, 0)=2.08957681E-13
  G(8, 0)=5.09657666E-15
  G(9, 0)=3.15632383E-17
  G(10, 0)=7.12463089E-20
  G(0, 2)=0.00131620353
  G(1, 2)=−1.16203215E-5
  G(2, 2)=−2.11604880E-6
  G(3, 2)=−5.16831585E-8
  G(4, 2)=−5.96859436E-10
  G(5, 2)=−3.10670429E-12
  G(6, 2)=1.01141215E-15
  G(7, 2)=8.19052190E-17
  G(8, 2)=2.54024068E-19
  G(0, 4)=−6.60503407E-7
  G(1, 4)=−1.93987302E-8

G(2, 4)=−2.20302445E−10
G(3, 4)=−1.00102044E−13
G(4, 4)=2.41481719E−14
G(5, 4)=2.19729839E−16
G(6, 4)=5.96570848E−19
G(0, 6)=7.52906975E−11
G(1, 6)=7.89414886E−13
G(2, 6)=−4.50072494E−15
G(3, 6)=2.14217471E−17
G(4, 6)=5.98120399E−19
G(0, 8)=−2.85838289E−14
G(1, 8)=−6.97356620E−16
G(2, 8)=−3.72395137E−18
G(0, 10)=−5.04470185E−19
N'=−1.00000
S15 (First Flat Mirror F1)
Coordinates:
   O: 0.00000, −745.82592, 0.00000
   VX: −0.08305274, −0.99654515, 0.00000000
   VY: −0.99654515, 0.08305274, 0.00000000
N=1.00000
C0=0.00000000
N'=−1.00000
Si (Screen Surface)
Coordinates:
   O: 157.66227, −366.29022, 0.00000
   VX: 0.99693899, 0.07818340, 0.00000000
   VY: −0.07818340, 0.99693899, 0.00000000
Fresnel lens data (TIR Fresnel Screen Construction Data) of Example 3:
   Amount of offset (Fresnel shift): −999.63104
   Refractive index (Fresnel index): 1.55
   Thickness (Fresnel depth): 4
   Cutting tool angle (dSv): 45
   S1_0=120.743435
   S1_2=8.66496936E−06
   S1_4=−1.71348990E−12
   S1_6=−1.28679336E−18
   S1_8=4.70966755E−25
Fresnel lens data (TIR Fresnel Screen Construction Data) of Example 4:
   Amount of offset (Fresnel shift): −1018.66456
   Refractive index (Fresnel index): 1.55
   Thickness (Fresnel depth): 4
   Cutting tool angle (dSv): 60
   S1_0=114.692435
   S1_2=1.81741327E−5
   S1_4=−1.37126944E−11
   S1_6=5.10338972E−18
   S1_8=−7.32412941E−25
Fresnel lens data (TIR Fresnel Screen Construction Data) of Example 5:
   Amount of offset (Fresnel shift): −1017.75785
   Refractive index (Fresnel index): 1.55
   Thickness (Fresnel depth): 4
   Cutting tool angle (dSv): 75
   S1_0=111.802194
   S1_2=1.66438329E−5
   S1_4=−1.19849511E−11
   S1_6=4.24670031E−18
   S1_8=−5.81677777E−25
Fresnel lens data (TIR Fresnel Screen Construction Data) of Example 6:
   Amount of offset (Fresnel shift): −1020.93717
   Refractive index (Fresnel index): 1.55
   Thickness (Fresnel depth): 4
   Cutting tool angle (dSv): 90
   S1_0=108.072063
   S1_2=1.63241865E−5
   S1_4=−1.19933139E−11
   S1_6=4.25500106E−18
   S1_8=−5.75434618E−25

Construction Data of Example 7

So (Display Device Surface)
Coordinates:
   O: 0.00000, 0.00000, 0.00000
   VX: 1.00000000, 0.00000000, 0.00000000
   VY: 0.00000000, 1.00000000, 0.00000000
N=1.00000
C0=0.00000000
N'=1.00000
T'=0.47
S1 (Entrance Side Surface of Cover Glass)
N=1.00000
C0=0.00000000
N'=1.52442, vd=64.20
T'=3
S2 (Exit Side Surface of Cover Glass)
N=1.52442, vd=64.20
C0=0.00000000
N'=1.00000
S3 (Entrance Side Surface of Dustproof Glass)
Coordinates:
   O: 45.00000, −3.00000, 0.00000
   VX: 0.85749293, −0.51449576, 0.00000000
   VY: 0.51449576, 0.85749293, 0.00000000
N=1.00000
C0=0.00000000
N'=1.52442, vd=64.20
T'=1.2
S4 (Exit Side Surface of Dustproof Glass)
N=1.52442, vd=64.20
C0=0.00000000
N'=1.00000
S5 (First Curved Mirror M1)
Coordinates:
   O: 92.02227, −9.79333, 0.00000
   VX: 0.98671591, 0.16245527, 0.00000000
   VY: −0.16245527, 0.98671591, 0.00000000
N=1.00000
C0=−0.00931203 (r=−107.3880)
N'=−1.00000
S6 (Flare Stop)
Coordinates:
   O: 44.00000, −32.00000, 0.00000
   VX: −0.97014250, −0.24253563, 0.00000000
   VY: −0.24253563, 0.97014250, 0.00000000
N=1.00000
C0=0.00000000, R=10.6, RY=9.2, RZ=10.6
N'=1.00000
S7$ (Entrance Side Surface of Lens L1)
Coordinates:
   O: 33.50896, −44.31646, 0.00000
   VX: −1.00000000, 0.00000000, 0.00000000
   VY: 0.00000000, 1.00000000, 0.00000000
N=1.00000
C0=0.00000000
Aspherical surface data:
   ϵ=1.00000000
   G(2, 0)=0.000984694182
   G(3, 0)=−9.23044301E−5
   G(4, 0)=7.14048156E−6

G(5, 0)=−4.12266969E-7
G(6, 0)=6.90798257E-8
G(7, 0)=−1.21126769E-8
G(8, 0)=1.09416180E-9
G(9, 0)=−4.76527769E-11
G(10, 0)=8.06231355E-13
G(0, 2)=0.000610472651
G(1, 2)=−4.46142994E-5
G(2, 2)=8.23559334E-7
G(3, 2)=1.01218373E-6
G(4, 2)=−2.17333566E-7
G(5, 2)=2.47976614E-8
G(6, 2)=−1.66546496E-9
G(7, 2)=6.19921725E-11
G(8, 2)=−9.85996379E-13
G(0, 4)=2.00502113E-6
G(1, 4)=−3.53760261E-7
G(2, 4)=7.57296582E-8
G(3, 4)=−1.18437309E-8
G(4, 4)=1.19815177E-9
G(5, 4)=−6.51505401E-11
G(6, 4)=1.38978934E-12
G(0, 6)=−2.18124325E-8
G(1, 6)=2.26675192E-9
G(2, 6)=−2.19757988E-10
G(3, 6)=8.21699122E-12
G(4, 6)=−4.91063475E-14
G(0, 8)=2.42199464E-10
G(1, 8)=−1.01862482E-11
G(2, 8)=4.16104459E-13
G(0, 10)=−8.43189332E-13
N'=1.53412, vd=56.38
T'=1.8
S8 (Exit Side Surface of Lens L1)
N=1.53412, vd=56.38
C0=0.00000000
N'=1.00000
S9 (Aperture Stop)
Coordinates:
    O: 31.00896, −37.10000, 0.00000
    VX: −1.00000000, 0.00000000, 0.00000000
    VY: 0.00000000, 1.00000000, 0.00000000
N=1.00000
C0=0.00000000, R=9.6, RY=8.6, RZ=9.6
N'=1.00000
S10* (Second Curved Mirror M2)
Coordinates:
    O: 15.32904, −30.26902, 0.00000
    VX: −0.99818213, 0.06026972, 0.00000000
    VY: 0.06026972, 0.99818213, 0.00000000
N=1.00000
C0=0.01074003 (r=93.1096)
Aspherical surface data:
    ϵ=8.68778429
    A(4)=−4.00453728E-7
    A(6)=9.13054703E-10
    A(8)=−3.25081817E-12
    A(10)=3.62372962E-15
    A(12)=−1.86147753E-18
N'=−1.00000
S11$ (Entrance Side Surface of Lens L2)
Coordinates:
    O: 25.83822, −68.30202, 0.00000
    VX: 0.00000000, −1.00000000, 0.00000000
    VY: 1.00000000, 0.00000000, 0.00000000
N=1.00000
C0=0.00000000
Aspherical surface data:
    ϵ=1.00000000
    G(2, 0)=−5.92860824E-6
    G(3, 0)=3.43097080E-5
    G(4, 0)=−1.94322595E-6
    G(5, 0)=−1.65442921E-8
    G(6, 0)=5.45315350E-9
    G(7, 0)=−2.96694336E-10
    G(8, 0)=5.84395930E-12
    G(9, 0)=2.78538789E-14
    G(10, 0)=−1.79466844E-15
    G(0, 2)=−0.000203217070
    G(1, 2)=1.72427829E-5
    G(2, 2)=−4.63931670E-6
    G(3, 2)=1.19533663E-7
    G(4, 2)=2.32390838E-9
    G(5, 2)=−2.05064293E-10
    G(6, 2)=4.95690547E-12
    G(7, 2)=3.56545253E-14
    G(8, 2)=−2.32391479E-15
    G(0, 4)=4.79663228E-7
    G(1, 4)=9.40832040E-8
    G(2, 4)=6.45009158E-10
    G(3, 4)=−8.97597394E-11
    G(4, 4)=2.29708621E-12
    G(5, 4)=−6.32194234E-14
    G(6, 4)=−3.96985130E-16
    G(0, 6)=−1.14701558E-9
    G(1, 6)=−7.70809798E-11
    G(2, 6)=2.12826232E-12
    G(3, 6)=−2.21047083E-13
    G(4, 6)=6.36163800E-15
    G(0, 8)=2.20768891E-12
    G(1, 8)=7.46734521E-14
    G(2, 8)=2.86237099E-16
    G(0, 10)=−2.49731890E-15
N'=1.53412, vd=56.38
T'=3
S12 (Exit Side Surface of Lens L2)
N=1.53412, vd=56.38
C0=0.00000000
N'=1.00000
S13$ (Third Curved Mirror M3)
Coordinates:
    O: 75.73856, −132.49482, 0.00000
    VX: 0.83226270, −0.55438146, 0.00000000
    VY: 0.55438146, 0.83226270, 0.00000000
N=1.00000
C0=−0.00211920 (r=−471.8766)
Aspherical surface data:
    ϵ=3.47163106
    G(1, 0)=−0.0281622334
    G(2, 0)=−0.000148262290
    G(3, 0)=−5.03204449E-6
    G(4, 0)=−1.92826790E-7
    G(5, 0)=−1.62157763E-9
    G(6, 0)=9.60822996E-12
    G(7, 0)=3.60444594E-14
    G(8, 0)=−2.48044202E-15
    G(9, 0)=2.00578496E-17
    G(10, 0)=5.03804450E-19
    G(0, 2)=−0.000627316899
    G(1, 2)=−2.45495870E-5
    G(2, 2)=−2.77818758E-7
    G(3, 2)=2.32170713E-9
    G(4, 2)=1.14497591E-10
    G(5, 2)=1.13732163E-12

G(6, 2)=−6.18568615E−15
G(7, 2)=−2.46515471E−16
G(8, 2)=−1.74033488E−18
G(0, 4)=2.00259069E−7
G(1, 4)=6.25617135E−9
G(2, 4)=6.25677970E−11
G(3, 4)=−7.96003945E−13
G(4, 4)=−2.78070672E−14
G(5, 4)=−2.85368166E−16
G(6, 4)=−1.45157917E−18
G(0, 6)=−9.75780463E−12
G(1, 6)=−6.09139844E−13
G(2, 6)=2.78147451E−15
G(3, 6)=2.42683806E−16
G(4, 6)=2.21851301E−18
G(0, 8)=−5.27966276E−15
G(1, 8)=2.48508688E−16
G(2, 8)=3.62674305E−18
G(0, 10)=2.75371869E−18
N'=−1.00000
S14$ (Fourth Curved Mirror M4)
Coordinates:
　O: 4.40695, −71.87142, 0.00000
　VX: −0.98023420, 0.19784063, 0.00000000
　VY: 0.19784063, 0.98023420, 0.00000000
N=1.00000
C0=0.03967424 (r=25.2053)
Aspherical surface data:
　ϵ=−2.52320410
　G(2, 0)=0.00383595503
　G(3, 0)=5.32324476E−5
　G(4, 0)=1.42665494E−7
　G(5, 0)=−4.02605431E−9
　G(6, 0)=−3.91262909E−11
　G(7, 0)=1.49793131E−13
　G(8, 0)=5.00530725E−15
　G(9, 0)=3.45729553E−17
　G(10, 0)=8.40704767E−20
　G(0, 2)=0.00148135965
　G(1, 2)=−2.90173269E−6
　G(2, 2)=−1.73587806E−6
　G(3, 2)=−4.31486890E−8
　G(4, 2)=−5.07934535E−10
　G(5, 2)=−2.93506443E−12
　G(6, 2)=−3.68426522E−15
　G(7, 2)=4.21183777E−17
　G(8, 2)=1.56555987E−19
　G(0, 4)=−6.19822742E−7
　G(1, 4)=−1.62411338E−8
　G(2, 4)=−1.46585915E−10
　G(3, 4)=5.34342969E−13
　G(4, 4)=2.49098831E−14
　G(5, 4)=2.00157297E−16
　G(6, 4)=5.03219275E−19
　G(0, 6)=7.58800683E−11
　G(1, 6)=2.25235634E−13
　G(2, 6)=−2.15105057E−14
　G(3, 6)=−1.21776388E−16
　G(4, 6)=2.53033817E−19
　G(0, 8)=−3.44695504E−14
　G(1, 8)=−8.54553284E−16
　G(2, 8)=−4.55593002E−18
　G(0, 10)=−7.00212502E−19
N'=−1.00000

S15 (First Flat Mirror F1)
Coordinates:
　O: 0.00000, −883.68649, 0.00000
　VX: −0.07744153, −0.99699690, 0.00000000
　VY: −0.99699690, 0.07744153, 0.00000000
N=1.00000
C0=0.00000000
N'=−1.00000
Si (Screen Surface)
Coordinates:
　O: 193.24066, −432.08264, 0.00000
　VX: 0.99629028, 0.08605621, 0.00000000
　VY: −0.08605621, 0.99629028, 0.00000000
Fresnel lens data (TIR Fresnel Screen Construction Data):
　Amount of offset (Fresnel shift): −1214.91147
　Refractive index (Fresnel index): 1.55
　Thickness (Fresnel depth): 4
　Cutting tool angle (dSv): 45
　S1_0=120.189867
　S1_2=6.64720895E−06
　S1_4=−4.04186259E−13
　S1_6=−9.52699116E−19
　S1_8=2.18081022E−25

Construction Data of Example 8

So (Display Device Surface)
Coordinates:
　O: 0.00000, 0.00000, 0.00000
　VX: 1.00000000, 0.00000000, 0.00000000
　VY: 0.00000000, 1.00000000, 0.00000000
N=1.00000
C0=0.00000000
N'=1.00000
T'=0.47
S1 (Entrance side surface of cover glass)
N=1.00000
C0=0.00000000
N'=1.51045, νd=61.19
T'=3
S2 (Exit Side Surface of Cover Glass)
N=1.51045, νd=61.19
C0=0.00000000
N'=1.00000
S3* (Entrance Side Surface of Lens L1)
Coordinates:
　O: 30.00000, 11.85400, 0.00000
　VX: 1.00000000, 0.00000000, 0.00000000
　VY: 0.00000000, 1.00000000, 0.00000000
N=1.00000
C0=−0.00756906 (r=−132.1168)
Aspherical surface data:
　ϵ=1.00000000
　A(4)=−6.47898870E−5
　A(6)=−8.58213925E−8
　A(8)=3.39482299E−10
　A(10)=2.10166686E−12
　A(12)=−7.14390478E−14
N'=1.81077, νd=40.92
T'=2.94527
S4* (Exit Side Surface of Lens L1)
N=1.81077, νd=40.92
C0=−0.00424799 (r=−235.4057)
Aspherical surface data:
　ϵ=1.00000000
　A(4)=−3.81472797E−5
　A(6)=−3.36186200E−8

A(8)=5.94761928E-10
A(10)=-8.60782507E-12
A(12)=-1.00548738E-14
N'=1.00000
S5 (Entrance Side Surface of Lens L2)
Coordinates:
 O: 34.34138, 11.85400, 0.00000
 VX: 1.00000000, 0.00000000, 0.00000000
 VY: 0.00000000, 1.00000000, 0.00000000
N=1.00000
C0=-0.02176201 (r=-45.9516)
N'=1.62408, νd=36.30
T'=1.48172
S6 (Exit Side Surface of Lens L2)
N=1.62408, νd=36.30
C0=0.00864923 (r=115.6172)
N'=1.55278, νd=47.00
T'=0.01
S7 (Entrance Side Surface of Lens L3)
N=1.55278, νd=47.00
C0=0.00864923 (r=115.6172)
N'=1.62032, νd=63.33
T'=6.20486
S8 (Exit Side Surface of Lens L3)
N=1.62032, νd=63.33
C0=-0.04698378 (r=-21.2839)
N'=1.00000
**S9* (Entrance Side Surface of Lens L4)**
Coordinates:
 O: 42.33293, 11.85400, 0.00000
 VX: 1.00000000, 0.00000000, 0.00000000
 VY: 0.00000000, 1.00000000, 0.00000000
N=1.00000
C0=-0.04344415 (r=-23.0181)
Aspherical surface data:
 ε=1.00000000
 A(4)=-7.12446794E-6
 A(6)=4.15973419E-10
 A(8)=-2.26656233E-10
 A(10)=-2.28171399E-12
 A(12)=-9.12826250E-15
N'=1.73505, νd=40.51
T'=3.48277
**S10* (Exit Side Surface of Lens L4)**
N=1.73505, νd=40.51
C0=-0.03448623 (r=-28.9971)
Aspherical surface data:
 ε=1.00000000
 A(4)=-1.00284883E-6
 A(6)=3.60938514E-9
 A(8)=-8.21658340E-11
 A(10)=-7.80958591E-13
 A(12)=-4.79410070E-16
N'=1.00000
S11 (Entrance Side Surface of Lens L5)
Coordinates:
 O: 47.66304, 11.85400, 0.00000
 VX: 1.00000000, 0.00000000, 0.00000000
 VY: 0.00000000, 1.00000000, 0.00000000
N=1.00000
C0=0.00690935 (r=144.7313)
N'=1.49845, νd=81.61
T'=5.11068
S12 (Exit Side Surface of Lens L5)
N=1.49845, νd=81.61
C0=-0.02664090 (r=-37.5363)
N'=1.00000

S13 (Entrance Side Surface of Lens L6)
Coordinates:
 O: 53.01981, 11.85400, 0.00000
 VX: 1.00000000, 0.00000000, 0.00000000
 VY: 0.00000000, 1.00000000, 0.00000000
N=1.00000
C0=0.01026072 (r=97.4590)
N'=1.49845, νd=81.61
T'=5.64503
S14 (Exit side surface of lens L6)
N=1.49845, νd=81.61
C0=-0.02398996 (r=-41.6841)
N'=1.00000
**S15* (Entrance Side Surface of Lens L7)**
Coordinates:
 O: 61.05429, 11.85400, 0.00000
 VX: 1.00000000, 0.00000000, 0.00000000
 VY: 0.00000000, 1.00000000, 0.00000000
N=1.00000
C0=-0.00850738 (r—117.5450)
Aspherical surface data:
 ε=1.00000000
 A(4)=-4.35389846E-6
 A(6)=-1.11519913E-8
 A(8)=2.54648495E-11
 A(10)=4.78250546E-14
 A(12)=5.07581461E-17
N'=1.62408, νd=36.26
T'=3.43348
**S16* (Exit Side Surface of Lens L7)**
N=1.62408, νd=36.26
C0=0.00667826 (r=149.7397)
Aspherical surface data:
 ε=1.00000000
 A(4)=-1.03450084E-5
 A(6)=-1.17975617E-8
 A(8)=-1.76766200E-12
 A(10)=3.36388195E-13
 A(12)=-4.80965109E-16
N'=1.00000
S17 (Entrance Side Surface of Lens L8)
Coordinates:
 O: 66.33797, 11.85400, 0.00000
 VX: 1.00000000, 0.00000000, 0.00000000
 VY: 0.00000000, 1.00000000, 0.00000000
N=1.00000
C0=-0.00719231 (r=-139.0374)
N'=1.51872, νd=64.20
T'=2.84665
S18 (Exit Side Surface of Lens L8)
N=1.51872, νd=64.20
C0=0.02996940 (r=33.3674)
N'=1.00000
S19$ (Entrance Side Surface of Lens L9)
Coordinates:
 O: 79.00277, 11.85400, 0.00000
 VX: 1.00000000, 0.00000000, 0.00000000
 VY: 0.00000000, 1.00000000, 0.00000000
N=1.00000
C0=-0.01947252 (r=-51.3544)
Aspherical surface data:
 ε=1.00000000
 G(2, 0)=-0.000720353514
 G(3, 0)=2.72158948E-5
 G(4, 0)=-8.76500364E-7
 G(5, 0)=-7.85909742E-7
 G(6, 0)=6.02529193E-8

G(7, 0)=−6.14011558E-10
G(8, 0)=−2.34559459E-10
G(9, 0)=1.18588357E-11
G(10, 0)=−1.99186714E-13
G(0, 2)=−0.000508365393
G(1, 2)=−7.49182921E-6
G(2, 2)=−2.14707566E-6
G(3, 2)=−3.72712034E-7
G(4, 2)=−1.04907069E-8
G(5, 2)=2.16586724E-9
G(6, 2)=−3.83142318E-10
G(7, 2)=1.66351136E-11
G(8, 2)=−3.54421373E-13
G(0, 4)=−2.38174657E-6
G(1, 4)=6.11063407E-8
G(2, 4)=−2.95664693E-8
G(3, 4)=−5.61494498E-10
G(4, 4)=−2.63937020E-10
G(5, 4)=3.02745501E-11
G(6, 4)=−1.14545152E-12
G(0, 6)=−6.30634098E-9
G(1, 6)=−6.08731511E-10
G(2, 6)=−1.51255745E-10
G(3, 6)=3.26299014E-11
G(4, 6)=−1.79642245E-12
G(0, 8)=−2.24925282E-11
G(1, 8)=3.89848979E-12
G(2, 8)=−4.21435059E-13
G(0, 10)=−1.28775807E-14
N'=1.49473, vd=57.49
T'=4.59329
S20 (Exit Side Surface of Lens L9)
N=1.49473, vd=57.49
C0=−0.03089394 (r=−32.3688)
N'=1.00000
S21$ (First Curved Mirror M1)
Coordinates:
  O: 185.34279, 5.45535, 0.00000
  VX: 0.94163338, −0.33664013, 0.00000000
  VY: 0.33664013, 0.94163338, 0.00000000
N=1.00000
C0=−0.00051331 (r=−1948.1454)
Aspherical surface data:
  ϵ=1.00000000
  G(2, 0)=0.000298006725
  G(3, 0)=−5.25129086E-5
  G(4, 0)=7.52848424E-7
  G(5, 0)=3.12171473E-9
  G(6, 0)=−1.15756056E-10
  G(7, 0)=1.13430125E-13
  G(8, 0)=1.18668784E-14
  G(9, 0)=−9.91515531E-17
  G(10, 0)=2.48505740E-19
  G(0, 2)=−0.000933948425
  G(1, 2)=−3.64286763E-5
  G(2, 2)=7.28616575E-7
  G(3, 2)=1.81826059E-8
  G(4, 2)=−3.95507455E-10
  G(5, 2)=−2.28967763E-13
  G(6, 2)=5.62030086E-14
  G(7, 2)=−4.94534812E-16
  G(8, 2)=1.42804284E-18
  G(0, 4)=−1.39602496E-7
  G(1, 4)=4.01434848E-8
  G(2, 4)=−1.01306135E-9
  G(3, 4)=5.11622201E-12
  G(4, 4)=8.68687051E-14
  G(5, 4)=−1.11274373E-15
  G(6, 4)=3.54376115E-18
  G(0, 6)=1.70321144E-10
  G(1, 6)=−1.49576847E-11
  G(2, 6)=3.69709061E-13
  G(3, 6)=−3.68598417E-15
  G(4, 6)=1.31563915E-17
  G(0, 8)=3.31887379E-15
  G(1, 8)=2.31284478E-16
  G(2, 8)=−3.32132081E-18
  G(0, 10)=−1.71601882E-18
N'=−1.00000
S22$ (Second Curved Mirror M2)
Coordinates:
  O: 111.12028, 80.69443, 0.00000
  VX: −0.80102017, 0.59863736, 0.00000000
  VY: 0.59863736, 0.80102017, 0.00000000
N=1.00000
C0=0.03408955 (r=29.3345)
Aspherical surface data:
  ϵ=−2.81529548
  G(2, 0)=0.00225251163
  G(3, 0)=−3.54107233E-5
  G(4, 0)=1.82548091E-7
  G(5, 0)=−6.12660642E-11
  G(6, 0)=−1.37381002E-12
  G(7, O)=−1.24565046E-14
  G(8, 0)=1.82963256E-17
  G(9, 0)=7.26819669E-19
  G(10, O)=−2.25114533E-21
  G(0, 2)=0.00171574511
  G(1, 2)=−2.37070756E-5
  G(2, 2)=−2.23639516E-7
  G(3, 2)=5.15594295E-9
  G(4, 2)=−2.35279001E-11
  G(5, 2)=−5.78855931E-14
  G(6, 2)=4.40574216E-16
  G(7, 2)=2.34088110E-18
  G(8, 2)=−1.52676710E-20
  G(0, 4)=−4.54241113E-7
  G(1, 4)=1.06618008E-8
  G(2, 4)=−8.00196365E-11
  G(3, 4)=3.60734813E-14
  G(4, 4)=1.70137006E-15
  G(5, 4)=−3.17197148E-18
  G(6, 4)=−3.34691360E-21
  G(0, 6)=4.70587461E-11
  G(1, 6)=−1.31417169E-12
  G(2, 6)=1.56153887E-14
  G(3, 6)=−8.64960863E-17
  G(4, 6)=1.81620614E-19
  G(0, 8)=−1.72229845E-15
  G(1, 8)=7.43342365E-19
  G(2, 8)=2.84799198E-20
  G(0, 10)=1.81655492E-19
N'=−1.00000
S23 (First Flat Mirror F1)
Coordinates:
  O: 34.98786, 956.19240, 0.00000
  VX: 0.66186840, 0.74962005, 0.00000000
  VY: −0.74962005, 0.66186840, 0.00000000
N=1.00000
C0=0.00000000
N'=−1.00000
Si (Screen Surface)
Coordinates:
  O: 414.54029, 137.28298, 0.00000
  VX: 0.66694741, −0.74510479, 0.00000000
  VY: 0.74510479, 0.66694741, 0.00000000

Fresnel lens data (TIR Fresnel Screen Construction Data):
    Amount of offset (Fresnel shift): 943.803641
    Refractive index (Fresnel index): 1.55
    Thickness (Fresnel depth): 4
    Cutting tool angle (dSv): 45
    $S1\_0=117.732103$
    $S1\_2=2.29317316E-5$
    $S1\_4=-2.02725482E-11$
    $S1\_6=8.56035847E-18$
    $S1\_8=-1.36290261E-24$
Virtual aperture stop data:
Coordinates:
    O: 34.98786, 11.80573, 0.00000
    VX: 1.00000000, 0.00000000, 0.00000000
    VY: 0.00000000, 1.00000000, 0.00000000
$N=1.00000$
$C0=0.00000000$, $R=7.14187$
$N'=1.00000$ Construction Data of Example 9

So (Display Device Surface)
Coordinates:
    O: 0.00000, 0.00000, 0.00000
    VX: 1.00000000, 0.00000000, 0.00000000
    VY: 0.00000000, 1.00000000, 0.00000000
$N=1.00000$
$C0=0.00000000$
$N'=1.00000$
$T'=0.5$
S1 (Entrance Side Surface of Cover Glass)
$N=1.00000$
$C0=0.00000000$
$N'=1.51045$, $vd=61.19$
$T'=3$
S2 (Exit Side Surface of Cover Glass)
$N=1.51045$, $vd=61.19$
$C0=0.00000000$
$N'=1.00000$
S3* (Entrance Side Surface of Lens L1)
Coordinates:
    O: 33.20000, 6.91323, 0.00000
    VX: 1.00000000, 0.00000000, 0.00000000
    VY: 0.00000000, 1.00000000, 0.00000000
$N=1.00000$
$C0=0.01893964$ ($r=52.7993$)
Aspherical surface data:
    $\epsilon=1.00000000$
    $A(4)=2.56803310E-6$
    $A(6)=-2.33978410E-7$
    $A(8)=2.18273203E-8$
    $A(10)=-8.62361777E-10$
    $A(12)=1.54392286E-11$
    $A(14)=-1.04665361E-13$
$N'=1.81080$, $vd=40.73$
$T'=2.35028$
S4 (Exit Side Surface of Lens L1)
$N=1.81080$, $vd=40.73$
$C0=0.00000000$
$N'=1.00000$
$T'=1.10979$
S5 (Entrance Side Surface of Lens L2)
$N=1.00000$
$C0=-0.00554872$ ($r=-180.2219$)
$N'=1.76167$, $vd=27.53$
$T'=0.99634$
S6 (Exit Side Surface of Lens L2)
$N=1.76167$, $vd=27.53$
$C0=0.06086748$ ($r=16.4291$)
$N'=1.55278$, $vd=47.00$
$T'=0.01$
S7 (Entrance Side Surface of Lens L3)
$N=1.55278$, $vd=47.00$
$C0=0.06086748$ ($r=16.4291$)
$N'=1.62032$, $vd=63.39$
$T'=3.8906$
S8 (Exit Side Surface of Lens L3)
$N=1.62032$, $vd=63.39$
$C0=-0.03350181$ ($r=-29.8491$)
$N'=1.00000$
$T'=10.2129$
S9 (Entrance Side Surface of Lens L4)
$N=1.00000$
$C0=0.03589901$ ($r=27.8559$)
$N'=1.83930$, $vd=37.34$
$T'=9.88911$
S10 (Exit Side Surface of Lens L4)
$N=1.83930$, $vd=37.34$
$C0=-0.02769621$ ($r=-36.1060$)
$N'=1.00000$
$T'=2.89414$
S11 (Entrance Side Surface of Lens L5)
$N=1.00000$
$C0=-0.03975663$ ($r=-25.1530$)
$N'=1.52729$, $vd=56.38$
$T'=1.97134$
S12* (Exit Side Surface of Lens L5)
$N=1.52729$, $vd=56.38$
$C0=0.00735349$ ($r=135.9898$)
Aspherical surface data:
    $\epsilon=1.00000000$
    $A(4)=-1.59245285E-5$
    $A(6)=-3.36672277E-7$
    $A(8)=3.88533051E-9$
    $A(10)=-7.19354683E-11$
    $A(12)=5.12672642E-13$
    $A(14)=-1.71886172E-15$
$N'=1.00000$
$T'=4.25299$
S13 (Entrance Side Surface of Lens L6)
$N=1.00000$
$C0=-0.06467905$ ($r=-15.4610$)
$N'=1.81184$, $vd=33.27$
$T'=3.11361$
S14 (Exit Side Surface of Lens L6)
$N=1.81184$, $vd=33.27$
$C0=0.00519459$ ($r=192.5079$)
$N'=1.00000$
$T'=10.343$
S15 (Entrance Side Surface of Lens L7)
$N=1.00000$
$C0=-0.03007094$ ($r=-33.2547$)
$N'=1.52729$, $vd=56.38$
$T'=4.98728$
S16* (Exit Side Surface of Lens L7)
$N=1.52729$, $vd=56.38$
$C0=-0.04926185$ ($r=-20.2997$)
    Aspherical surface data:
        $\epsilon=1.00000000$
        $A(4)=7.24262515E-6$
        $A(6)=-1.25015676E-9$
        $A(8)=1.92163878E-10$ A(10)=−2.67310763E-13
A(12)=1.24864704E-16
A(14)=3.83786599E-18
N'=1.00000
S17$ (First Curved Mirror M1)
Coordinates:
  O: 469.69346, −2.97720, 0.00000
  VX: 0.98910420, −0.14721711, 0.00000000
  VY: 0.14721711, 0.98910420, 0.00000000
N=1.00000
C0=−0.00615210 (r=−162.5460)
Aspherical surface data:
  ϵ=−0.0238389328
  G(2, 0)=−0.00463562414
  G(3, 0)=2.64124281E-6
  G(4, 0)=5.25647976E-8
  G(5, 0)=3.33746274E-10
  G(6, 0)=−3.35351441E-12
  G(7, 0)=−1.44125853E-14
  G(8, 0)=3.21184722E-17
  G(9, 0)=8.90334984E-19
  G(10, 0)=−3.53364082E-21
  G(0, 2)=−0.00440370114
  G(1, 2)=−1.44565660E-7
  G(2, 2)=3.17643608E-7
  G(3, 2)=−5.77424699E-10
  G(4, 2)=−4.97066316E-12
  G(5, 2)=−1.77897961E-13
  G(6, 2)=1.63238276E-15
  G(7, 2)=−2.62397401E-18
  G(8, 2)=−7.37736155E-21
  G(0, 4)=3.78727456E-7
  G(1, 4)=−2.89101052E-9
  G(2, 4)=−1.87405562E-11
  G(3, 4)=1.11601799E-13
  G(4, 4)=1.09361972E-15
  G(5, 4)=−6.15849330E-18
  G(6, 4)=6.50730140E-26
  G(0, 6)=−3.37650527E-11
  G(1, 6)=3.76844361E-13
  G(2, 6)=−4.13924992E-16
  G(3, 6)=−7.76324906E-18
  G(4, 6)=1.49985376E-20
  G(0, 8)=1.52978153E-15
  G(1, 8)=−1.54862124E-17
  G(2, 8)=5.25586903E-20
  G(0, 10)=−2.05030384E-20
N'=−1.00000
Si (Screen Surface)
Coordinates:
  O: 141.04848, −741.57825, 0.00000
  VX: −1.00000000, 0.00000000, 0.00000000
  VY: 0.00000000, 1.00000000, 0.00000000
Fresnel lens data (TIR Fresnel Screen Construction Data):
  Amount of offset (Fresnel shift): 743.960346
  Refractive index (Fresnel index): 1.55
  Thickness (Fresnel depth): 4
  Cutting tool angle (dSv): 45
  S1_0=115.079490
  S1_2=4.15209860E-5
  S1_4=−4.35819722E-11
  S1_6=2.01111893E-17
  S1_8=−3.19838869E-24
Virtual aperture stop data:
Coordinates:
  O: 33.34661, 6.48192, 0.00000
  VX: 1.00000000, 0.00000000, 0.00000000
  VY: 0.00000000, 1.00000000, 0.00000000
N=1.00000
C0=0.00000000, R=5.63661
N'=1.00000

TABLE 1

| | | | Ray incident on screen for Example 1 | | | | | | |
|---|---|---|---|---|---|---|---|---|---|
| | Incidence position (screen center) | | | Incidence position (Fresnel center) | | | Incident ray vector | | |
| Label | X | Y | Z | X | Y | Z | Ex | Ey | Ez | Incident angle |
| TK11 | 0.0 | 394.4 | 0.0 | 0.0 | −1225.4 | 0.0 | 0.324869 | −0.945759 | 0.000000 | 71.0 |
| TK12 | 0.0 | 394.4 | 176.2 | 0.0 | −1225.5 | −176.2 | 0.322737 | −0.937134 | −0.132743 | 71.2 |
| TK13 | 0.0 | 394.7 | 352.6 | 0.0 | −1225.7 | −352.6 | 0.316661 | −0.912602 | −0.258618 | 71.5 |
| TK14 | 0.0 | 395.2 | 529.0 | 0.0 | −1226.3 | −529.0 | 0.307648 | −0.875717 | −0.372119 | 72.1 |
| TK15 | 0.0 | 394.6 | 704.0 | 0.0 | −1225.7 | −704.0 | 0.297330 | −0.830993 | −0.470154 | 72.7 |
| TK21 | 0.0 | 197.4 | 0.0 | 0.0 | −1028.4 | 0.0 | 0.364943 | −0.931030 | 0.000000 | 68.6 |
| TK22 | 0.0 | 197.4 | 176.0 | 0.0 | −1028.5 | −176.0 | 0.361375 | −0.919528 | −0.154520 | 68.8 |
| TK23 | 0.0 | 197.6 | 352.0 | 0.0 | −1028.6 | −352.0 | 0.351512 | −0.887401 | −0.298260 | 69.4 |
| TK24 | 0.0 | 197.8 | 528.0 | 0.0 | −1028.8 | −528.0 | 0.337410 | −0.840609 | −0.423711 | 70.3 |
| TK25 | 0.0 | 198.0 | 703.6 | 0.0 | −1029.1 | −703.6 | 0.321467 | −0.786118 | −0.527900 | 71.2 |
| TK31 | 0.0 | 0.0 | 0.0 | 0.0 | −831.1 | 0.0 | 0.422840 | −0.906204 | 0.000000 | 65.0 |
| TK32 | 0.0 | 0.2 | 175.7 | 0.0 | −831.3 | −175.7 | 0.416426 | −0.890360 | −0.183980 | 65.4 |
| TK33 | 0.0 | 0.7 | 351.9 | 0.0 | −831.8 | −351.9 | 0.399169 | −0.847259 | −0.350452 | 66.5 |
| TK34 | 0.0 | 1.3 | 528.4 | 0.0 | −832.3 | −528.4 | 0.375725 | −0.787404 | −0.488699 | 67.9 |
| TK35 | 0.0 | 2.3 | 704.2 | 0.0 | −833.3 | −704.2 | 0.350693 | −0.721945 | −0.596498 | 69.5 |
| TK41 | 0.0 | −197.0 | 0.0 | 0.0 | −634.1 | 0.0 | 0.508642 | −0.860978 | 0.000000 | 59.4 |
| TK42 | 0.0 | −196.9 | 175.3 | 0.0 | −634.2 | −175.3 | 0.496496 | −0.838408 | −0.224863 | 60.2 |
| TK43 | 0.0 | −196.5 | 351.7 | 0.0 | −634.6 | −351.7 | 0.465036 | −0.779734 | −0.419234 | 62.3 |
| TK44 | 0.0 | −195.8 | 528.9 | 0.0 | −635.2 | −528.9 | 0.425003 | −0.704109 | −0.568861 | 64.8 |
| TK45 | 0.0 | −195.1 | 704.7 | 0.0 | −636.0 | −704.7 | 0.385947 | −0.628263 | −0.675523 | 67.3 |
| TK51 | 0.0 | −393.5 | 0.0 | 0.0 | −437.6 | 0.0 | 0.637762 | −0.770234 | 0.000000 | 50.4 |
| TK52 | 0.0 | −393.7 | 175.0 | 0.0 | −437.3 | −175.0 | 0.612886 | −0.737968 | −0.282443 | 52.2 |
| TK53 | 0.0 | −394.3 | 351.3 | 0.0 | −436.7 | −351.3 | 0.553177 | −0.660307 | −0.507927 | 56.4 |
| TK54 | 0.0 | −394.6 | 528.7 | 0.0 | −436.5 | −528.7 | 0.484996 | −0.571386 | −0.662040 | 61.0 |
| TK55 | 0.0 | −393.9 | 704.1 | 0.0 | −437.2 | −704.1 | 0.425292 | −0.492790 | −0.759134 | 64.8 |

TABLE 2

Ray exiting from screen for Example 1

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 394.4 | 0.0 | 4.0 | −1225.4 | 0.0 | 1.000000 | −0.000596 | 0.000000 | 0.0 |
| TK12 | 4.0 | 394.4 | 176.2 | 4.0 | −1225.5 | −176.2 | 0.999998 | −0.000163 | 0.001980 | 0.1 |
| TK13 | 4.0 | 394.7 | 352.6 | 4.0 | −1225.7 | −352.6 | 0.999990 | 0.001351 | 0.004291 | 0.3 |
| TK14 | 4.0 | 395.2 | 528.9 | 4.0 | −1226.3 | −528.9 | 0.999970 | 0.003267 | 0.007041 | 0.4 |
| TK15 | 4.0 | 394.6 | 704.0 | 4.0 | −1225.7 | −704.0 | 0.999973 | 0.000295 | 0.007348 | 0.4 |
| TK21 | 4.0 | 197.4 | 0.0 | 4.0 | −1028.4 | 0.0 | 0.999999 | 0.001396 | 0.000000 | 0.1 |
| TK22 | 4.0 | 197.4 | 176.0 | 4.0 | −1028.5 | −176.0 | 0.999996 | −0.000218 | 0.002779 | 0.2 |
| TK23 | 4.0 | 197.6 | 352.0 | 4.0 | −1028.6 | −352.0 | 0.999984 | −0.003727 | 0.004150 | 0.3 |
| TK24 | 4.0 | 197.8 | 528.0 | 4.0 | −1028.8 | −528.0 | 0.999972 | −0.005882 | 0.004671 | 0.4 |
| TK25 | 4.0 | 198.0 | 703.5 | 4.0 | −1029.1 | −703.5 | 0.999969 | −0.004063 | 0.006788 | 0.5 |
| TK31 | 4.0 | −0.1 | 0.0 | 4.0 | −831.0 | 0.0 | 0.999714 | 0.023925 | 0.000000 | 1.4 |
| TK32 | 4.0 | 0.2 | 175.7 | 4.0 | −831.2 | −175.7 | 0.999756 | 0.020370 | 0.008542 | 1.3 |
| TK33 | 4.0 | 0.7 | 351.9 | 4.0 | −831.8 | −351.9 | 0.999861 | 0.010900 | 0.012648 | 1.0 |
| TK34 | 4.0 | 1.3 | 528.3 | 4.0 | −832.3 | −528.3 | 0.999942 | −0.000622 | 0.010762 | 0.6 |
| TK35 | 4.0 | 2.3 | 704.2 | 4.0 | −833.3 | −704.2 | 0.999943 | −0.008492 | 0.006412 | 0.6 |
| TK41 | 4.0 | −197.0 | 0.0 | 4.0 | −634.0 | 0.0 | 0.999532 | 0.030579 | 0.000000 | 1.8 |
| TK42 | 4.0 | −196.9 | 175.3 | 4.0 | −634.1 | −175.3 | 0.999465 | 0.029069 | 0.014989 | 1.9 |
| TK43 | 4.0 | −196.5 | 351.6 | 4.0 | −634.5 | −351.6 | 0.999426 | 0.022459 | 0.025347 | 1.9 |
| TK44 | 4.0 | −195.9 | 528.8 | 4.0 | −635.2 | −528.8 | 0.999628 | 0.009710 | 0.025491 | 1.6 |
| TK45 | 4.0 | −195.1 | 704.7 | 4.0 | −636.0 | −704.7 | 0.999864 | −0.004252 | 0.015928 | 0.9 |
| TK51 | 4.0 | −393.4 | 0.0 | 4.0 | −437.7 | 0.0 | 0.999542 | −0.030251 | 0.000000 | 1.7 |
| TK52 | 4.0 | −393.7 | 175.0 | 4.0 | −437.4 | −175.0 | 0.999832 | −0.017319 | 0.005967 | 1.0 |
| TK53 | 4.0 | −394.3 | 351.2 | 4.0 | −436.7 | −351.2 | 0.999708 | 0.001206 | 0.024128 | 1.4 |
| TK54 | 4.0 | −394.6 | 528.6 | 4.0 | −436.5 | −528.6 | 0.999350 | 0.004648 | 0.035746 | 2.1 |
| TK55 | 4.0 | −393.9 | 704.0 | 4.0 | −437.2 | −704.0 | 0.999584 | −0.003717 | 0.028610 | 1.7 |

TABLE 3

Ray incident on screen for Example 2

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 322.9 | 0.0 | 0.0 | 1196.1 | 0.0 | 0.287412 | 0.957807 | 0.000000 | 73.3 |
| TK12 | 0.0 | 323.0 | −144.1 | 0.0 | 1196.2 | −144.1 | 0.286226 | 0.951669 | −0.111360 | 73.4 |
| TK13 | 0.0 | 323.2 | −288.1 | 0.0 | 1196.5 | −288.1 | 0.282851 | 0.933970 | −0.218395 | 73.6 |
| TK14 | 0.0 | 323.3 | −432.1 | 0.0 | 1196.5 | −432.1 | 0.277784 | 0.906551 | −0.317809 | 73.9 |
| TK15 | 0.0 | 322.4 | −576.0 | 0.0 | 1195.7 | −576.0 | 0.271753 | 0.871777 | −0.407622 | 74.2 |
| TK21 | 0.0 | 161.9 | 0.0 | 0.0 | 1035.2 | 0.0 | 0.313259 | 0.949668 | 0.000000 | 71.7 |
| TK22 | 0.0 | 162.2 | −144.0 | 0.0 | 1035.4 | −144.0 | 0.311365 | 0.941823 | −0.126577 | 71.9 |
| TK23 | 0.0 | 162.7 | −287.8 | 0.0 | 1036.0 | −287.8 | 0.306080 | 0.919439 | −0.246874 | 72.2 |
| TK24 | 0.0 | 162.9 | −431.6 | 0.0 | 1036.2 | −431.6 | 0.298365 | 0.885417 | −0.356393 | 72.6 |
| TK25 | 0.0 | 162.3 | −575.7 | 0.0 | 1035.6 | −575.7 | 0.289262 | 0.843294 | −0.452971 | 73.2 |
| TK31 | 0.0 | 0.0 | 0.0 | 0.0 | 873.3 | 0.0 | 0.349473 | 0.936947 | 0.000000 | 69.5 |
| TK32 | 0.0 | 0.2 | −143.9 | 0.0 | 873.4 | −143.9 | 0.346408 | 0.926559 | −0.146594 | 69.7 |
| TK33 | 0.0 | 0.5 | −287.7 | 0.0 | 873.8 | −287.7 | 0.337939 | 0.897373 | −0.283759 | 70.2 |
| TK34 | 0.0 | 0.6 | −431.5 | 0.0 | 873.9 | −431.5 | 0.325807 | 0.854269 | −0.405060 | 71.0 |
| TK35 | 0.0 | 0.3 | −575.6 | 0.0 | 873.6 | −575.6 | 0.311851 | 0.802979 | −0.507911 | 71.8 |
| TK41 | 0.0 | −162.1 | 0.0 | 0.0 | 711.1 | 0.0 | 0.401696 | 0.915773 | 0.000000 | 66.3 |
| TK42 | 0.0 | −162.1 | −144.0 | 0.0 | 711.2 | −144.0 | 0.396403 | 0.901500 | −0.173674 | 66.6 |
| TK43 | 0.0 | −161.9 | −288.0 | 0.0 | 711.3 | −288.0 | 0.382039 | 0.862396 | −0.332145 | 67.5 |
| TK44 | 0.0 | −161.9 | −431.8 | 0.0 | 711.4 | −431.8 | 0.362151 | 0.807185 | −0.466153 | 68.8 |
| TK45 | 0.0 | −162.0 | −575.4 | 0.0 | 711.2 | −575.4 | 0.340466 | 0.745150 | −0.573441 | 70.1 |
| TK51 | 0.0 | −323.4 | 0.0 | 0.0 | 549.8 | 0.0 | 0.478522 | 0.878076 | 0.000000 | 61.4 |
| TK52 | 0.0 | −323.5 | −144.3 | 0.0 | 549.8 | −144.3 | 0.468636 | 0.857794 | −0.211116 | 62.1 |
| TK53 | 0.0 | −323.6 | −288.4 | 0.0 | 549.7 | −288.4 | 0.442837 | 0.804459 | −0.395906 | 63.7 |
| TK54 | 0.0 | −323.7 | −432.4 | 0.0 | 549.6 | −432.4 | 0.409305 | 0.734199 | −0.541684 | 65.8 |
| TK55 | 0.0 | −323.7 | −575.3 | 0.0 | 549.5 | −575.3 | 0.375412 | 0.661448 | −0.649271 | 68.0 |

TABLE 4

Ray exiting from screen for Example 2

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 322.9 | 0.0 | 4.0 | 1196.2 | 0.0 | 0.999709 | 0.024140 | 0.000000 | 1.4 |
| TK12 | 4.0 | 323.0 | −144.1 | 4.0 | 1196.3 | −144.1 | 0.999728 | 0.023314 | 0.000505 | 1.3 |
| TK13 | 4.0 | 323.2 | −288.1 | 4.0 | 1196.5 | −288.1 | 0.999820 | 0.018848 | 0.001988 | 1.1 |
| TK14 | 4.0 | 323.3 | −432.1 | 4.0 | 1196.6 | −432.1 | 0.999958 | 0.004445 | 0.007954 | 0.5 |
| TK15 | 4.0 | 322.3 | −575.9 | 4.0 | 1195.6 | −575.9 | 0.999142 | −0.031104 | 0.027336 | 2.4 |
| TK21 | 4.0 | 161.9 | 0.0 | 4.0 | 1035.2 | 0.0 | 0.999989 | 0.004584 | 0.000000 | 0.3 |
| TK22 | 4.0 | 162.2 | −144.0 | 4.0 | 1035.5 | −144.0 | 0.999966 | 0.007566 | 0.003333 | 0.5 |
| TK23 | 4.0 | 162.7 | −287.8 | 4.0 | 1036.0 | −287.8 | 0.999871 | 0.015482 | 0.004276 | 0.9 |
| TK24 | 4.0 | 163.0 | −431.6 | 4.0 | 1036.2 | −431.6 | 0.999688 | 0.024887 | 0.002065 | 1.4 |
| TK25 | 4.0 | 162.4 | −575.7 | 4.0 | 1035.6 | −575.7 | 0.999583 | 0.028877 | −0.000199 | 1.7 |
| TK31 | 4.0 | −0.1 | 0.0 | 4.0 | 873.2 | 0.0 | 0.999538 | −0.030386 | 0.000000 | 1.7 |
| TK32 | 4.0 | 0.1 | −143.9 | 4.0 | 873.4 | −143.9 | 0.999575 | −0.027167 | 0.010547 | 1.7 |
| TK33 | 4.0 | 0.5 | −287.7 | 4.0 | 873.7 | −287.7 | 0.999693 | −0.017511 | 0.017528 | 1.4 |
| TK34 | 4.0 | 0.6 | −431.5 | 4.0 | 873.9 | −431.5 | 0.999839 | −0.002078 | 0.017843 | 1.0 |
| TK35 | 4.0 | 0.4 | −575.5 | 4.0 | 873.6 | −575.5 | 0.999813 | 0.016299 | 0.010393 | 1.1 |
| TK41 | 4.0 | −162.2 | 0.0 | 4.0 | 711.1 | 0.0 | 0.999526 | −0.030788 | 0.000000 | 1.8 |
| TK42 | 4.0 | −162.1 | −144.0 | 4.0 | 711.1 | −144.0 | 0.999432 | −0.030198 | 0.014990 | 1.9 |
| TK43 | 4.0 | −162.0 | −287.9 | 4.0 | 711.2 | −287.9 | 0.999248 | −0.026935 | 0.027881 | 2.2 |
| TK44 | 4.0 | −161.9 | −431.7 | 4.0 | 711.3 | −431.7 | 0.999229 | −0.018107 | 0.034836 | 2.3 |
| TK45 | 4.0 | −162.0 | −575.3 | 4.0 | 711.2 | −575.3 | 0.999503 | −0.002493 | 0.031420 | 1.8 |
| TK51 | 4.0 | −323.4 | 0.0 | 4.0 | 549.9 | 0.0 | 0.999698 | 0.024556 | 0.000000 | 1.4 |
| TK52 | 4.0 | −323.4 | −144.2 | 4.0 | 549.8 | −144.2 | 0.999786 | 0.018573 | 0.009094 | 1.2 |
| TK53 | 4.0 | −323.6 | −288.4 | 4.0 | 549.7 | −288.4 | 0.999717 | 0.006103 | 0.023006 | 1.4 |
| TK54 | 4.0 | −323.7 | −432.3 | 4.0 | 549.6 | −432.3 | 0.999277 | −0.002593 | 0.037936 | 2.2 |
| TK55 | 4.0 | −323.7 | −575.1 | 4.0 | 549.5 | −575.1 | 0.999013 | −0.001190 | 0.044405 | 2.5 |

TABLE 5

Ray incident on screen for Example 3

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 362.0 | 0.0 | 0.0 | 1361.6 | 0.0 | 0.288603 | 0.957449 | 0.000000 | 73.2 |
| TK12 | 0.0 | 362.0 | −161.3 | 0.0 | 1361.6 | −161.3 | 0.287372 | 0.951373 | −0.110932 | 73.3 |
| TK13 | 0.0 | 362.2 | −322.7 | 0.0 | 1361.8 | −322.7 | 0.283788 | 0.933821 | −0.217816 | 73.5 |
| TK14 | 0.0 | 362.5 | −484.2 | 0.0 | 1362.2 | −484.2 | 0.278299 | 0.906596 | −0.317227 | 73.8 |
| TK15 | 0.0 | 361.8 | −645.8 | 0.0 | 1361.4 | −645.8 | 0.271724 | 0.872017 | −0.407127 | 74.2 |
| TK21 | 0.0 | 181.3 | 0.0 | 0.0 | 1180.9 | 0.0 | 0.316154 | 0.948708 | 0.000000 | 71.6 |
| TK22 | 0.0 | 181.5 | −161.2 | 0.0 | 1181.2 | −161.2 | 0.314185 | 0.940949 | −0.126103 | 71.7 |
| TK23 | 0.0 | 182.1 | −322.4 | 0.0 | 1181.7 | −322.4 | 0.308634 | 0.918784 | −0.246134 | 72.0 |
| TK24 | 0.0 | 182.5 | −483.7 | 0.0 | 1182.1 | −483.7 | 0.300411 | 0.885049 | −0.355587 | 72.5 |
| TK25 | 0.0 | 182.3 | −645.6 | 0.0 | 1181.9 | −645.6 | 0.290588 | 0.843233 | −0.452236 | 73.1 |
| TK31 | 0.0 | 0.0 | 0.0 | 0.0 | 999.6 | 0.0 | 0.354228 | 0.935159 | 0.000000 | 69.3 |
| TK32 | 0.0 | 0.2 | −161.2 | 0.0 | 999.8 | −161.2 | 0.351046 | 0.924917 | −0.145927 | 69.4 |
| TK33 | 0.0 | 0.6 | −322.4 | 0.0 | 1000.2 | −322.4 | 0.342212 | 0.896106 | −0.282641 | 70.0 |
| TK34 | 0.0 | 0.9 | −483.7 | 0.0 | 1000.5 | −483.7 | 0.329455 | 0.853483 | −0.403765 | 70.8 |
| TK35 | 0.0 | 0.9 | −645.5 | 0.0 | 1000.6 | −645.5 | 0.314647 | 0.802660 | −0.506689 | 71.7 |
| TK41 | 0.0 | −181.5 | 0.0 | 0.0 | 818.1 | 0.0 | 0.408280 | 0.912857 | 0.000000 | 65.9 |
| TK42 | 0.0 | −181.4 | −161.3 | 0.0 | 818.2 | −161.3 | 0.402839 | 0.898858 | −0.172555 | 66.2 |
| TK43 | 0.0 | −181.1 | −322.7 | 0.0 | 818.5 | −322.7 | 0.388023 | 0.860430 | −0.330300 | 67.2 |
| TK44 | 0.0 | −181.0 | −484.1 | 0.0 | 818.7 | −484.1 | 0.367388 | 0.806003 | −0.464095 | 68.4 |
| TK45 | 0.0 | −180.9 | −645.5 | 0.0 | 818.7 | −645.5 | 0.344688 | 0.744602 | −0.571627 | 69.8 |
| TK51 | 0.0 | −362.0 | 0.0 | 0.0 | 637.6 | 0.0 | 0.486702 | 0.873568 | 0.000000 | 60.9 |
| TK52 | 0.0 | −362.0 | −161.6 | 0.0 | 637.6 | −161.6 | 0.476695 | 0.853834 | −0.209116 | 61.5 |
| TK53 | 0.0 | −362.1 | −323.2 | 0.0 | 637.6 | −323.2 | 0.450462 | 0.801734 | −0.392820 | 63.2 |
| TK54 | 0.0 | −362.1 | −484.9 | 0.0 | 637.5 | −484.9 | 0.416116 | 0.732666 | −0.538561 | 65.4 |
| TK55 | 0.0 | −362.3 | −645.8 | 0.0 | 637.4 | −645.8 | 0.381036 | 0.660624 | −0.646828 | 67.6 |

TABLE 6

Ray exiting from screen for Example 3

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 362.0 | 0.0 | 4.0 | 1361.6 | 0.0 | 0.999977 | −0.006727 | 0.000000 | 0.4 |
| TK12 | 4.0 | 361.9 | −161.3 | 4.0 | 1361.6 | −161.3 | 0.999976 | −0.006517 | 0.002518 | 0.4 |
| TK13 | 4.0 | 362.2 | −322.6 | 4.0 | 1361.8 | −322.6 | 0.999974 | −0.005381 | 0.004713 | 0.4 |
| TK14 | 4.0 | 362.5 | −484.2 | 4.0 | 1362.2 | −484.2 | 0.999984 | −0.001217 | 0.005476 | 0.3 |
| TK15 | 4.0 | 361.8 | −645.8 | 4.0 | 1361.4 | −645.8 | 0.999939 | 0.011008 | 0.001311 | 0.6 |
| TK21 | 4.0 | 181.3 | 0.0 | 4.0 | 1180.9 | 0.0 | 1.000000 | −0.000112 | 0.000000 | 0.0 |
| TK22 | 4.0 | 181.5 | −161.2 | 4.0 | 1181.2 | −161.2 | 0.999997 | −0.000151 | 0.002331 | 0.1 |
| TK23 | 4.0 | 182.1 | −322.4 | 4.0 | 1181.7 | −322.4 | 0.999989 | −0.000485 | 0.004656 | 0.3 |
| TK24 | 4.0 | 182.5 | −483.7 | 4.0 | 1182.1 | −483.7 | 0.999974 | −0.001404 | 0.007140 | 0.4 |
| TK25 | 4.0 | 182.2 | −645.6 | 4.0 | 1181.9 | −645.6 | 0.999952 | −0.002167 | 0.009562 | 0.6 |
| TK31 | 4.0 | 0.0 | 0.0 | 4.0 | 999.6 | 0.0 | 1.000000 | −0.000499 | 0.000000 | 0.0 |
| TK32 | 4.0 | 0.2 | −161.2 | 4.0 | 999.8 | −161.2 | 0.999995 | 0.000383 | 0.003134 | 0.2 |
| TK33 | 4.0 | 0.6 | −322.4 | 4.0 | 1000.2 | −322.4 | 0.999982 | 0.002530 | 0.005381 | 0.3 |
| TK34 | 4.0 | 0.9 | −483.7 | 4.0 | 1000.5 | −483.7 | 0.999967 | 0.004581 | 0.006650 | 0.5 |
| TK35 | 4.0 | 0.9 | −645.5 | 4.0 | 1000.6 | −645.5 | 0.999956 | 0.004921 | 0.007968 | 0.5 |
| TK41 | 4.0 | −181.5 | 0.0 | 4.0 | 818.1 | 0.0 | 0.999990 | −0.004550 | 0.000000 | 0.3 |
| TK42 | 4.0 | −181.4 | −161.3 | 4.0 | 818.2 | −161.3 | 0.999980 | −0.003489 | 0.005344 | 0.4 |
| TK43 | 4.0 | −181.2 | −322.7 | 4.0 | 818.5 | −322.7 | 0.999959 | −0.000318 | 0.009037 | 0.5 |
| TK44 | 4.0 | −180.9 | −484.1 | 4.0 | 818.7 | −484.1 | 0.999941 | 0.004311 | 0.009975 | 0.6 |
| TK45 | 4.0 | −180.9 | −645.5 | 4.0 | 818.7 | −645.5 | 0.999926 | 0.008492 | 0.008764 | 0.7 |
| TK51 | 4.0 | −362.0 | 0.0 | 4.0 | 637.6 | 0.0 | 0.999932 | 0.011629 | 0.000000 | 0.7 |
| TK52 | 4.0 | −362.0 | −161.6 | 4.0 | 637.6 | −161.6 | 0.999941 | 0.009704 | 0.004791 | 0.6 |
| TK53 | 4.0 | −362.0 | −323.2 | 4.0 | 637.6 | −323.2 | 0.999925 | 0.006777 | 0.010182 | 0.7 |
| TK54 | 4.0 | −362.1 | −484.8 | 4.0 | 637.5 | −484.8 | 0.999886 | 0.006927 | 0.013407 | 0.9 |
| TK55 | 4.0 | −362.2 | −645.7 | 4.0 | 637.4 | −645.7 | 0.999874 | 0.010267 | 0.012092 | 0.9 |

TABLE 7

Ray incident on screen for Example 4

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 362.0 | 0.0 | 0.0 | 1380.6 | 0.0 | 0.288603 | 0.957449 | 0.000000 | 73.2 |
| TK12 | 0.0 | 362.0 | −161.3 | 0.0 | 1380.6 | −161.3 | 0.287372 | 0.951373 | −0.110932 | 73.3 |
| TK13 | 0.0 | 362.2 | −322.7 | 0.0 | 1380.8 | −322.7 | 0.283788 | 0.933821 | −0.217816 | 73.5 |
| TK14 | 0.0 | 362.5 | −484.2 | 0.0 | 1381.2 | −484.2 | 0.278299 | 0.906596 | −0.317227 | 73.8 |
| TK15 | 0.0 | 361.8 | −645.8 | 0.0 | 1380.5 | −645.8 | 0.271724 | 0.872017 | −0.407127 | 74.2 |
| TK21 | 0.0 | 181.3 | 0.0 | 0.0 | 1200.0 | 0.0 | 0.316154 | 0.948708 | 0.000000 | 71.6 |
| TK22 | 0.0 | 181.5 | −161.2 | 0.0 | 1200.2 | −161.2 | 0.314185 | 0.940949 | −0.126103 | 71.7 |
| TK23 | 0.0 | 182.1 | −322.4 | 0.0 | 1200.7 | −322.4 | 0.308634 | 0.918784 | −0.246134 | 72.0 |
| TK24 | 0.0 | 182.5 | −483.7 | 0.0 | 1201.1 | −483.7 | 0.300411 | 0.885049 | −0.355587 | 72.5 |
| TK25 | 0.0 | 182.3 | −645.6 | 0.0 | 1200.9 | −645.6 | 0.290588 | 0.843233 | −0.452236 | 73.1 |
| TK31 | 0.0 | 0.0 | 0.0 | 0.0 | 1018.6 | 0.0 | 0.354228 | 0.935159 | 0.000000 | 69.3 |
| TK32 | 0.0 | 0.2 | −161.2 | 0.0 | 1018.8 | −161.2 | 0.351046 | 0.924917 | −0.145927 | 69.4 |
| TK33 | 0.0 | 0.6 | −322.4 | 0.0 | 1019.3 | −322.4 | 0.342212 | 0.896106 | −0.282641 | 70.0 |
| TK34 | 0.0 | 0.9 | −483.7 | 0.0 | 1019.5 | −483.7 | 0.329455 | 0.853483 | −0.403765 | 70.8 |
| TK35 | 0.0 | 0.9 | −645.5 | 0.0 | 1019.6 | −645.5 | 0.314647 | 0.802660 | −0.506689 | 71.7 |
| TK41 | 0.0 | −181.5 | 0.0 | 0.0 | 837.2 | 0.0 | 0.408280 | 0.912857 | 0.000000 | 65.9 |
| TK42 | 0.0 | −181.4 | −161.3 | 0.0 | 837.3 | −161.3 | 0.402839 | 0.898858 | −0.172555 | 66.2 |
| TK43 | 0.0 | −181.1 | −322.7 | 0.0 | 837.5 | −322.7 | 0.388023 | 0.860430 | −0.330300 | 67.2 |
| TK44 | 0.0 | −181.0 | −484.1 | 0.0 | 837.7 | −484.1 | 0.367388 | 0.806003 | −0.464095 | 68.4 |
| TK45 | 0.0 | −180.9 | −645.5 | 0.0 | 837.7 | −645.5 | 0.344688 | 0.744602 | −0.571627 | 69.8 |
| TK51 | 0.0 | −362.0 | 0.0 | 0.0 | 656.6 | 0.0 | 0.486702 | 0.873568 | 0.000000 | 60.9 |
| TK52 | 0.0 | −362.0 | −161.6 | 0.0 | 656.6 | −161.6 | 0.476695 | 0.853834 | −0.209116 | 61.5 |
| TK53 | 0.0 | −362.1 | −323.2 | 0.0 | 656.6 | −323.2 | 0.450462 | 0.801734 | −0.392820 | 63.2 |
| TK54 | 0.0 | −362.1 | −484.9 | 0.0 | 656.5 | −484.9 | 0.416116 | 0.732666 | −0.538561 | 65.4 |
| TK55 | 0.0 | −362.3 | −645.8 | 0.0 | 656.4 | −645.8 | 0.381036 | 0.660624 | −0.646828 | 67.6 |

TABLE 8

Ray exiting from screen for Example 4

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 362.0 | 0.0 | 4.0 | 1380.6 | 0.0 | 1.000000 | 0.000307 | 0.000000 | 0.0 |
| TK12 | 4.0 | 362.0 | −161.3 | 4.0 | 1380.6 | −161.3 | 1.000000 | 0.000457 | 0.000139 | 0.0 |
| TK13 | 4.0 | 362.2 | −322.7 | 4.0 | 1380.8 | −322.7 | 1.000000 | 0.000845 | 0.000190 | 0.0 |
| TK14 | 4.0 | 362.5 | −484.2 | 4.0 | 1381.2 | −484.2 | 0.999999 | 0.001095 | 0.000219 | 0.1 |
| TK15 | 4.0 | 361.8 | −645.8 | 4.0 | 1380.5 | −645.8 | 0.999999 | −0.000289 | 0.000964 | 0.1 |
| TK21 | 4.0 | 181.3 | 0.0 | 4.0 | 1200.0 | 0.0 | 1.000000 | −0.000673 | 0.000000 | 0.0 |
| TK22 | 4.0 | 181.5 | −161.2 | 4.0 | 1200.2 | −161.2 | 1.000000 | −0.000738 | 0.000373 | 0.0 |
| TK23 | 4.0 | 182.1 | −322.4 | 4.0 | 1200.7 | −322.4 | 0.999999 | −0.000830 | 0.000773 | 0.1 |
| TK24 | 4.0 | 182.5 | −483.7 | 4.0 | 1201.1 | −483.7 | 0.999999 | −0.000628 | 0.001080 | 0.1 |
| TK25 | 4.0 | 182.3 | −645.6 | 4.0 | 1200.9 | −645.6 | 1.000000 | 0.000216 | 0.000961 | 0.1 |
| TK31 | 4.0 | 0.0 | 0.0 | 4.0 | 1018.7 | 0.0 | 1.000000 | 0.000529 | 0.000000 | 0.0 |
| TK32 | 4.0 | 0.2 | −161.2 | 4.0 | 1018.9 | −161.2 | 1.000000 | 0.000554 | 0.000322 | 0.0 |
| TK33 | 4.0 | 0.6 | −322.4 | 4.0 | 1019.3 | −322.4 | 1.000000 | 0.000506 | 0.000643 | 0.0 |
| TK34 | 4.0 | 0.9 | −483.7 | 4.0 | 1019.5 | −483.7 | 0.999999 | 0.000198 | 0.001068 | 0.1 |
| TK35 | 4.0 | 0.9 | −645.5 | 4.0 | 1019.6 | −645.5 | 0.999999 | −0.000217 | 0.001613 | 0.1 |
| TK41 | 4.0 | −181.5 | 0.0 | 4.0 | 837.2 | 0.0 | 0.999998 | −0.001776 | 0.000000 | 0.1 |
| TK42 | 4.0 | −181.4 | −161.3 | 4.0 | 837.3 | −161.3 | 0.999999 | −0.001366 | 0.000891 | 0.1 |
| TK43 | 4.0 | −181.2 | −322.7 | 4.0 | 837.5 | −322.7 | 0.999999 | −0.000286 | 0.001313 | 0.1 |
| TK44 | 4.0 | −181.0 | −484.1 | 4.0 | 837.7 | −484.1 | 0.999999 | 0.000837 | 0.001212 | 0.1 |
| TK45 | 4.0 | −180.9 | −645.5 | 4.0 | 837.7 | −645.5 | 0.999999 | 0.001187 | 0.001206 | 0.1 |
| TK51 | 4.0 | −362.0 | 0.0 | 4.0 | 656.6 | 0.0 | 1.000000 | 0.000864 | 0.000000 | 0.0 |
| TK52 | 4.0 | −362.0 | −161.6 | 4.0 | 656.6 | −161.6 | 0.999999 | −0.000140 | 0.001012 | 0.1 |
| TK53 | 4.0 | −362.1 | −323.2 | 4.0 | 656.6 | −323.2 | 0.999996 | −0.001218 | 0.002436 | 0.2 |
| TK54 | 4.0 | −362.1 | −484.8 | 4.0 | 656.5 | −484.8 | 0.999996 | −0.000339 | 0.002770 | 0.2 |
| TK55 | 4.0 | −362.3 | −645.8 | 4.0 | 656.4 | −645.8 | 0.999998 | 0.001417 | 0.001692 | 0.1 |

TABLE 9

Ray incident on screen for Example 5

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 362.0 | 0.0 | 0.0 | 1379.7 | 0.0 | 0.288603 | 0.957449 | 0.000000 | 73.2 |
| TK12 | 0.0 | 362.0 | −161.3 | 0.0 | 1379.7 | −161.3 | 0.287372 | 0.951373 | −0.110932 | 73.3 |
| TK13 | 0.0 | 362.2 | −322.7 | 0.0 | 1379.9 | −322.7 | 0.283788 | 0.933821 | −0.217816 | 73.5 |
| TK14 | 0.0 | 362.5 | −484.2 | 0.0 | 1380.3 | −484.2 | 0.278299 | 0.906596 | −0.317227 | 73.8 |
| TK15 | 0.0 | 361.8 | −645.8 | 0.0 | 1379.5 | −645.8 | 0.271724 | 0.872017 | −0.407127 | 74.2 |
| TK21 | 0.0 | 181.3 | 0.0 | 0.0 | 1199.1 | 0.0 | 0.316154 | 0.948708 | 0.000000 | 71.6 |
| TK22 | 0.0 | 181.5 | −161.2 | 0.0 | 1199.3 | −161.2 | 0.314185 | 0.940949 | −0.126103 | 71.7 |
| TK23 | 0.0 | 182.1 | −322.4 | 0.0 | 1199.8 | −322.4 | 0.308634 | 0.918784 | −0.246134 | 72.0 |
| TK24 | 0.0 | 182.5 | −483.7 | 0.0 | 1200.2 | −483.7 | 0.300411 | 0.885049 | −0.355587 | 72.5 |
| TK25 | 0.0 | 182.3 | −645.6 | 0.0 | 1200.0 | −645.6 | 0.290588 | 0.843233 | −0.452236 | 73.1 |
| TK31 | 0.0 | 0.0 | 0.0 | 0.0 | 1017.7 | 0.0 | 0.354228 | 0.935159 | 0.000000 | 69.3 |
| TK32 | 0.0 | 0.2 | −161.2 | 0.0 | 1017.9 | −161.2 | 0.351046 | 0.924917 | −0.145927 | 69.4 |
| TK33 | 0.0 | 0.6 | −322.4 | 0.0 | 1018.4 | −322.4 | 0.342212 | 0.896106 | −0.282641 | 70.0 |
| TK34 | 0.0 | 0.9 | −483.7 | 0.0 | 1018.6 | −483.7 | 0.329455 | 0.853483 | −0.403765 | 70.8 |
| TK35 | 0.0 | 0.9 | −645.5 | 0.0 | 1018.7 | −645.5 | 0.314647 | 0.802660 | −0.506689 | 71.7 |
| TK41 | 0.0 | −181.5 | 0.0 | 0.0 | 836.3 | 0.0 | 0.408280 | 0.912857 | 0.000000 | 65.9 |
| TK42 | 0.0 | −181.4 | −161.3 | 0.0 | 836.4 | −161.3 | 0.402839 | 0.898858 | −0.172555 | 66.2 |
| TK43 | 0.0 | −181.1 | −322.7 | 0.0 | 836.6 | −322.7 | 0.388023 | 0.860430 | −0.330300 | 67.2 |
| TK44 | 0.0 | −181.0 | −484.1 | 0.0 | 836.8 | −484.1 | 0.367388 | 0.806003 | −0.464095 | 68.4 |
| TK45 | 0.0 | −180.9 | −645.5 | 0.0 | 836.8 | −645.5 | 0.344688 | 0.744602 | −0.571627 | 69.8 |
| TK51 | 0.0 | −362.0 | 0.0 | 0.0 | 655.7 | 0.0 | 0.486702 | 0.873568 | 0.000000 | 60.9 |
| TK52 | 0.0 | −362.0 | −161.6 | 0.0 | 655.7 | −161.6 | 0.476695 | 0.853834 | −0.209116 | 61.5 |
| TK53 | 0.0 | −362.1 | −323.2 | 0.0 | 655.7 | −323.2 | 0.450462 | 0.801734 | −0.392820 | 63.2 |
| TK54 | 0.0 | −362.1 | −484.9 | 0.0 | 655.6 | −484.9 | 0.416116 | 0.732666 | −0.538561 | 65.4 |
| TK55 | 0.0 | −362.3 | −645.8 | 0.0 | 655.5 | −645.8 | 0.381036 | 0.660624 | −0.646828 | 67.6 |

TABLE 10

Ray exiting from screen for Example 5

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 362.0 | 0.0 | 4.0 | 1379.7 | 0.0 | 1.000000 | −0.000740 | 0.000000 | 0.0 |
| TK12 | 4.0 | 362.0 | −161.3 | 4.0 | 1379.7 | −161.3 | 1.000000 | −0.000643 | 0.000341 | 0.0 |
| TK13 | 4.0 | 362.2 | −322.7 | 4.0 | 1379.9 | −322.7 | 1.000000 | −0.000364 | 0.000616 | 0.0 |
| TK14 | 4.0 | 362.5 | −484.2 | 4.0 | 1380.3 | −484.2 | 1.000000 | −0.000027 | 0.000821 | 0.0 |
| TK15 | 4.0 | 361.8 | −645.8 | 4.0 | 1379.5 | −645.8 | 0.999999 | −0.000403 | 0.001286 | 0.1 |
| TK21 | 4.0 | 181.3 | 0.0 | 4.0 | 1199.1 | 0.0 | 1.000000 | −0.000495 | 0.000000 | 0.0 |
| TK22 | 4.0 | 181.5 | −161.2 | 4.0 | 1199.3 | −161.2 | 1.000000 | −0.000570 | 0.000446 | 0.0 |
| TK23 | 4.0 | 182.1 | −322.4 | 4.0 | 1199.8 | −322.4 | 0.999999 | −0.000741 | 0.000936 | 0.1 |
| TK24 | 4.0 | 182.5 | −483.7 | 4.0 | 1200.2 | −483.7 | 0.999999 | −0.000793 | 0.001416 | 0.1 |
| TK25 | 4.0 | 182.3 | −645.6 | 4.0 | 1200.0 | −645.6 | 0.999999 | −0.000406 | 0.001639 | 0.1 |
| TK31 | 4.0 | 0.0 | 0.0 | 4.0 | 1017.7 | 0.0 | 1.000000 | 0.000201 | 0.000000 | 0.0 |
| TK32 | 4.0 | 0.2 | −161.2 | 4.0 | 1017.9 | −161.2 | 1.000000 | 0.000322 | 0.000489 | 0.0 |
| TK33 | 4.0 | 0.6 | −322.4 | 4.0 | 1018.4 | −322.4 | 0.999999 | 0.000527 | 0.000888 | 0.1 |
| TK34 | 4.0 | 0.9 | −483.7 | 4.0 | 1018.6 | −483.7 | 0.999999 | 0.000501 | 0.001284 | 0.1 |
| TK35 | 4.0 | 0.9 | −645.5 | 4.0 | 1018.7 | −645.5 | 0.999998 | 0.000162 | 0.001826 | 0.1 |
| TK41 | 4.0 | −181.5 | 0.0 | 4.0 | 836.3 | 0.0 | 0.999997 | −0.002646 | 0.000000 | 0.2 |
| TK42 | 4.0 | −181.4 | −161.3 | 4.0 | 836.4 | −161.3 | 0.999997 | −0.002191 | 0.001238 | 0.1 |
| TK43 | 4.0 | −181.2 | −322.7 | 4.0 | 836.6 | −322.7 | 0.999998 | −0.000927 | 0.001920 | 0.1 |
| TK44 | 4.0 | −181.0 | −484.1 | 4.0 | 836.8 | −484.1 | 0.999998 | 0.000583 | 0.001863 | 0.1 |
| TK45 | 4.0 | −180.9 | −645.5 | 4.0 | 836.8 | −645.5 | 0.999998 | 0.001434 | 0.001636 | 0.1 |
| TK51 | 4.0 | −362.0 | 0.0 | 4.0 | 655.7 | 0.0 | 0.999999 | 0.001373 | 0.000000 | 0.1 |
| TK52 | 4.0 | −362.0 | −161.6 | 4.0 | 655.7 | −161.6 | 0.999999 | 0.000178 | 0.001225 | 0.1 |
| TK53 | 4.0 | −362.1 | −323.2 | 4.0 | 655.7 | −323.2 | 0.999995 | −0.001281 | 0.003013 | 0.2 |
| TK54 | 4.0 | −362.1 | −484.8 | 4.0 | 655.6 | −484.8 | 0.999993 | −0.000593 | 0.003707 | 0.2 |
| TK55 | 4.0 | −362.3 | −645.8 | 4.0 | 655.5 | −645.8 | 0.999996 | 0.001370 | 0.002635 | 0.2 |

TABLE 11

Ray incident on screen for Example 6

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 362.0 | 0.0 | 0.0 | 1382.9 | 0.0 | 0.288603 | 0.957449 | 0.000000 | 73.2 |
| TK12 | 0.0 | 362.0 | −161.3 | 0.0 | 1382.9 | −161.3 | 0.287372 | 0.951373 | −0.110932 | 73.3 |
| TK13 | 0.0 | 362.2 | −322.7 | 0.0 | 1383.1 | −322.7 | 0.283788 | 0.933821 | −0.217816 | 73.5 |
| TK14 | 0.0 | 362.5 | −484.2 | 0.0 | 1383.5 | −484.2 | 0.278299 | 0.906596 | −0.317227 | 73.8 |
| TK15 | 0.0 | 361.8 | −645.8 | 0.0 | 1382.7 | −645.8 | 0.271724 | 0.872017 | −0.407127 | 74.2 |
| TK21 | 0.0 | 181.3 | 0.0 | 0.0 | 1202.3 | 0.0 | 0.316154 | 0.948708 | 0.000000 | 71.6 |
| TK22 | 0.0 | 181.5 | −161.2 | 0.0 | 1202.5 | −161.2 | 0.314185 | 0.940949 | −0.126103 | 71.7 |
| TK23 | 0.0 | 182.1 | −322.4 | 0.0 | 1203.0 | −322.4 | 0.308634 | 0.918784 | −0.246134 | 72.0 |
| TK24 | 0.0 | 182.5 | −483.7 | 0.0 | 1203.4 | −483.7 | 0.300411 | 0.885049 | −0.355587 | 72.5 |
| TK25 | 0.0 | 182.3 | −645.6 | 0.0 | 1203.2 | −645.6 | 0.290588 | 0.843233 | −0.452236 | 73.1 |
| TK31 | 0.0 | 0.0 | 0.0 | 0.0 | 1020.9 | 0.0 | 0.354228 | 0.935159 | 0.000000 | 69.3 |
| TK32 | 0.0 | 0.2 | −161.2 | 0.0 | 1021.1 | −161.2 | 0.351046 | 0.924917 | −0.145927 | 69.4 |
| TK33 | 0.0 | 0.6 | −322.4 | 0.0 | 1021.5 | −322.4 | 0.342212 | 0.896106 | −0.282641 | 70.0 |
| TK34 | 0.0 | 0.9 | −483.7 | 0.0 | 1021.8 | −483.7 | 0.329455 | 0.853483 | −0.403765 | 70.8 |
| TK35 | 0.0 | 0.9 | −645.5 | 0.0 | 1021.9 | −645.5 | 0.314647 | 0.802660 | −0.506689 | 71.7 |
| TK41 | 0.0 | −181.5 | 0.0 | 0.0 | 839.5 | 0.0 | 0.408280 | 0.912857 | 0.000000 | 65.9 |
| TK42 | 0.0 | −181.4 | −161.3 | 0.0 | 839.6 | −161.3 | 0.402839 | 0.898858 | −0.172555 | 66.2 |
| TK43 | 0.0 | −181.1 | −322.7 | 0.0 | 839.8 | −322.7 | 0.388023 | 0.860430 | −0.330300 | 67.2 |
| TK44 | 0.0 | −181.0 | −484.1 | 0.0 | 840.0 | −484.1 | 0.367388 | 0.806003 | −0.464095 | 68.4 |
| TK45 | 0.0 | −180.9 | −645.5 | 0.0 | 840.0 | −645.5 | 0.344688 | 0.744602 | −0.571627 | 69.8 |
| TK51 | 0.0 | −362.0 | 0.0 | 0.0 | 658.9 | 0.0 | 0.486702 | 0.873568 | 0.000000 | 60.9 |
| TK52 | 0.0 | −362.0 | −161.6 | 0.0 | 658.9 | −161.6 | 0.476695 | 0.853834 | −0.209116 | 61.5 |
| TK53 | 0.0 | −362.1 | −323.2 | 0.0 | 658.9 | −323.2 | 0.450462 | 0.801734 | −0.392820 | 63.2 |
| TK54 | 0.0 | −362.1 | −484.9 | 0.0 | 658.8 | −484.9 | 0.416116 | 0.732666 | −0.538561 | 65.4 |
| TK55 | 0.0 | −362.3 | −645.8 | 0.0 | 658.7 | −645.8 | 0.381036 | 0.660624 | −0.646828 | 67.6 |

TABLE 12

Ray exiting from screen for Example 6

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 362.0 | 0.0 | 4.0 | 1382.9 | 0.0 | 1.000000 | −0.000698 | 0.000000 | 0.0 |
| TK12 | 4.0 | 362.0 | −161.3 | 4.0 | 1382.9 | −161.3 | 1.000000 | −0.000610 | 0.000081 | 0.0 |
| TK13 | 4.0 | 362.2 | −322.7 | 4.0 | 1383.1 | −322.7 | 1.000000 | −0.000305 | 0.000101 | 0.0 |
| TK14 | 4.0 | 362.5 | −484.2 | 4.0 | 1383.5 | −484.2 | 1.000000 | 0.000243 | −0.000005 | 0.0 |
| TK15 | 4.0 | 361.8 | −645.8 | 4.0 | 1382.7 | −645.8 | 1.000000 | 0.000541 | −0.000094 | 0.0 |
| TK21 | 4.0 | 181.3 | 0.0 | 4.0 | 1202.3 | 0.0 | 1.000000 | 0.000017 | 0.000000 | 0.0 |
| TK22 | 4.0 | 181.5 | −161.2 | 4.0 | 1202.5 | −161.2 | 1.000000 | −0.000163 | 0.000057 | 0.0 |
| TK23 | 4.0 | 182.1 | −322.4 | 4.0 | 1203.0 | −322.4 | 1.000000 | −0.000611 | 0.000248 | 0.0 |
| TK24 | 4.0 | 182.5 | −483.7 | 4.0 | 1203.4 | −483.7 | 0.999999 | −0.001018 | 0.000563 | 0.1 |
| TK25 | 4.0 | 182.3 | −645.6 | 4.0 | 1203.2 | −645.6 | 0.999999 | −0.000892 | 0.000700 | 0.1 |
| TK31 | 4.0 | 0.0 | 0.0 | 4.0 | 1020.9 | 0.0 | 0.999999 | 0.001683 | 0.000000 | 0.1 |
| TK32 | 4.0 | 0.2 | −161.2 | 4.0 | 1021.1 | −161.2 | 0.999999 | 0.001655 | −0.000177 | 0.1 |
| TK33 | 4.0 | 0.6 | −322.4 | 4.0 | 1021.6 | −322.4 | 0.999999 | 0.001444 | −0.000284 | 0.1 |
| TK34 | 4.0 | 0.9 | −483.7 | 4.0 | 1021.8 | −483.7 | 1.000000 | 0.000818 | −0.000126 | 0.0 |
| TK35 | 4.0 | 0.9 | −645.5 | 4.0 | 1021.9 | −645.5 | 1.000000 | −0.000172 | 0.000454 | 0.0 |
| TK41 | 4.0 | −181.5 | 0.0 | 4.0 | 839.5 | 0.0 | 0.999999 | −0.001074 | 0.000000 | 0.1 |
| TK42 | 4.0 | −181.4 | −161.3 | 4.0 | 839.6 | −161.3 | 1.000000 | −0.000723 | 0.000298 | 0.0 |
| TK43 | 4.0 | −181.1 | −322.7 | 4.0 | 839.8 | −322.7 | 1.000000 | 0.000213 | 0.000224 | 0.0 |
| TK44 | 4.0 | −181.0 | −484.1 | 4.0 | 840.0 | −484.1 | 0.999999 | 0.001175 | −0.000242 | 0.1 |
| TK45 | 4.0 | −180.9 | −645.5 | 4.0 | 840.0 | −645.5 | 0.999999 | 0.001334 | −0.000456 | 0.1 |
| TK51 | 4.0 | −362.0 | 0.0 | 4.0 | 658.9 | 0.0 | 1.000000 | 0.000472 | 0.000000 | 0.0 |
| TK52 | 4.0 | −362.0 | −161.6 | 4.0 | 658.9 | −161.6 | 1.000000 | −0.000543 | 0.000386 | 0.0 |
| TK53 | 4.0 | −362.1 | −323.2 | 4.0 | 658.9 | −323.2 | 0.999998 | −0.001676 | 0.001297 | 0.1 |
| TK54 | 4.0 | −362.1 | −484.8 | 4.0 | 658.8 | −484.8 | 0.999999 | −0.000884 | 0.001304 | 0.1 |
| TK55 | 4.0 | −362.3 | −645.8 | 4.0 | 658.7 | −645.8 | 1.000000 | 0.000831 | 0.000029 | 0.0 |

TABLE 13

Ray incident on screen for Example 7

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 434.4 | 0.0 | 0.0 | 1649.4 | 0.0 | 0.284980 | 0.958533 | 0.000000 | 73.4 |
| TK12 | 0.0 | 434.3 | −192.7 | 0.0 | 1649.2 | −192.7 | 0.283702 | 0.952495 | −0.110756 | 73.5 |
| TK13 | 0.0 | 434.5 | −385.8 | 0.0 | 1649.4 | −385.8 | 0.279927 | 0.935033 | −0.217609 | 73.7 |
| TK14 | 0.0 | 435.2 | −579.2 | 0.0 | 1650.1 | −579.2 | 0.274061 | 0.907930 | −0.317101 | 74.1 |
| TK15 | 0.0 | 434.6 | −772.8 | 0.0 | 1649.5 | −772.8 | 0.266961 | 0.873487 | −0.407126 | 74.5 |
| TK21 | 0.0 | 217.1 | 0.0 | 0.0 | 1432.0 | 0.0 | 0.314254 | 0.949339 | 0.000000 | 71.7 |
| TK22 | 0.0 | 217.2 | −192.6 | 0.0 | 1432.1 | −192.6 | 0.312240 | 0.941619 | −0.125937 | 71.8 |
| TK23 | 0.0 | 217.5 | −385.2 | 0.0 | 1432.4 | −385.2 | 0.306518 | 0.919563 | −0.245868 | 72.2 |
| TK24 | 0.0 | 217.7 | −577.9 | 0.0 | 1432.6 | −577.9 | 0.297934 | 0.885985 | −0.355339 | 72.7 |
| TK25 | 0.0 | 217.4 | −771.5 | 0.0 | 1432.3 | −771.5 | 0.287544 | 0.844327 | −0.452140 | 73.3 |
| TK31 | 0.0 | 0.0 | 0.0 | 0.0 | 1214.9 | 0.0 | 0.353948 | 0.935265 | 0.000000 | 69.3 |
| TK32 | 0.0 | 0.1 | −192.7 | 0.0 | 1215.0 | −192.7 | 0.350693 | 0.925081 | −0.145739 | 69.5 |
| TK33 | 0.0 | 0.3 | −385.3 | 0.0 | 1215.2 | −385.3 | 0.341643 | 0.896433 | −0.282292 | 70.0 |
| TK34 | 0.0 | 0.1 | −577.9 | 0.0 | 1215.0 | −577.9 | 0.328507 | 0.854040 | −0.403360 | 70.8 |
| TK35 | 0.0 | −0.2 | −771.1 | 0.0 | 1214.7 | −771.1 | 0.313095 | 0.803424 | −0.506440 | 71.8 |
| TK41 | 0.0 | −217.0 | 0.0 | 0.0 | 997.9 | 0.0 | 0.409623 | 0.912255 | 0.000000 | 65.8 |
| TK42 | 0.0 | −217.0 | −192.9 | 0.0 | 997.9 | −192.9 | 0.404082 | 0.898369 | −0.172196 | 66.2 |
| TK43 | 0.0 | −216.9 | −385.7 | 0.0 | 998.0 | −385.7 | 0.388982 | 0.860244 | −0.329656 | 67.1 |
| TK44 | 0.0 | −217.1 | −578.4 | 0.0 | 997.8 | −578.4 | 0.367892 | 0.806206 | −0.463343 | 68.4 |
| TK45 | 0.0 | −217.5 | −771.1 | 0.0 | 997.5 | −771.1 | 0.344518 | 0.745130 | −0.571042 | 69.8 |
| TK51 | 0.0 | −433.1 | 0.0 | 0.0 | 781.8 | 0.0 | 0.489528 | 0.871987 | 0.000000 | 60.7 |
| TK52 | 0.0 | −433.1 | −193.2 | 0.0 | 781.8 | −193.2 | 0.479418 | 0.852498 | −0.208341 | 61.4 |
| TK53 | 0.0 | −433.3 | −386.3 | 0.0 | 781.6 | −386.3 | 0.452875 | 0.801001 | −0.391538 | 63.1 |
| TK54 | 0.0 | −433.6 | −579.2 | 0.0 | 781.3 | −579.2 | 0.418000 | 0.732604 | −0.537184 | 65.3 |
| TK55 | 0.0 | −434.1 | −771.3 | 0.0 | 780.8 | −771.3 | 0.382123 | 0.661015 | −0.645787 | 67.5 |

TABLE 14

Ray exiting from screen for Example 7

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 434.4 | 0.0 | 4.0 | 1649.3 | 0.0 | 0.999780 | −0.020992 | 0.000000 | 1.2 |
| TK12 | 4.0 | 434.3 | −192.7 | 4.0 | 1649.2 | −192.7 | 0.999783 | −0.020620 | 0.002954 | 1.2 |
| TK13 | 4.0 | 434.4 | −385.7 | 4.0 | 1649.3 | −385.7 | 0.999822 | −0.018120 | 0.005310 | 1.1 |
| TK14 | 4.0 | 435.1 | −579.2 | 4.0 | 1650.0 | −579.2 | 0.999956 | −0.008222 | 0.004474 | 0.5 |
| TK15 | 4.0 | 434.7 | −772.8 | 4.0 | 1649.6 | −772.8 | 0.999762 | 0.020468 | −0.007507 | 1.2 |
| TK21 | 4.0 | 217.1 | 0.0 | 4.0 | 1432.0 | 0.0 | 0.999995 | −0.003155 | 0.000000 | 0.2 |
| TK22 | 4.0 | 217.2 | −192.6 | 4.0 | 1432.1 | −192.6 | 0.999990 | −0.004347 | 0.001308 | 0.3 |
| TK23 | 4.0 | 217.4 | −385.2 | 4.0 | 1432.3 | −385.2 | 0.999962 | −0.007919 | 0.003553 | 0.5 |
| TK24 | 4.0 | 217.6 | −577.9 | 4.0 | 1432.5 | −577.9 | 0.999885 | −0.013258 | 0.007429 | 0.9 |
| TK25 | 4.0 | 217.4 | −771.5 | 4.0 | 1432.3 | −771.5 | 0.999781 | −0.017201 | 0.011930 | 1.2 |
| TK31 | 4.0 | 0.0 | 0.0 | 4.0 | 1214.9 | 0.0 | 0.999962 | 0.008745 | 0.000000 | 0.5 |
| TK32 | 4.0 | 0.1 | −192.7 | 4.0 | 1215.0 | −192.7 | 0.999963 | 0.008627 | −0.000356 | 0.5 |
| TK33 | 4.0 | 0.3 | −385.3 | 4.0 | 1215.2 | −385.3 | 0.999970 | 0.007747 | −0.000486 | 0.4 |
| TK34 | 4.0 | 0.1 | −577.9 | 4.0 | 1215.0 | −577.9 | 0.999989 | 0.004736 | 0.000579 | 0.3 |
| TK35 | 4.0 | −0.2 | −771.1 | 4.0 | 1214.7 | −771.1 | 0.999988 | −0.001721 | 0.004660 | 0.3 |
| TK41 | 4.0 | −217.0 | 0.0 | 4.0 | 997.9 | 0.0 | 0.999984 | 0.005616 | 0.000000 | 0.3 |
| TK42 | 4.0 | −217.0 | −192.9 | 4.0 | 997.9 | −192.9 | 0.999981 | 0.006096 | 0.000307 | 0.3 |
| TK43 | 4.0 | −216.9 | −385.7 | 4.0 | 998.0 | −385.7 | 0.999971 | 0.007559 | −0.000072 | 0.4 |
| TK44 | 4.0 | −217.1 | −578.4 | 4.0 | 997.9 | −578.4 | 0.999956 | 0.009234 | −0.001338 | 0.5 |
| TK45 | 4.0 | −217.4 | −771.1 | 4.0 | 997.5 | −771.1 | 0.999960 | 0.008776 | −0.001809 | 0.5 |
| TK51 | 4.0 | −433.1 | 0.0 | 4.0 | 781.9 | 0.0 | 0.999887 | 0.015017 | 0.000000 | 0.9 |
| TK52 | 4.0 | −433.1 | −193.2 | 4.0 | 781.8 | −193.2 | 0.999921 | 0.012537 | −0.000793 | 0.7 |
| TK53 | 4.0 | −433.3 | −386.3 | 4.0 | 781.6 | −386.3 | 0.999964 | 0.008504 | 0.000135 | 0.5 |
| TK54 | 4.0 | −433.6 | −579.2 | 4.0 | 781.3 | −579.2 | 0.999971 | 0.007594 | 0.000335 | 0.4 |
| TK55 | 4.0 | −434.1 | −771.3 | 4.0 | 780.8 | −771.3 | 0.999954 | 0.009413 | −0.002072 | 0.6 |

TABLE 15

Ray incident on screen for Example 8

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 363.0 | 0.0 | 0.0 | −580.8 | 0.0 | 0.490972 | −0.871176 | 0.000000 | 60.6 |
| TK12 | 0.0 | 362.9 | −160.7 | 0.0 | −580.9 | −160.7 | 0.478007 | −0.846229 | −0.235385 | 61.4 |
| TK13 | 0.0 | 362.5 | −322.1 | 0.0 | −581.3 | −322.1 | 0.445046 | −0.782259 | −0.435896 | 63.6 |
| TK14 | 0.0 | 362.4 | −484.2 | 0.0 | −581.4 | −484.2 | 0.404043 | −0.701275 | −0.587335 | 66.2 |
| TK15 | 0.0 | 363.4 | −645.1 | 0.0 | −580.4 | −645.1 | 0.364813 | −0.620936 | −0.693794 | 68.6 |
| TK21 | 0.0 | 181.3 | 0.0 | 0.0 | −762.5 | 0.0 | 0.401822 | −0.915718 | 0.000000 | 66.3 |
| TK22 | 0.0 | 181.0 | −161.0 | 0.0 | −762.8 | −161.0 | 0.395169 | −0.898647 | −0.190462 | 66.7 |
| TK23 | 0.0 | 180.3 | −322.5 | 0.0 | −763.5 | −322.5 | 0.377354 | −0.852525 | −0.361670 | 67.8 |
| TK24 | 0.0 | 179.6 | −484.6 | 0.0 | −764.2 | −484.6 | 0.353370 | −0.789047 | −0.502528 | 69.3 |
| TK25 | 0.0 | 180.2 | −645.7 | 0.0 | −763.6 | −645.7 | 0.328396 | −0.720061 | −0.611284 | 70.8 |
| TK31 | 0.0 | 0.0 | 0.0 | 0.0 | −943.8 | 0.0 | 0.342575 | −0.939491 | 0.000000 | 70.0 |
| TK32 | 0.0 | −0.3 | −161.3 | 0.0 | −944.1 | −161.3 | 0.338865 | −0.927300 | −0.159011 | 70.2 |
| TK33 | 0.0 | −0.8 | −322.9 | 0.0 | −944.6 | −322.9 | 0.328674 | −0.893356 | −0.306413 | 70.8 |
| TK34 | 0.0 | −1.0 | −484.5 | 0.0 | −944.8 | −484.5 | 0.314278 | −0.844158 | −0.434311 | 71.7 |
| TK35 | 0.0 | −0.4 | −645.2 | 0.0 | −944.2 | −645.2 | 0.298234 | −0.787278 | −0.539675 | 72.6 |
| TK41 | 0.0 | −181.3 | 0.0 | 0.0 | −1125.1 | 0.0 | 0.301441 | −0.953485 | 0.000000 | 72.5 |
| TK42 | 0.0 | −181.3 | −161.4 | 0.0 | −1125.1 | −161.4 | 0.299277 | −0.944442 | −0.135881 | 72.6 |
| TK43 | 0.0 | −181.2 | −322.8 | 0.0 | −1125.1 | −322.8 | 0.293195 | −0.918787 | −0.264326 | 73.0 |
| TK44 | 0.0 | −181.1 | −484.0 | 0.0 | −1124.9 | −484.0 | 0.284172 | −0.880324 | −0.379838 | 73.5 |
| TK45 | 0.0 | −180.9 | −644.9 | 0.0 | −1124.7 | −644.9 | 0.273462 | −0.833878 | −0.479443 | 74.1 |
| TK51 | 0.0 | −363.1 | 0.0 | 0.0 | −1306.9 | 0.0 | 0.271541 | −0.962427 | 0.000000 | 74.2 |
| TK52 | 0.0 | −363.1 | −161.4 | 0.0 | −1306.9 | −161.4 | 0.270180 | −0.955519 | −0.118262 | 74.3 |
| TK53 | 0.0 | −362.9 | −322.7 | 0.0 | −1306.7 | −322.7 | 0.266266 | −0.935663 | −0.231598 | 74.6 |
| TK54 | 0.0 | −363.1 | −484.3 | 0.0 | −1306.9 | −484.3 | 0.260204 | −0.905144 | −0.336168 | 74.9 |
| TK55 | 0.0 | −362.9 | −645.5 | 0.0 | −1306.7 | −645.5 | 0.252780 | −0.867101 | −0.429230 | 75.4 |

TABLE 16

Ray exiting from screen for Example 8

| Label | Exit position (screen center) | | | Exit position (Fresnel center) | | | Exit ray vector | | | Exit angle |
|---|---|---|---|---|---|---|---|---|---|---|
| | X | Y | Z | X | Y | Z | Ex | Ey | Ez | |
| TK11 | 4.0 | 363.0 | 0.0 | 4.0 | −580.8 | 0.0 | 0.999996 | 0.002888 | 0.000000 | 0.2 |
| TK12 | 4.0 | 362.9 | −160.7 | 4.0 | −580.9 | −160.7 | 0.999991 | 0.004162 | −0.000202 | 0.2 |
| TK13 | 4.0 | 362.6 | −322.1 | 4.0 | −581.3 | −322.1 | 0.999989 | 0.004726 | 0.000138 | 0.3 |
| TK14 | 4.0 | 362.4 | −484.2 | 4.0 | −581.4 | −484.2 | 0.999997 | 0.002112 | −0.001518 | 0.1 |
| TK15 | 4.0 | 363.4 | −645.1 | 4.0 | −580.4 | −645.1 | 0.999990 | −0.000727 | −0.004503 | 0.3 |
| TK21 | 4.0 | 181.3 | 0.0 | 4.0 | −762.5 | 0.0 | 1.000000 | 0.000265 | 0.000000 | 0.0 |
| TK22 | 4.0 | 181.0 | −161.0 | 4.0 | −762.8 | −161.0 | 1.000000 | −0.000317 | −0.000887 | 0.1 |
| TK23 | 4.0 | 180.3 | −322.5 | 4.0 | −763.5 | −322.5 | 0.999996 | −0.001708 | −0.002264 | 0.2 |
| TK24 | 4.0 | 179.6 | −484.7 | 4.0 | −764.2 | −484.7 | 0.999989 | −0.002626 | −0.003761 | 0.3 |
| TK25 | 4.0 | 180.2 | −645.7 | 4.0 | −763.6 | −645.7 | 0.999991 | −0.001794 | −0.003929 | 0.2 |
| TK31 | 4.0 | 0.0 | 0.0 | 4.0 | −943.8 | 0.0 | 0.999990 | −0.004465 | 0.000000 | 0.3 |
| TK32 | 4.0 | −0.3 | −161.3 | 4.0 | −944.1 | −161.3 | 0.999990 | −0.004221 | −0.001276 | 0.3 |
| TK33 | 4.0 | −0.8 | −322.9 | 4.0 | −944.6 | −322.9 | 0.999992 | −0.003274 | −0.002175 | 0.2 |
| TK34 | 4.0 | −1.0 | −484.5 | 4.0 | −944.8 | −484.5 | 0.999997 | −0.001390 | −0.002173 | 0.1 |
| TK35 | 4.0 | −0.4 | −645.2 | 4.0 | −944.2 | −645.2 | 0.999999 | −0.000763 | −0.001191 | 0.1 |
| TK41 | 4.0 | −181.3 | 0.0 | 4.0 | −1125.1 | 0.0 | 1.000000 | −0.000272 | 0.000000 | 0.0 |
| TK42 | 4.0 | −181.3 | −161.4 | 4.0 | −1125.1 | −161.4 | 1.000000 | 0.000088 | −0.000378 | 0.0 |
| TK43 | 4.0 | −181.3 | −322.8 | 4.0 | −1125.1 | −322.8 | 0.999999 | 0.000946 | −0.000479 | 0.1 |
| TK44 | 4.0 | −181.1 | −484.0 | 4.0 | −1124.9 | −484.0 | 0.999999 | 0.001602 | −0.000364 | 0.1 |
| TK45 | 4.0 | −180.9 | −644.9 | 4.0 | −1124.7 | −644.9 | 0.999999 | 0.001009 | −0.000674 | 0.1 |
| TK51 | 4.0 | −363.1 | 0.0 | 4.0 | −1306.9 | 0.0 | 1.000000 | 0.000779 | 0.000000 | 0.0 |
| TK52 | 4.0 | −363.1 | −161.4 | 4.0 | −1306.9 | −161.4 | 1.000000 | 0.000572 | −0.000207 | 0.0 |
| TK53 | 4.0 | −362.9 | −322.7 | 4.0 | −1306.7 | −322.7 | 1.000000 | −0.000085 | −0.000558 | 0.0 |
| TK54 | 4.0 | −363.1 | −484.3 | 4.0 | −1306.9 | −484.3 | 0.999999 | −0.000900 | −0.001099 | 0.1 |
| TK55 | 4.0 | −362.9 | −645.5 | 4.0 | −1306.7 | −645.5 | 1.000000 | 0.000198 | −0.000813 | 0.0 |

TABLE 17

Ray incident on screen for Example 9

| Label | Incidence position (screen center) | | | Incidence position (Fresnel center) | | | Incident ray vector | | | Incident angle |
|---|---|---|---|---|---|---|---|---|---|---|
| | X | Y | Z | X | Y | Z | Ex | Ey | Ez | |
| TK11 | 0.0 | 457.0 | 0.0 | 0.0 | −286.9 | 0.0 | 0.695507 | −0.718520 | 0.000000 | 45.9 |
| TK12 | 0.0 | 456.3 | −150.4 | 0.0 | −287.7 | −150.4 | 0.649132 | −0.676768 | −0.347295 | 49.5 |
| TK13 | 0.0 | 455.7 | −302.7 | 0.0 | −288.3 | −302.7 | 0.547381 | −0.582952 | −0.600451 | 56.8 |
| TK14 | 0.0 | 456.6 | −454.8 | 0.0 | −287.3 | −454.8 | 0.443610 | −0.485461 | −0.753351 | 63.7 |
| TK15 | 0.0 | 457.1 | −610.3 | 0.0 | −286.8 | −610.3 | 0.355775 | −0.404283 | −0.842602 | 69.2 |
| TK21 | 0.0 | 230.0 | 0.0 | 0.0 | −513.9 | 0.0 | 0.459863 | −0.887990 | 0.000000 | 62.6 |
| TK22 | 0.0 | 229.7 | −151.6 | 0.0 | −514.3 | −151.6 | 0.442900 | −0.860738 | −0.250939 | 63.7 |
| TK23 | 0.0 | 229.6 | −302.8 | 0.0 | −514.4 | −302.8 | 0.400451 | −0.791854 | −0.461093 | 66.4 |
| TK24 | 0.0 | 229.6 | −454.4 | 0.0 | −514.3 | −454.4 | 0.347448 | −0.706106 | −0.617004 | 69.7 |
| TK25 | 0.0 | 228.1 | −609.6 | 0.0 | −515.8 | −609.6 | 0.293956 | −0.621483 | −0.726188 | 72.9 |
| TK31 | 0.0 | 0.0 | 0.0 | 0.0 | −744.0 | 0.0 | 0.317533 | −0.948247 | 0.000000 | 71.5 |
| TK32 | 0.0 | 0.2 | −151.9 | 0.0 | −743.7 | −151.9 | 0.310425 | −0.931648 | −0.188859 | 71.9 |
| TK33 | 0.0 | 1.0 | −303.1 | 0.0 | −743.0 | −303.1 | 0.291152 | −0.886745 | −0.359046 | 73.1 |
| TK34 | 0.0 | 1.1 | −455.0 | 0.0 | −742.9 | −455.0 | 0.263818 | −0.824234 | −0.501036 | 74.7 |
| TK35 | 0.0 | −0.5 | −609.8 | 0.0 | −744.4 | −609.8 | 0.232759 | −0.754744 | −0.613339 | 76.5 |
| TK41 | 0.0 | −228.9 | 0.0 | 0.0 | −972.8 | 0.0 | 0.228764 | −0.973482 | 0.000000 | 76.8 |
| TK42 | 0.0 | −229.0 | −152.1 | 0.0 | −972.9 | −152.1 | 0.225099 | −0.962781 | −0.149612 | 77.0 |
| TK43 | 0.0 | −229.0 | −303.7 | 0.0 | −973.0 | −303.7 | 0.214818 | −0.932756 | −0.289517 | 77.6 |
| TK44 | 0.0 | −229.7 | −456.3 | 0.0 | −973.7 | −456.3 | 0.199395 | −0.888233 | −0.413865 | 78.5 |
| TK45 | 0.0 | −231.0 | −610.5 | 0.0 | −975.0 | −610.5 | 0.180769 | −0.834996 | −0.519715 | 79.6 |
| TK51 | 0.0 | −458.2 | 0.0 | 0.0 | −1202.2 | 0.0 | 0.168254 | −0.985744 | 0.000000 | 80.3 |
| TK52 | 0.0 | −458.5 | −152.4 | 0.0 | −1202.4 | −152.4 | 0.166111 | −0.978355 | −0.123401 | 80.4 |
| TK53 | 0.0 | −458.5 | −304.2 | 0.0 | −1202.5 | −304.2 | 0.160030 | −0.957223 | −0.241069 | 80.8 |
| TK54 | 0.0 | −458.3 | −456.5 | 0.0 | −1202.3 | −456.5 | 0.150646 | −0.924756 | −0.349473 | 81.3 |
| TK55 | 0.0 | −458.3 | −609.6 | 0.0 | −1202.2 | −609.6 | 0.138738 | −0.884146 | −0.446137 | 82.0 |

TABLE 18

Ray exiting from screen for Example 9

| Label | Exit position (screen center) X | Y | Z | Exit position (Fresnel center) X | Y | Z | Exit ray vector Ex | Ey | Ez | Exit angle |
|---|---|---|---|---|---|---|---|---|---|---|
| TK11 | 4.0 | 457.0 | 0.0 | 4.0 | −286.9 | 0.0 | 0.999937 | −0.011183 | 0.000000 | 0.6 |
| TK12 | 4.0 | 456.3 | −150.4 | 4.0 | −287.7 | −150.4 | 0.999890 | 0.009403 | 0.011474 | 0.8 |
| TK13 | 4.0 | 455.7 | −302.6 | 4.0 | −288.2 | −302.6 | 0.999053 | 0.023717 | 0.036483 | 2.5 |
| TK14 | 4.0 | 456.7 | −454.7 | 4.0 | −287.3 | −454.7 | 0.999328 | 0.012341 | 0.034522 | 2.1 |
| TK15 | 4.0 | 457.1 | −610.2 | 4.0 | −286.8 | −610.2 | 0.999951 | −0.003956 | 0.009126 | 0.6 |
| TK21 | 4.0 | 230.1 | 0.0 | 4.0 | −513.8 | 0.0 | 0.999109 | 0.042198 | 0.000000 | 2.4 |
| TK22 | 4.0 | 229.8 | −151.6 | 4.0 | −514.2 | −151.6 | 0.999260 | 0.036028 | 0.013441 | 2.2 |
| TK23 | 4.0 | 229.6 | −302.8 | 4.0 | −514.3 | −302.8 | 0.999663 | 0.019812 | 0.016763 | 1.5 |
| TK24 | 4.0 | 229.6 | −454.4 | 4.0 | −514.3 | −454.4 | 0.999968 | 0.001154 | 0.007873 | 0.5 |
| TK25 | 4.0 | 228.1 | −609.7 | 4.0 | −515.9 | −609.7 | 0.999941 | −0.010163 | −0.003715 | 0.6 |
| TK31 | 4.0 | 0.0 | 0.0 | 4.0 | −744.0 | 0.0 | 0.999996 | −0.002788 | 0.000000 | 0.2 |
| TK32 | 4.0 | 0.2 | −151.9 | 4.0 | −743.7 | −151.9 | 0.999988 | −0.004873 | 0.000456 | 0.3 |
| TK33 | 4.0 | 1.0 | −303.1 | 4.0 | −743.0 | −303.1 | 0.999962 | −0.008726 | −0.000854 | 0.5 |
| TK34 | 4.0 | 1.1 | −455.0 | 4.0 | −742.9 | −455.0 | 0.999952 | −0.009576 | −0.002037 | 0.6 |
| TK35 | 4.0 | −0.5 | −609.8 | 4.0 | −744.4 | −609.8 | 0.999991 | −0.003981 | 0.001608 | 0.2 |
| TK41 | 4.0 | −228.9 | 0.0 | 4.0 | −972.8 | 0.0 | 1.000000 | −0.000061 | 0.000000 | 0.0 |
| TK42 | 4.0 | −229.0 | −152.1 | 4.0 | −972.9 | −152.1 | 0.999999 | 0.001312 | 0.001078 | 0.1 |
| TK43 | 4.0 | −229.0 | −303.7 | 4.0 | −973.0 | −303.7 | 0.999980 | 0.005399 | 0.003331 | 0.4 |
| TK44 | 4.0 | −229.7 | −456.3 | 4.0 | −973.7 | −456.3 | 0.999909 | 0.011123 | 0.007601 | 0.8 |
| TK45 | 4.0 | −231.0 | −610.4 | 4.0 | −974.9 | −610.4 | 0.999825 | 0.014305 | 0.012065 | 1.1 |
| TK51 | 4.0 | −458.2 | 0.0 | 4.0 | −1202.2 | 0.0 | 0.999849 | 0.017382 | 0.000000 | 1.0 |
| TK52 | 4.0 | −458.4 | −152.4 | 4.0 | −1202.4 | −152.4 | 0.999866 | 0.016138 | 0.002641 | 0.9 |
| TK53 | 4.0 | −458.5 | −304.2 | 4.0 | −1202.4 | −304.2 | 0.999927 | 0.011435 | 0.004010 | 0.7 |
| TK54 | 4.0 | −458.3 | −456.5 | 4.0 | −1202.3 | −456.5 | 0.999999 | 0.000045 | 0.001652 | 0.1 |
| TK55 | 4.0 | −458.3 | −609.6 | 4.0 | −1202.3 | −609.6 | 0.999705 | −0.022462 | −0.009230 | 1.4 |

TABLE 19

|  | Type | Inch size | Cutting Tool Angle | FO | OQ | θmin | θmax |
|---|---|---|---|---|---|---|---|
| Example 1 | 4-mirror-double-bending | 61 inch(16:9) | 45° | 831 | 952 | 50.4 | 72.7 |
| Example 2 | 4-mirror-ceiling-bending | 50 inch(16:9) | 45° | 873 | 1115 | 61.4 | 74.2 |
| Example 3 | 4-mirror-ceiling-bending | 56 inch(16:9) | 45° | 1000 | 1216 | 60.9 | 74.2 |
| Example 4 | 4-mirror-ceiling-bending | 56 inch(16:9) | 60° | 1019 | 1216 | 60.9 | 74.2 |
| Example 5 | 4-mirror-ceiling-bending | 56 inch(16:9) | 75° | 1018 | 1216 | 60.9 | 74.2 |
| Example 6 | 4-mirror-ceiling-bending | 56 inch(16:9) | 90° | 1021 | 1216 | 60.9 | 74.2 |
| Example 7 | 4-mirror-ceiling-bending | 67 inch(16:9) | 45° | 1215 | 1410 | 60.7 | 74.5 |
| Example 8 | 2-mirror-ceiling-bending | 56 inch(16:9) | 45° | 944 | 1091 | 60.6 | 75.4 |
| Example 9 | 1-mirror (refocusing) | 60 inch(4:3) | 45° | 744 | 653 | 45.9 | 82.0 |

TABLE 20

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| FLmax | 446.3 | 404.0 | 424.5 | 427.4 | 428.5 | 427.4 | 478.5 | 377.1 | 301.0 |
| FLmin | 345.8 | 287.2 | 348.1 | 366.4 | 365.7 | 368.0 | 395.3 | 330.7 | 156.3 |
| FL(hc) | 412.8 | 356.8 | 379.2 | 385.2 | 385.3 | 384.3 | 440.8 | 339.3 | 246.8 |
| FL(hb) | 345.8 | 287.2 | 348.1 | 366.4 | 365.7 | 368.0 | 425.2 | 330.7 | 271.1 |
| FL(ht) | 417.7 | 325.2 | 418.9 | 414.7 | 416.0 | 417.1 | 477.9 | 369.2 | 227.1 |
| (FLmax − Flmin)/FL(hc) | 0.244 | 0.327 | 0.201 | 0.158 | 0.163 | 0.155 | 0.189 | 0.137 | 0.586 |

TABLE 21

Correspondence between h, θ, and FL in Example 9

| dSv | n | h | θ | FL |
|---|---|---|---|---|
| 45 | 1.55 | 250 | 117.5092 | 252.2 |
|  |  | 500 | 123.0376 | 296.9 |
|  |  | 750 | 127.9046 | 245.6 |
|  |  | 1000 | 129.9313 | 229.8 |
|  |  | 1250 | 131.2089 | 213.1 |

What is claimed is:

1. A rear projector for performing image projection, comprising:
a screen including a rotationally symmetric Fresnel lens; and
a projection optical system being nonaxisymmetric and making a central principle ray incident obliquely on the screen in the image projection, the projection optical system having at least one reflection surface formed of a rotationally asymmetric free curved surface;
wherein the Fresnel lens has aberration that cancels out pupil aberration of the projection optical system so that principal rays of beams exiting from the Fresnel lens become substantially parallel to each other, wherein the projection optical system is a nonaxisymmetric projection optical system that does not form an intermediate image, and wherein when, within a plane including a central principal ray immediately before reaching the screen and a normal line of the screen at a point which the ray reaches, an intersection of the central principal ray and the screen is O, an intersection of an extension line La, from a screen direction, of a principal ray of a beam incident on the screen at a largest angle of incidence and an extension line Lb, from the screen direction, of a principal ray of a beam incident on the screen at a smallest angle of incidence is P, an intersection of a perpendicular line drawn from the intersection P to an extension surface of a screen surface and the extension surface of the screen surface is Q, and an amount of offset of the Fresnel lens (distance from a screen center to a rotation symmetry center of the Fresnel lens) is FO, then conditional formula (1) below is satisfied:

$$FO<OQ \qquad (1).$$

2. The rear projector according to claim 1, wherein when θmin is a minimum angle of incidence on the screen, then conditional formula (6) below is satisfied:

$$40°<\theta min \qquad (6).$$

3. The rear projector according to claim 1, wherein when θmax is a maximum angle of incidence on the screen, then conditional formula (7) below is satisfied:

$$70°<\theta max<85° \qquad (7).$$

4. The rear projector according to claim 1, wherein the Fresnel lens has spherical aberration in accordance with a height from a central axis of the Fresnel lens.

5. The rear projector according to claim 1, wherein the projection optical system has a refractive lens and curved reflection surfaces, the curved reflection surface on a most screen side being a convex surface formed of a free curved surface.

6. The rear projector according to claim 5, wherein the projection optical system has four curved reflection surfaces.

7. The rear projector according to claim 5, wherein the projection optical system has:
a refractive lens group formed of a plurality of refractive lenses; and
two curved reflection surfaces arranged on an optical path on a screen side of the refractive lens group.

8. The rear projector according to claim 1, wherein conditional formula (1a) below is satisfied:

$$0.6<FO/OQ<0.9 \qquad (1a).$$

9. A rear projector for performing image projection, comprising:
a screen including a rotationally symmetric Fresnel lens; and
a projection optical system being nonaxisymmetric and making a central principle ray incident obliquely on the screen in the image projection, the projection optical system having at least one reflection surface formed of a rotationally asymmetric free curved surface;
wherein the Fresnel lens has aberration that cancels out pupil aberration of the projection optical system so that principal rays of beams exiting from the Fresnel lens become substantially parallel to each other,
wherein the projection optical system is a nonaxisymmetric projection optical system that forms an intermediate image, and wherein when, within a plane including a central principal ray immediately before reaching the screen and a normal line of the screen at a point which the ray reaches, an intersection of the central principal ray and the screen is O, an intersection of an extension line La, from a screen direction, of a principal ray of a beam incident on the screen at a largest angle of incidence and an extension line Lb, from the screen direction, of a principal ray of a beam incident on the screen at a smallest angle of incidence is P, an intersection of a perpendicular line drawn from the intersection P to an extension surface of a screen surface and the extension surface of the screen surface is Q, and an amount of offset of the Fresnel lens (distance from a screen center to a rotation symmetry center of the Fresnel lens) is FO, then conditional formula (2) below is satisfied:

$$OQ<FO \qquad (2).$$

10. The rear projector according to claim 9, wherein the projection optical system has:
a refractive lens group formed of a plurality of refractive lenses; and
a concave reflection surface formed of a free curved surface arranged on an optical path on a screen side of the refractive lens group.

11. The rear projector according to claim 9, wherein conditional formula (2a) below is satisfied:

$$1.1<FO/OQ<1.4 \qquad (2a).$$

12. The rear projector according to claim 9, wherein when θmin is a minimum angle of incidence on the screen, then conditional formula (6) below is satisfied:

$$40°<\theta min \qquad (6).$$

13. The rear projector according to claim 9, wherein when θmax is a maximum angle of incidence on the screen, then conditional formula (7) below is satisfied:

$$70°<\theta max<85° \qquad (7).$$

14. The rear projector according to claim 9, wherein the Fresnel lens has spherical aberration in accordance with a height from a central axis of the Fresnel lens.

15. A rear projector for performing image projection, comprising:
a screen including a rotationally symmetric Fresnel lens; and
a projection optical system being nonaxisymmetric and making a central principle ray incident obliquely on the screen in the image projection, the projection optical system having at least one reflection surface formed of a rotationally asymmetric free curved surface;
wherein the Fresnel lens has aberration that cancels out pupil aberration of the projection optical system so that principal rays of beams exiting from the Fresnel lens become substantially parallel to each other,
wherein the projection optical system is a nonaxisymmetric projection optical system that does not form an intermediate image, and
wherein when a focal length at a Fresnel height hc corresponding to a display image plane center of the screen is FL(hc), within a plane including a central principal ray immediately before reaching the screen and a normal line of the screen at a point which the ray reaches, a focal length, at a Fresnel height hb, of a principal ray of a beam incident on the screen at a smallest angle of incidence is FL(hb), a focal length, at a Fresnel height ht, of a principal ray of a beam incident on the screen at a largest angle of incidence is FL(ht), a largest focal length and a smallest focal length over the entire screen are FLmax and FLmin, respectively, then conditional formulae (3) and (4) below are satisfied:

$$|(FLmax-FLmin)/FL(hc)|>0.1 \quad (3),$$

$$FL(ht)>FL(hb) \quad (4).$$

16. The rear projector according to claim 15, wherein when θmin is a minimum angle of incidence on the screen, then conditional formula (6) below is satisfied:

$$40°<\theta min \quad (6).$$

17. The rear projector according to claim 15, wherein when Amax is a maximum angle of incidence on the screen, then conditional formula (7) below is satisfied:

$$70°<\theta max<85° \quad (7).$$

18. The rear projector according to claim 15, wherein the Fresnel lens has spherical aberration in accordance with a height from a central axis of the Fresnel lens.

19. A rear projector for performing image projection, comprising:
   a screen including a rotationally symmetric Fresnel lens; and
   a projection optical system being nonaxisymmetric and making a central principle ray incident obliquely on the screen in the image projection, the projection optical system having at least one reflection surface formed of a rotationally asymmetric free curved surface;
   wherein the Fresnel lens has aberration that cancels out pupil aberration of the projection optical system so that principal rays of beams exiting from the Fresnel lens become substantially parallel to each other,
   wherein the projection optical system is a nonaxisymmetric projection optical system that forms an intermediate image, and
   wherein when a focal length at a Fresnel height hc corresponding to a display image plane center of the screen is FL(hc), within a plane including a central principal ray immediately before reaching the screen and a normal line of the screen at a point which the ray reaches, a focal length, at a Fresnel height hb, of a principal ray of a beam incident on the screen at a smallest angle of incidence is FL(hb), a focal length, at a Fresnel height ht, of a principal ray of a beam incident on the screen at a largest angle of incidence is FL(ht), a largest focal length and a smallest focal length over the entire screen are FLmax and FLmin, respectively, then conditional formulae (3) and (5) below are satisfied:

$$|(FLmax-FLmin)/FL(hc)|>0.1 \quad (3),$$

$$FL(ht)<FL(hb) \quad (5).$$

20. The rear projector according to claim 19, wherein when θmin is a minimum angle of incidence on the screen, then conditional formula (6) below is satisfied:

$$40°<\theta min \quad (6).$$

21. The rear projector according to claim 19, wherein when θmax is a maximum angle of incidence on the screen, then conditional formula (7) below is satisfied:

$$70°<\theta max<85° \quad (7).$$

22. The rear projector according to claim 19, wherein the Fresnel lens has spherical aberration in accordance with a height from a central axis of the Fresnel lens.

* * * * *

UNITED STATES PATENT AND TRADEMARK OFFICE
CERTIFICATE OF CORRECTION

| | | |
|---|---|---|
| PATENT NO. | : 7,950,806 B2 | Page 1 of 1 |
| APPLICATION NO. | : 10/005223 | |
| DATED | : May 31, 2011 | |
| INVENTOR(S) | : Masayuki Imaoka and Jun Ishihara | |

It is certified that error appears in the above-identified patent and that said Letters Patent is hereby corrected as shown below:

<u>Column 57:</u>
Line 14, claim 17, delete "Amax" and insert -- $\theta$max --.

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

PATENT NO.        : 7,950,806 B2
APPLICATION NO.   : 12/005223
DATED             : May 31, 2011
INVENTOR(S)       : Masayuki Imaoka and Jun Ishihara It is certified that error appears in the above-identified patent and that said Letters Patent is hereby corrected as shown below:

<u>Column 57:</u>
Line 14, claim 17, delete "Amax" and insert -- $\theta$max --.

This certificate supersedes the Certificate of Correction issued July 12, 2011.

Signed and Sealed this
Thirtieth Day of August, 2011

David J. Kappos
*Director of the United States Patent and Trademark Office*